United States Patent
Armstrong et al.

(10) Patent No.: US 11,265,607 B2
(45) Date of Patent: Mar. 1, 2022

(54) SYSTEMS, METHODS, AND APPARATUSES FOR IMPLEMENTING A BROADCAST INTEGRATION PLATFORM WITH REAL-TIME INTERACTIVE CONTENT SYNCHRONIZATION

(71) Applicant: Synchronicity.co, Inc., Wilsonville, OR (US)

(72) Inventors: John Robert Armstrong, Oxnard, CA (US); Reese Armstrong, Palm Springs, CA (US); Rondee Quinton Businger, Central Point, OR (US)

(73) Assignee: Synchronicity Finance LLC, Wilsonville, OR (US)

( * ) Notice: Subject to any disclaimer, the term of this patent is extended or adjusted under 35 U.S.C. 154(b) by 0 days.

(21) Appl. No.: 17/061,258

(22) Filed: Oct. 1, 2020

(65) Prior Publication Data

US 2021/0099759 A1    Apr. 1, 2021

Related U.S. Application Data

(60) Provisional application No. 62/908,818, filed on Oct. 1, 2019.

(51) Int. Cl.
*H04N 21/462* (2011.01)
*H04N 21/235* (2011.01)
(Continued)

(52) U.S. Cl.
CPC ..... *H04N 21/4622* (2013.01); *H04L 65/4076* (2013.01); *H04N 21/235* (2013.01); *H04N 21/435* (2013.01); *H04N 21/812* (2013.01)

(58) Field of Classification Search
CPC ................................. H04N 21/4622
See application file for complete search history.

(56) References Cited

U.S. PATENT DOCUMENTS

2007/0102764 A1* 5/2007 Ando .............. G11B 27/329
                                                       257/355
2011/0321096 A1* 12/2011 Landow .......... H04N 21/4621
                                                        725/41

* cited by examiner

*Primary Examiner* — Hsiungfei Peng
(74) *Attorney, Agent, or Firm* — Elliott, Ostrander & Preston, P.C.

(57) ABSTRACT

Embodiments of the invention relate generally to the field of content distribution platforms, and more particularly, to systems, methods, and apparatuses for implementing a broadcast integration platform with real-time interactive content synchronization. For example, according to one embodiment there is a method performed by a broadcast integration platform having at least a processor and a memory by which to synchronize interactive content with a broadcast transmission, in which the method includes: receiving a request from a user device for presentation of a broadcast transmission, wherein the user device is to receive the broadcast transmission via a local tuner; transmitting a source location for the broadcast transmission from the broadcast integration platform to the user device; transmitting to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device; instructing the user device to compute a local offset for the broadcast transmission by determining a latency delay between the current position for the broadcast transmission according to the broadcast offset and the local current position for the broadcast transmission according to (Continued)

the display of the broadcast transmission at the user device; synchronizing presentation of the media content objects with the display of the broadcast transmission at the user device by instructing the local tuner to temporally align the presentation of the media content objects with the display of the broadcast transmission based on the time-point triggers for the media content objects using the local offset; and instructing the user device to overlay the presentation of the media content objects over the display of the broadcast transmission at the user device at a time defined by each of the time-point triggers. Other related embodiments are disclosed.

20 Claims, 29 Drawing Sheets

(51) Int. Cl.
*H04N 21/435* (2011.01)
*H04N 21/431* (2011.01)
*H04N 21/478* (2011.01)
*H04N 21/2547* (2011.01)
*H04N 21/442* (2011.01)
*H04N 21/658* (2011.01)
*H04N 21/262* (2011.01)
*H04N 21/43* (2011.01)
*H04L 65/611* (2022.01)
*H04N 21/81* (2011.01)

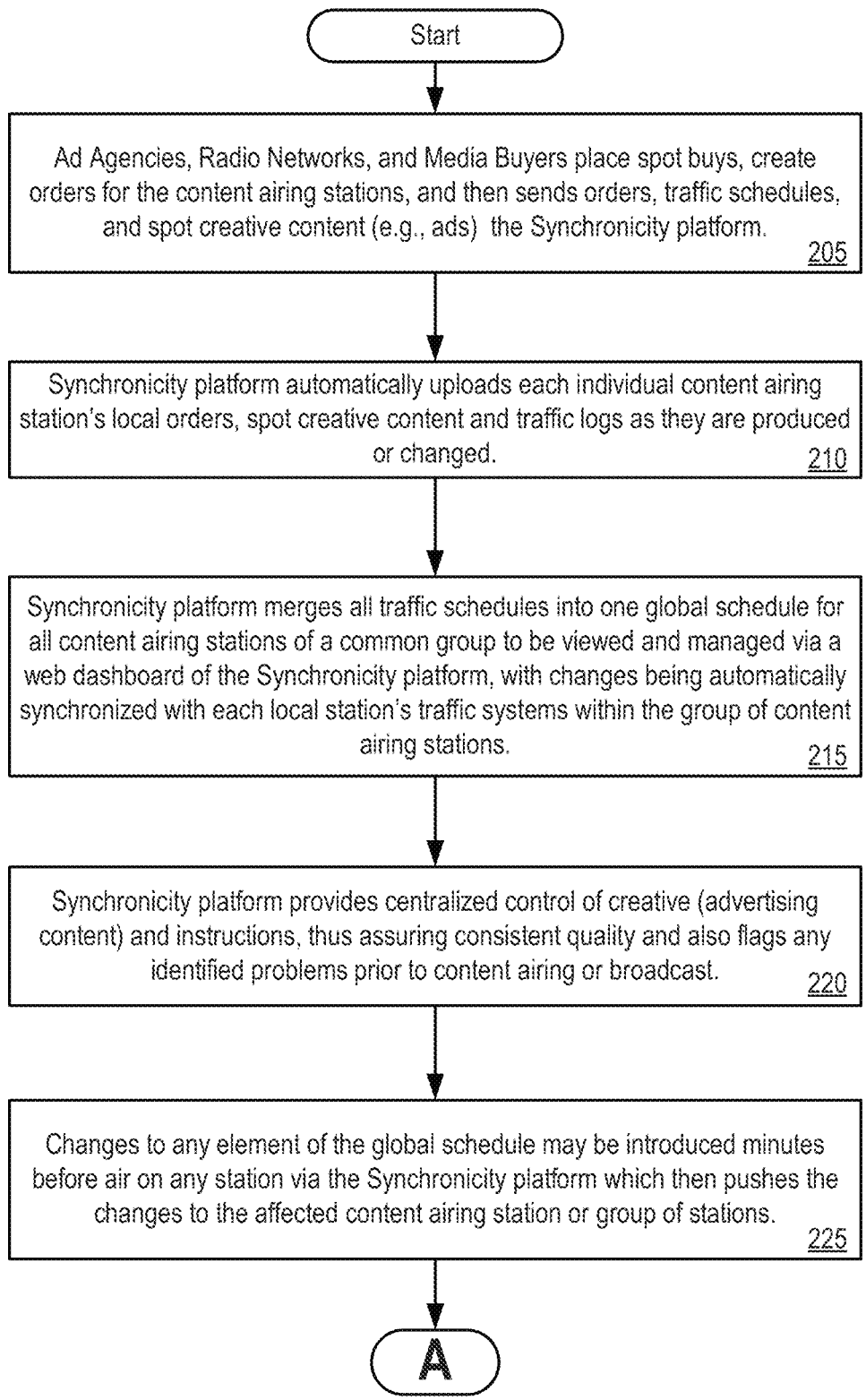

202 (Continued from Fig 2A) FIG. 2B

A

```
Synchronicity platform generates customized automation logs for each station
and directly injects advertising spots and logs into the automation systems of
the respective content airing stations.
                                                                    230
```

```
Automation systems of the respective content airing stations (e.g., radio and TV
stations) play the daily programming and spots to air in accordance with the
scheduling specified by the Synchronicity platform using the injected advertising
spots and logs.
                                                                    235
```

```
Optionally, the Synchronicity platform will send targeted interactive creative to
mobile apps for concurrent display with the terrestrial signal for each content
airing station.
                                                                    240
```

```
Synchronicity platform iteratively retrieves event logs (e.g., daily, nightly, etc.)
from all the automation systems of all the connected content airing stations
having their schedules managed by the Synchronicity platform.
                                                                    245
```

```
Synchronicity platform processes the event logs retrieved and the processed
and reconciled data is then displayed to each content airing group's Traffic
Management Dashboard, with affidavits being automatically generated and
delivered to Radio Networks and Ad Agencies as required providing
confirmation of advertising content being broadcast correctly.
                                                                    250
```

End

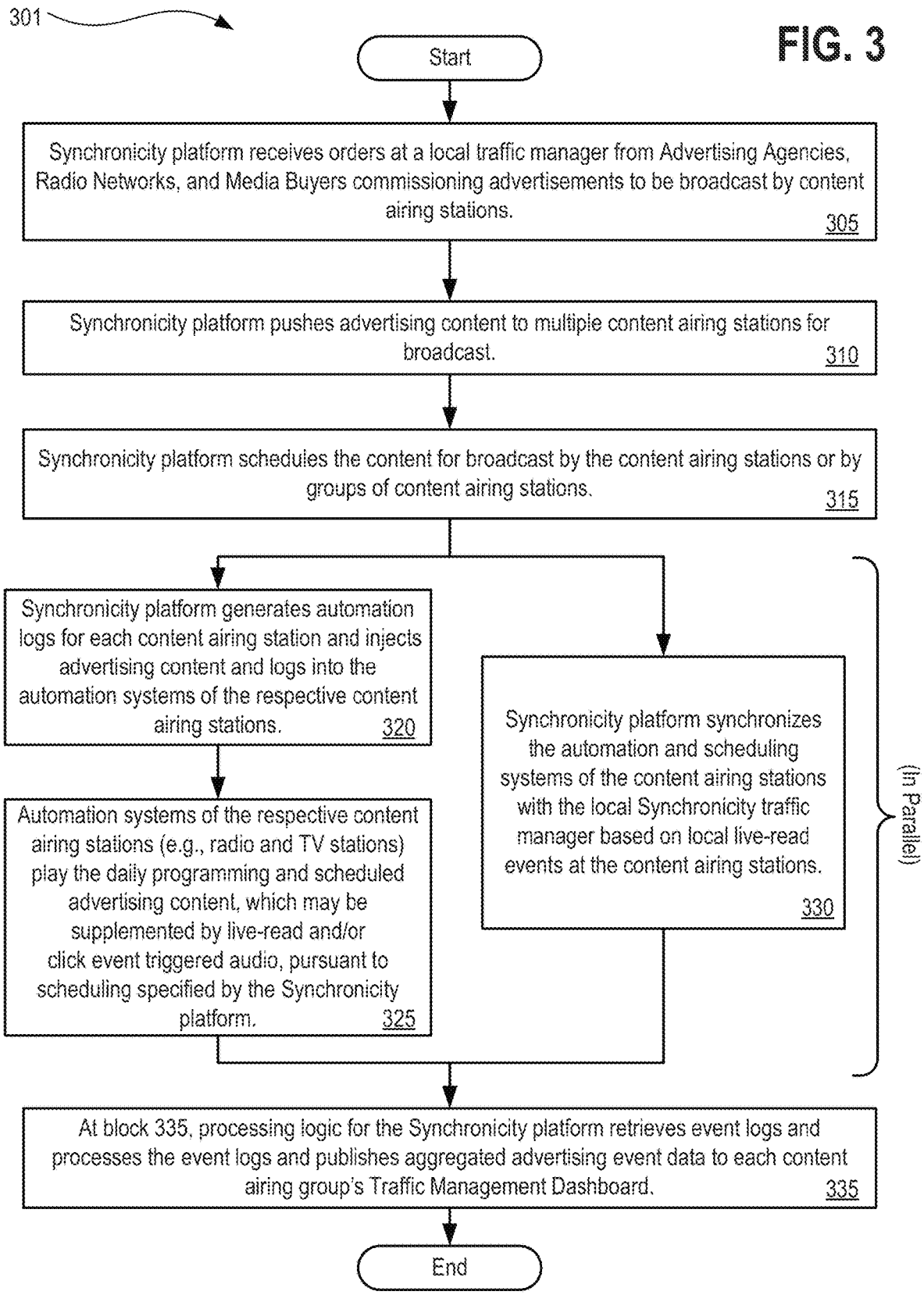

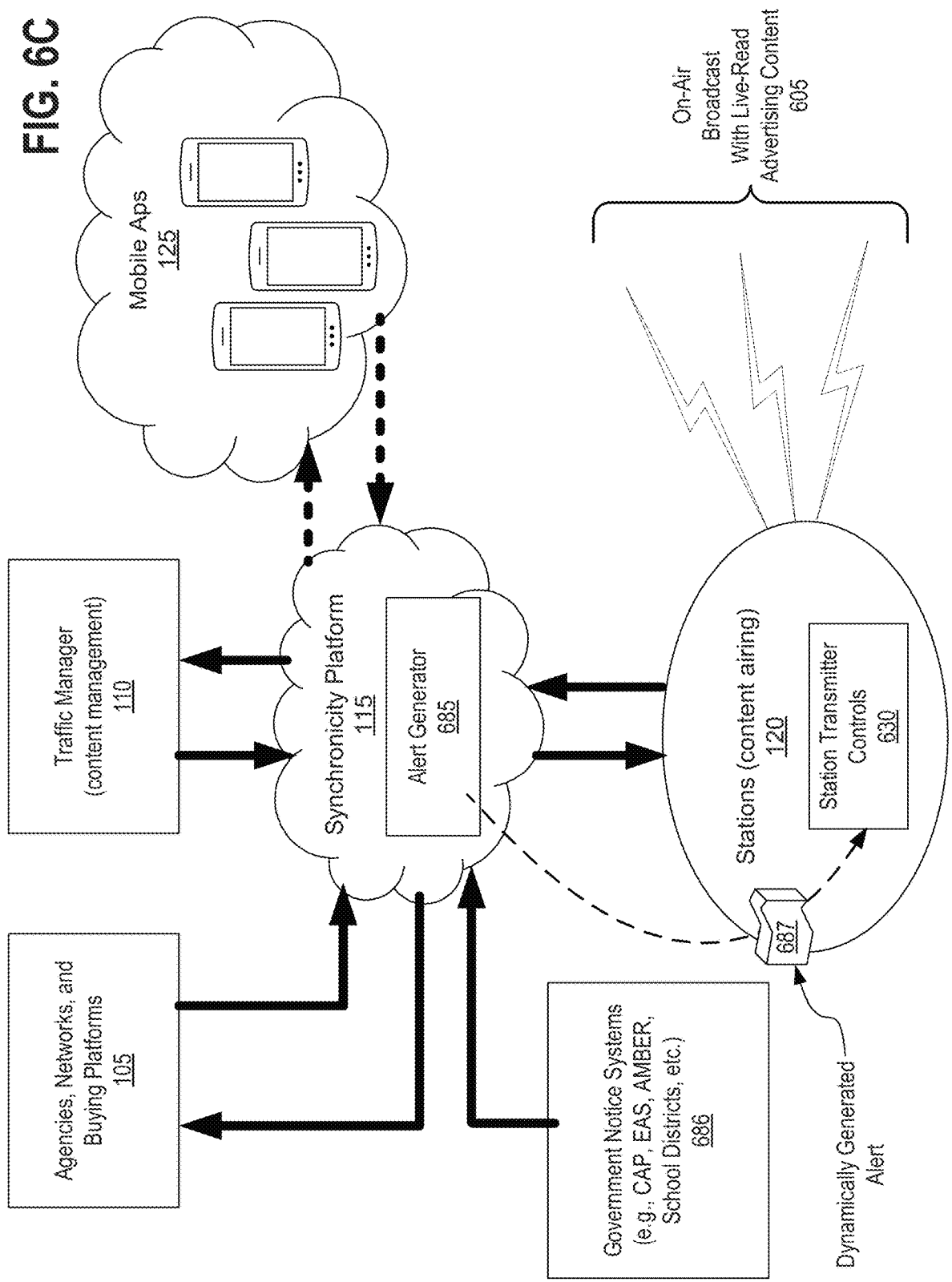

FIG. 7

Performed
MM/DD/YYYY HH:MM:SS AM – Beau Talent

Closed
Beau Talent: MM/DD/YYYY HH:MM:SS AM
Lisa Host: MM/DD/YYYY HH:MM:SS AM
Lisa Host: MM/DD/YYYY HH:MM:SS PM
Lisa Host: MM/DD/YYYY HH:MM:SS PM
Lisa Host: MM/DD/YYYY HH:MM:SS PM
Lisa Host: MM/DD/YYYY HH:MM:SS PM
Lisa Host: MM/DD/YYYY HH:MM:SS PM
Kevin Manager: MM/DD/YYYY HH:MM:SS AM
Lisa Host: MM/DD/YYYY HH:MM:SS AM
Lisa Host: MM/DD/YYYY HH:MM:SS AM
Lisa Host: MM/DD/YYYY HH:MM:SS AM
Kevin Manager: MM/DD/YYYY HH:MM:SS AM
Kevin Manager: MM/DD/YYYY HH:MM:SS AM
Kevin Manager: MM/DD/YYYY HH:MM:SS AM
Kevin Manager: MM/DD/YYYY HH:MM:SS AM
Kevin Manager: MM/DD/YYYY HH:MM:SS PM
John Admin: MM/DD/YYYY HH:MM:SS PM
Kevin Manager: MM/DD/YYYY HH:MM:SS AM
Lisa Host: MM/DD/YYYY HH:MM:SS AM
Lisa Host: MM/DD/YYYY HH:MM:SS AM
Lisa Host: MM/DD/YYYY HH:MM:SS AM
Lisa Host: MM/DD/YYYY HH:MM:SS AM Opened
Beau Talent: MM/DD/YYYY HH:MM:SS AM
Lisa Host: MM/DD/YYYY HH:MM:SS AM
Lisa Host: MM/DD/YYYY HH:MM:SS PM
Lisa Host: MM/DD/YYYY HH:MM:SS PM
Lisa Host: MM/DD/YYYY HH:MM:SS PM
Kevin Manager: MM/DD/YYYY HH:MM:SS AM

FIG. 21B

(Continued from Fig 21A)

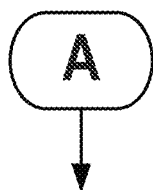

Instructing the user device to compute a local offset for the broadcast transmission by determining a latency delay between the current position for the broadcast transmission according to the broadcast offset and the local current position for the broadcast transmission according to the display of the broadcast transmission at the user device.
2135

Synchronizing presentation of the media content objects with the display of the broadcast transmission at the user device by instructing the local tuner to temporally align the presentation of the media content objects with the display of the broadcast transmission based on the time-point triggers for the media content objects using the local offset.
2140

Instructing the user device to overlay the presentation of the media content objects over the display of the broadcast transmission at the user device at a time defined by each of the time-point triggers.
2145

End

SYSTEMS, METHODS, AND APPARATUSES FOR IMPLEMENTING A BROADCAST INTEGRATION PLATFORM WITH REAL-TIME INTERACTIVE CONTENT SYNCHRONIZATION

CLAIM OF PRIORITY

This U.S. Utility Patent Application is related to, and claims priority to, the U.S. Provisional Application No. 62/908,818 filed Oct. 1, 2019 entitled "SYSTEMS, METHODS, AND APPARATUSES FOR IMPLEMENTING A DIRECT-TO-AIR MANAGEMENT AND AUDIT PLATFORM FOR DYNAMIC ADVERTISING CONTENT," the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of content distribution platforms, and more particularly, to systems, methods, and apparatuses for implementing a broadcast integration platform with real-time interactive content synchronization.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Advertising is well known amongst all types of media distribution platforms, including newsprint, television, radio, social media, etc. Each media distribution platform enjoys its own particular benefits and also suffers from a variety of disadvantages.

Certain media distribution platforms such as radio and television may provide a mix of pre-recorded content which is then supplemented by various "spots" or short advertising content segments interspersed within the primary programming. For example, a television show may be broken up into multiple segments during its allocated 30-minute slot, with multiple advertising "spots" played in between the multiple segments of the primary programming. Similarly, radio play may consist of commentary, music, or other programming, with short advertising radio spots interspersed between the primary programming.

In certain instances, the primary programming is live while the advertising spots are pre-recorded. Alternatively, both may be pre-recorded, both may be live, or the advertising spots may be live and interspersed within pre-recorded programming content.

Regardless, it is commonplace to play advertising spots during television and radio programming as doing so provides an important source of revenue for the broadcast station. Unfortunately, tracking, management, monitoring of such advertising content or "spots" has been unduly cumbersome due to the manually intensive methods, with automation in the field being non-existent. Moreover, current methodologies permit only static advertising content to be distributed for direct-to-air broadcast, with no ability whatsoever to support dynamic content.

The present state of the art may therefore benefit from systems, methods, and apparatuses for implementing a broadcast integration platform with real-time interactive content synchronization as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIGS. 2A and 2B depict a flow diagram illustrating a method for implementing a direct-to-air management and audit platform for dynamic advertising content, in accordance with described embodiments;

FIG. 3 depicts an alternative methodology for implementing a direct-to-air management and audit platform for dynamic advertising content, in accordance with described embodiments;

FIG. 6C depicts an alert generator at the Synchronicity platform which is utilized to dynamically create alerts for radio and television broadcast, in accordance with described embodiments;

FIG. 7 depicts an exemplary sponsor script access log, including a timestamp for the script, in accordance with described embodiments;

FIGS. 21A and 21B depict a flow diagram illustrating a method for implementing a broadcast integration platform with real-time interactive content synchronization, in accordance with described embodiments.

DETAILED DESCRIPTION

Figure 1A:
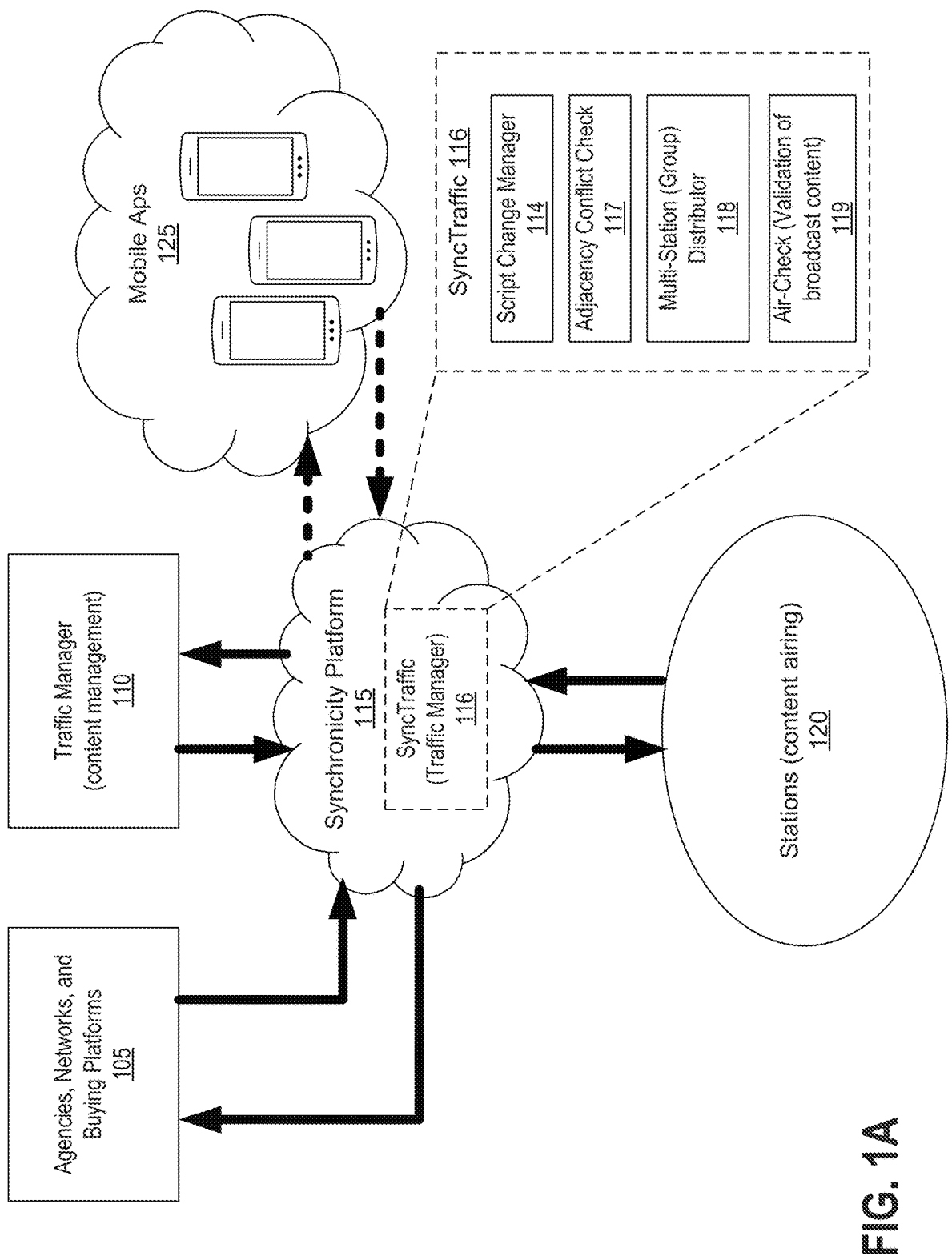
FIG. 1A illustrates a system architecture of the Synchronicity Platform which implements a direct-to-air management and audit platform for dynamic advertising content in accordance with described embodiments.

Described herein are systems, methods, and apparatuses for implementing a broadcast integration platform with real-time interactive content synchronization as is described herein. For instance, according to one embodiment, there is a method performed by a broadcast integration platform having at least a processor and a memory by which to synchronize interactive content with a broadcast transmission, in which the method includes: receiving a request from a user device for presentation of a broadcast transmission, in which the user device is to receive the broadcast transmission via a local tuner; transmitting a source location for the broadcast transmission from the broadcast integration platform to the user device; transmitting to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device; instructing the user device to compute a local offset for the broadcast transmission by determining a latency delay between the current position for the broadcast transmission according to the broadcast offset and the local current position for the broadcast transmission according to the display of the broadcast transmission at the user device; synchronizing presentation of the media content objects with the display of the broadcast transmission at the user device by instructing the local tuner to temporally align the presentation of the media content objects with the display of the broadcast transmission based on the time-point triggers for the media content objects using the local offset; and instructing the user device to overlay the presentation of the media content objects over the display of the broadcast transmission at the user device at a time defined by each of the time-point triggers.

Synchronicity provides the world's first all-inclusive programming, advertising, production, and media distribution system utilizing a distributed computing platform explicitly designed for the broadcast industry. Synchronicity brings together talent, program producers, syndicators, advertising agencies, and broadcast operations onto one common platform to speed up and simplify media production, distribution, and playout. Synchronicity's advanced technology platform improves quality, expedites workflow, dramatically lowers infrastructure costs, and provides new pathways to increase revenue.

As will be described in greater detail below, the Intelligent Dynamic Virtual Media (IDVM) technology and platform (e.g., IDVM Platform), along with Intelligent Dynamic Virtual media (e.g., IDV media) enables content creators, producers, broadcasters, and advertisers to collaborate within a more intuitive and highly streamlined process flow to create and deliver a wide range of media utilized within interactive applications, such as iTV, distance learning, in-store displays, kiosk screens, interactive catalogs, etc.

From a high level, the IDVM platform operates on the general concept that any consumable media (e.g., print media, text, audio, video, etc.) may be deconstructed into elemental components which may then be stored, transported, and subsequently reconstructed into a replica of the original, without having to actually store and transmit the original media in its monolithic form.

According to particular embodiments, a specialized broadcast integration platform utilizes both (i) a coding methodology to syntactically create and define IDVM objects by which to store an original monolithic consumable media as a collection of sub-parts, each having any one of a variety of enumerated file extensions so as to designate their type and purpose; and (ii) a coding methodology to syntactically define how the resulting replica of an original consumable media is to be recreated from the collection of sub-parts, thus permitting the original monolithic consumable media to be recreated, replicated, and represented at a destination on the basis of the collection of sub-parts, without the specialized broadcast integration platform ever having transmitted or transported the original media to the destination in its original monolithic form. Rather, it is only the collection of sub-parts that are transmitted or transported to the destination, thus providing significantly greater flexibility for content producers, broadcasters, and advertisers, as well as opening opportunities for media content interactivity given that the files representing the collection of sub-parts may be stored and retrieved in any manner required to support such interactivity and dynamic content delivery.

According to particular embodiments, the coding methodologies described above in support of (i) creating and defining the IDVM objects by which to break down and store an original monolithic consumable media as a collection of sub-parts as well as the coding methodology for (ii) syntactically defining how to recreate the replica of the original consumable media is to be recreated from the collection of sub-parts are exposed to end-users involved with the media production, broadcasting, and advertising roles through a variety of user interfaces, depending upon the particular role and objectives of the individual. For example, a content media producer may interact with the specialized broadcast integration platform via different user interfaces than an advertiser.

According to particular embodiments, the specialized broadcast integration platform implements a communication layer, which operates to retrieve the IDVM files (e.g., the collection of sub-parts) at a destination user device and then operates to determine, based on the coding methodology for (ii) syntactically defining how to recreate the replica of the original consumable media is to be recreated from the collection of sub-parts, precisely how to recreate or replicate the original monolithic consumable media at the user's playback device. In related embodiments, because the consumable media is broken down into a collection of sub-parts, the specialized broadcast integration platform may further operate to customize or dynamically alter on-the-fly, the replicated consumable media, such that the playback experience is either unique to that individuals playback device or new in a sense that the playback experience did not exist in any monolithic media format prior to playback from the collection of sub-parts.

Consider for example, that an advertisement is to be rendered and displayed at the user's playback device. Because the playback is replicated from the collection of sub-parts, it is not necessary for that advertising media to have been party of any original monolithic consumable media. Rather, the consumable media may be created and broken down into its collection of sub-parts and then the replication functionality implemented by the specialized broadcast integration platform implements coding specifications instructing the playback device to retrieve and present the advertisement media portion at a particular time and place within the consumable media, thus providing a seamless viewing experience to the consumer or whomever is viewing the replicated media while simultaneously enabling significant flexibility to the consumable media content producers, broadcasters, advertisers, etc.

Moreover, the specialized broadcast integration platform utilizes ancillary supporting components and functionality to fully automate IDVM object creation and replication in accordance with various embodiments, including the capability for the broadcast integration platform and its communication layer to render individual media types. In alternative embodiments, media type rendering and associated CODECs may be handled by the operating system upon which the broadcast integration platform and/or the consumable media content viewer executes, depending upon the chosen implementation.

According to certain embodiments, the IDVM objects (e.g., files) constitute encrypted portable data objects, each having multiple cascading keys, that can include elements of media or instructions or a combination of both media and instructions. According to such embodiments, the IDVM objects are additionally queryable, such that any given IDVM object may be queried by code to determine, for example, (i) if the IDVM object in question is allowed to be recreated in the current environment on the basis of one or more attributes (e.g., such as time, location, or any parameter entered by the creator) or further, queryable to determine (ii) what type of media is to be recreated or precisely what action is to be performed in accordance with specifications or configuration of the IDVM object, or further, queryable to determine (iii) if other IDVM objects are required to recreate the desired consumable media (e.g., such as a pre-requisite or a co-requisite or a post-requisite) and if, then where to retrieve the other IDVM objects, identifiable via a link, or specified location, or specified sequence identifier or a unique object identifier, etc.

According to such embodiments, a specified time may correspond to an instruction or a data point within such IDVM objects.

In accordance with the described embodiments, the various functional components of the specialized broadcast integration platform are structured in such a way so as to accommodate future unknown machine operating systems, media types and other advancements in coding methods. For instance, the broadcast integration platform may utilize operating system supplied default CODECs are may implement proprietary CODECs or may simply provide non-default CODECs for use in breaking apart consumable media content into its sub-parts, for encoding and decoding such media content sub-parts, for encrypting and decrypting some or all of the consumable media content sub-parts, or for rendering the replicated media content, advertising, and dynamically integrated renderings to a display device, such as an end-user or consumer's mobile phone, PC, or tablet.

In such a way, the specialized broadcast integration platform achieves for the first time, purposeful and intentional separation of an underlying media type from any corresponding distribution and reproduction method, thus providing both forward and backward compatibility as well as increased flexibility for the integration of dynamic and interactive content, including the integration of dynamic and interactive content into a replicated consumable media rendering which is non-homogenous with such media (e.g., integration of non-matching media types may be rendered due to them be stored within separate consent sub-parts via the IDM objects).

By intentionally separating the underlying media type from any corresponding distribution and reproduction method, the specialized broadcast integration platform eliminates the constant and well-known problem in the media industry necessitating that television shows, movies, and other content be distributed and reproduced using their original technology.

For example, shows recorded a half-century ago, such as a circa 1956 news-broadcast originally recorded and broadcast in the NTSC analog color format on a 2 inch Ampex machine can only be played back on that same type machine when utilizing conventional methods.

However, the specialized broadcast integration platform overcomes these issues by permitting such media content to be broken down and segmented into the various media sub-parts storable within the IDVM objects, which may then be transmitted or broadcast and ultimately replicated into a new representation of the original media content at a destination playback device, albeit without having to tie the replication and rendering of such content to the original media storage or playback standard.

According to additional embodiments, the specialized broadcast integration platform utilizes specialized media conversion methods to convert older IDVM formats and standards into newer modern media formats and standards. For example, shows that were created with idv v1.0 in 2000 may be upgraded by the specialized broadcast integration platform to v3.0 for reproduction, editing, etc., thus permitting the use of modern tools, software, and interfaces to the various individuals involved with the production of such consumable media content.

In other instances, the specialized broadcast integration platform may implement media conversion methods to convert IDVM format to another transport-preferred format on the basis of the means of distribution. For example, if the Internet (e.g., IP transport) is to be utilized as the method of transport for a particular set of IDVM objects, then the broadcast integration platform may convert IDVM objects to a particular type of IDVM object which is best optimized for IP based transport, such that the web-servers used to store, index and transmit the IDV media files to the IDV media reproducer may operate more efficiently.

According to the described embodiments, any media may be converted into IDV media and stored within the corresponding IDV media objects and thus, may subsequently be replicated and rendered at a destination user device without needing either the original media creation technology or without having to rely upon the original transport method. Thus, the media types are separated from the media transport, distribution, and broadcast mechanisms.

In other embodiments, media content such as web pages (e.g., html+other types of web-specific media content) is transcoded into an IDV media format to be stored within IDVM objects which are then transported and reproduced or replicated at a destination location without the use of a web-browser, if needed, or if a browser is available or configured, then such content may be reproduced at a destination location and then rendered via a web-browser, for instance, by converting the IDVM object and the media content therein back into HTML or another web-compliant format for native display to a web-browser. In other embodiments, text is converted into IDV media, stored, opened, edited, or transcoded and displayed in a browser.

In accordance with such embodiments, the Synchronicity platform which implements the specialized broadcast integration platform thus operates as both the storage and the transport platform for IDV media objects of any type, regardless of their original format, original media standard, original transport means, etc. This includes conventional monolithic consumable media which is processed by the broadcast integration platform so as to breakdown the monolithic consumable media content into a collection of sub-parts, each sub-part being stored within a corresponding IDV media object.

As will be described in greater detail below, the specialized broadcast integration platform implements a "synchronizer" which forms part of the communications layer for the code and instructions discussed above which provide (ii) a coding methodology to syntactically define how the resulting replica of an original consumable media is to be recreated from the collection of sub-parts.

Further supported are so-called Live Read script files (.slr extension) which are storable within a simplified IDV media object, for which there are no encryption requirements nor are there dynamic rules. Rather, such Live Read script files simply provide the text and associated attributes defining when the script content is to be read on-air and to which media content the script is associated. Similarly, SyncHD audio (.shd) files and streams may also be stored via simplified IDV media objects.

According to a particular embodiment, there is a "reproducer" which is deployed or provisioned to end-user and consumer playback devices (e.g., PCs, tablets, phones, smart TVs, cable boxes, etc.) and the reproducer supports both audio playback automation as well as IDV media architecture and associated IDVM objects.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well-known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a Management Device, a traffic aggregation unit, and/or a traffic de-aggregator to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1A illustrates a system architecture of the Synchronicity Platform 115 which implements a direct-to-air management and audit platform for dynamic advertising content in accordance with described embodiments.

In particular, there is depicted at block 105 a variety of agencies, networks, and buying platforms which seek to have advertising content broadcast via the stations 120 which provide content airing (e.g., radio broadcast, television broadcasts, etc., as depicted here at element 120. The Synchronicity platform 115 provides a centralized intermediary between the agencies, networks, and buying platforms at block 105, and the traffic manager depicted at block 110 provides content management. The Synchronicity platform 115 further provides an intermediary for any mobile apps 125 interacting with the primary programming content or the advertising content specified by the traffic manager 110 and the content airing stations 120 themselves. While the content airing stations 120 and the content traffic manager 110 are depicted here as an example, there are a wide variety of content airing stations 120 which broadcast such advertising content and there are a similarly large variety of content traffic managers which allocate time and place advertising spots into programming to be broadcast via the available stations interfaced with the Synchronicity platform 115.

Prior solutions are wholly lacking in any automated method to create and present sponsor scripts for their news anchors and DJ's to read live on air. Moreover, it may be necessary to provide a Sarbanes-Oxley Act (SOX) compliant audit trail for verification of such reads or presentation of the sponsored advertising content read by the news anchors and DJ's from the sponsor's scripts. Prior solutions typically required news stations and radio stations to print paper copies of sponsor scripts and then have the talent read those paper copies of the sponsor script and notate the time on the paper copy itself, subsequent to which other staff would key the relevant information into their traffic and billing software on a daily basis. Unfortunately, the volume of those scripts, reach approximately 11,000 sponsor scripts per week across more than a hundred radio stations for just a single broadcast entity, requiring substantial manpower to key in the data at significant cost. Such manual procedures utilized via conventional solutions are prone to error, induce billing discrepancies, and are unacceptably slow for any traffic manager 110 or content airing station 120 operating at any significant scale, very often requiring multiple weeks of delay from the time a sponsor's script is read, and thus the services rendered, to receipt of payment from the advertiser, due to the manually intensive and error-prone nature of conventional processes.

Consequently, the previously used "print and read" solution has become unacceptable to many broadcast and content airing stations 120 due to the inability to scale such a solution to volume.

The Synchronicity platform 115 is therefore configured in accordance with certain embodiments to manage multiple forms of media, such as audio, video and text, and provide automated integration of sponsor's scripts with such media content.

For instance, the Synchronicity platform 115 implements a customized system capable of interfacing with traffic manager platforms provided by various content airing stations and broadcasters, such as Entercom, Cox, etc., which is configured to receive traffic schedules from both the legacy local traffic systems as well as receive traffic schedules from the newer Wide Orbit or Marketron systems as well as insertion orders from proprietary or AAAA.org broadcast schemas compatible systems, and then combine those content insertions into a single presentation for on-air talent (e.g., anchors, radio hosts, and TV and radio personalities) to read live, on-air, and secondarily for the pre-recording of scripts by those TV and radio hosts, on-air talent, and personalities, to be played back on-air at a later time. The embodiments disclosed herein are further capable of accepting a confirmation by the on-air talent to document and record the post-log times, which are then automatically injected into the advertiser reconciliation web site/server.

The Synchronicity platform 115 additionally transfers and updates appropriate live-read scripts or recorded audio to all broadcast station radio affiliate locations (e.g., such as all CBS radio and/or television broadcast stations).

In such a way, the Synchronicity platform 115 provides seamless data connectivity with both the broadcaster and advertiser systems whereas no such solution existed before.

In accordance with certain embodiments, the Synchronicity direct-to-air platform includes its own traffic manager 116 local to, and embedded within the synchronicity platform itself, which is referred to herein as the "SyncTraffic" application that, in cooperation with connected broadcast stations existing traffic scheduling applications or traffic managers, is further capable to organize spot traffic workflow for individual stations or entire station groups which do not implement their own traffic managers 110 for content management, thus permitting customers to entirely outsource the traffic management obligations where desired.

SyncTraffic 116 therefore replaces multiple stand-alone software applications from different vendors with one consolidated platform to manage tasks from order entry processing, copy creation and production, to agency creative acquisition, preparation and playout and finally to air-play reporting. SyncTraffic 116 automates processes including collecting, QC'ing commercials creative to ensure that every spot is air ready, and then storing all local and national commercials from all sources in one central file location, and tasks like carting up and loading the current barter inventory along with all long and short form syndicated network programming and then interfacing with playout automation systems.

The SyncTraffic 116 platform gives station group traffic supervisors minute-by-minute control over every insertion order at every station in the whole group. SyncTraffic makes "just in time advertising" practical and reliable so advertisers can immediately respond to strategic opportunities or make last-minute "emergency copy" and production changes. Spots air precisely when and where they need to, so advertisers can respond to the marketplace faster and maximize the effectiveness of their advertising investment. Synchronicity is rolling out SyncTraffic for terrestrial Radio first and will add synchronous digital playout later in the year.

SyncTraffic 116 traffic manager therefore eliminates repetitive manual tasks, saving group-wide traffic and production staff hundreds of man-hours per week. SyncTraffic traffic manager further eliminates reliance on stand-alone applications that must be operated and managed at each individual station. SyncTraffic 116 traffic manager simplifies production and acquisition of all spot creative and eliminates scheduling and preparation and insertion into automation of barter inventory. SyncTraffic traffic manager additionally checks for adjacency conflicts and other problems before air time while remaining flexible to permit station managers to make last-minute changes on one or all stations up to three minutes before air, with such edits and other features being available to managers from any web-enabled PC, tablet or phone as depicted by element 125.

For instance, there is specifically depicted within the expanded SynTraffic 116 element multiple functional components of the platform implemented local traffic manager, including, for example, a script change manager 114, an adjacency conflict check 117 component, a multi-station (group) distributor 118 for pushing content for broadcast to multiple stations for airing based on a common group affiliation, and an air-check 119 to provide for validation of broadcast content, such as verification that a name or advertiser's brand was pronounced correctly, etc.

SyncTraffic 116 therefore provides for a single curated point of ingress (e.g., one centralized point for incoming advertising content including sponsor scripts) for all national, regional and local spot creative. Continuity is simplified through the use of master pools of national and local spots which are up-to-the minute current, QC'd, and approved for air, while providing local production with group oversight, such that all local spots and local production creative are accessible for review and approval at a group level any time.

SyncTraffic 116 additionally provides group-wide system transparency with a single point of oversight with real-time reporting of traffic activity before, during, and after airplay, including airplay reconciliation for the whole group available the next morning. Affidavit preparation is scheduled and automatic and provides a "one-click" approval process, thus eliminating the printed paper copies of sponsor scripts and the manual annotations which must then be inserted into a different system.

According to certain embodiments, the Synchronicity platform or the SyncTraffic 116 sub-system directly connects all affiliated agencies and networks such that all barter spots are retrieved the moment they are available. Once advertising spots are performed, various automated quality control steps applied to the performed spots. According to certain embodiments, available, but not yet scheduled, advertising spots are moved into master spot pools until they are scheduled to be loaded into the automation system. For instance, network barter affidavits may be automatically created and reported directly to the networks on a weekly basis. Syndicated and long-form programs and in-show spots are automatically retrieved from the networks, analyzed for quality control, carted inventory and tracking and retrieval, and then loaded into automation. Network syndicated programs and long-form affidavits may be automatically created and reported directly to the networks.

According to other embodiments, the Synchronicity platform or the SyncTraffic 116 sub-system automatically performs media descriptive analysis to compare the newly produced and finalized program log to the media in the automation system so as to ensure the accuracy of spot lengths, Ad-ID or ISCI ("Industry Standard Commercial Identifier") codes and advertiser names and will report any mismatches for correction. All commercials received from all spot delivery sources may be automatically processed for quality control (audio quality, normalization, spot length, slate removal, file format changes, inserting metadata, etc.). Spots passing quality control (QC) processes are then placed into a master spot pool until they are scheduled to be loaded into the automation system. Spots with any unresolved discrepancies are reported for correction as they enter the SyncTraffic 116 sub-system and well before airtime. Group and station management have 24/7 web browser access to all the processes the SyncTraffic 116 sub-system and can set up personalized text or email alerts to notify them when problems are detected. All the processes that the SyncTraffic 116 sub-system performs for the terrestrial signals are also available for digital stream creation and reporting at a later time.

In such a way, the Synchronicity platform 115 provides an all-inclusive programming and advertising production and distribution cloud service platform explicitly designed for the broadcast industry. The collaborative workspace technology brings talent, program producers, syndicators, advertising agencies, and broadcasters all together into one common fast and secure platform to speed up and simplify every aspect of media production, distribution, playout and reporting, thus expediting workflows, eliminating redundant tasks, and dramatically lowering costs.

Clients utilizing the Synchronicity platform benefit from the direct-to-air platform for distribution of every type of programming, from top-of-the hour news to 24-hour formats. In addition to the terrestrial station play-out, the Synchronicity platform also provides RSS feeds of audio and short-form video to websites and services like iTunes, iHeart, and TuneIn, and host 24-hour programs streaming directly to consumers. A Sync playout (hardware) network enables live programming to be simulcast with digital zip+4 targeted, direct-to-consumer services. The entire Synchronicity network and affiliate system installations are monitored 24/7 by support engineers to ensure all systems are operating as expected.

Figure 1B:
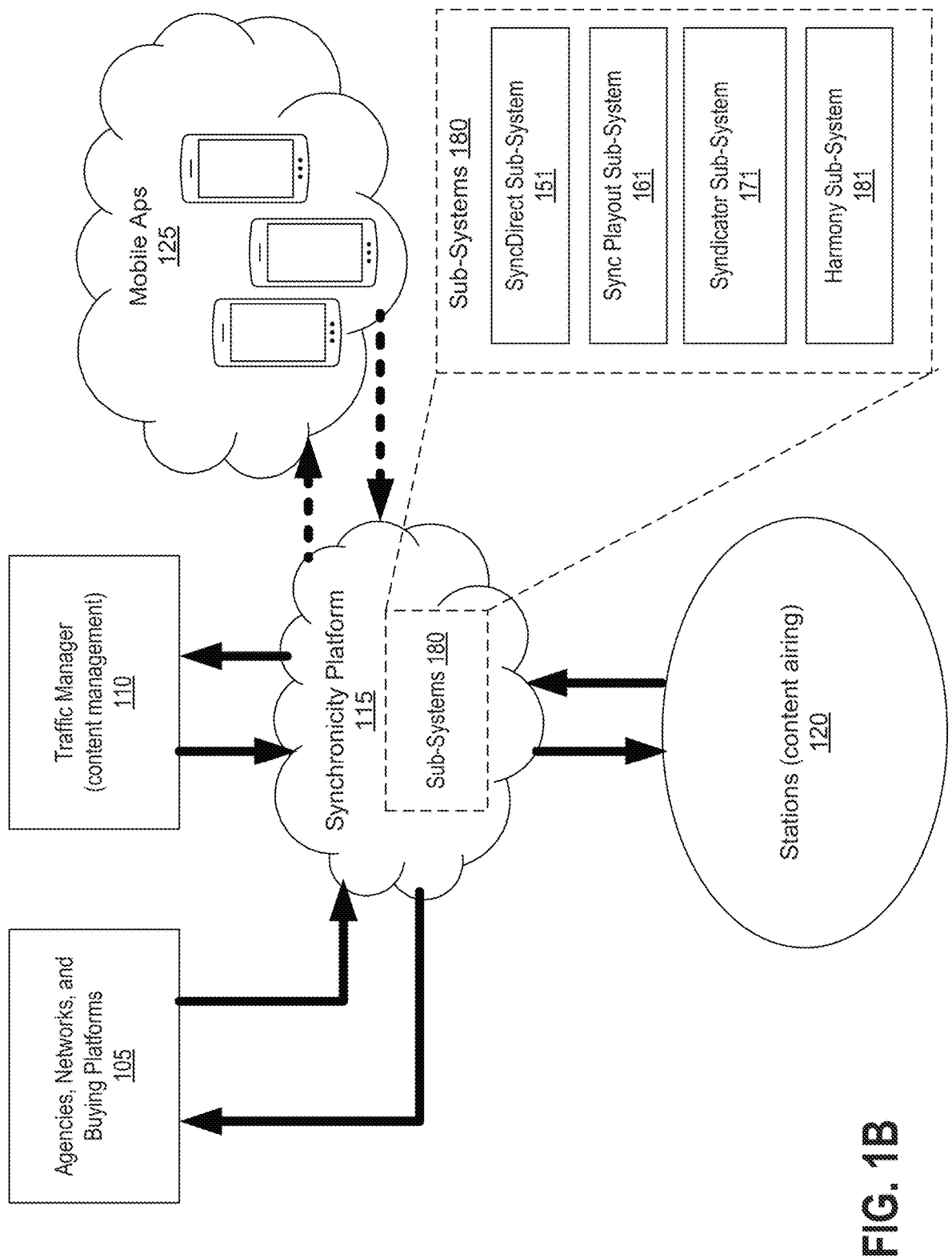
FIG. 1B illustrates a system architecture of the Synchronicity Platform additional sub-systems shown in greater detail, in accordance with described embodiments.

FIG. 1B illustrates a system architecture of the Synchronicity Platform 115 additional sub-systems shown in greater detail, in accordance with described embodiments.

For instance, there is depicted here, multiple Synchronicity platform 115 sub-systems 180, including the SyncDirect sub-system 151, the Sync Playout Sub-Systems 161, the Syndicator Sub-System 171, and the Harmony Sub-System 181.

Direct-To-Air Spot Distribution Functionality:

According to other embodiments, the Synchronicity platform 115 implements a SyncDirect sub-system 151 which provides a comprehensive, fully automated, real-time distribution solution for all pre-recorded spots and live-read scripts. SyncDirect gives agencies' creative and traffic departments precise, event-by-event control over every insertion in every station on a buy. Moreover, the SyncDirect sub-system 151 permits advertising agencies to respond to the marketplace faster through "just in time advertising" capabilities which are both practical and reliable, as the just in time advertising features enable clients to immediately respond to strategic opportunities, make last-minute emergency copy changes, or make mid-flight adjustments to maximize the effectiveness of their advertising investments.

Because the Synchronicity platform 115 is accessible any time from anywhere, spots and insertion orders are automatically uploaded, processed, and confirmed in seconds, so copy changes can be playing on any station in fewer than 10 minutes. With the SyncDirect sub-system 151, spots sound better. Original production *.wav files (e.g., audio recording files) are converted to SyncHD audio format for distribution to provide the highest audio quality possible, thus eliminating low quality MP3 formation audio. The SyncDirect sub-system 151 provides a reliable, end-to-end, completely-automated workflow makes station-by-station customized programming sharing and group-wide traffic management simple and fast with 24/7 Support. The SyncDirect sub-system 151 support engineers provide monitoring of all systems 24/7 so that clients may focus on their core business objectives rather than system operation, ensuring that programming airs on time every time.

Direct-To-Air with No Hardware:

According to certain embodiments, the SyncDirect sub-system 151 is locally installed at a client's location, remote from the Synchronicity platform 115, yet functionally remains interfaced and integrated with the Synchronicity platform. Once installed, SyncApp converts original audio to studio-quality SyncHD, and then instantly uploads files to Synchronicity directly from the production studio or remote voice talent. Insertion orders are processed as they are received from ad agencies. Music and traffic log changes are auto-merged in the Synchronicity platform 115, and then injected directly into station automation. Program elements are pulled down individually to each affiliate, and are custom formatted and directly injected into the automation system with real-time confirmation of air play and corresponding affidavits being available shortly thereafter, either the following morning or minutes after broadcast, depending on the particular implementation and needs of the client.

Live with No Satellites:

Still further, according to other embodiments, the Synchronicity platform 115 implements a Sync Playout sub-system 161. The Sync Playout sub-system's 161 multi-channel playout Harmony Receivers (SyncRCVR) are deployed in radio stations where there is a requirement for live program transmission. The Harmony Receivers create a live program distribution network with capabilities that far exceed the most sophisticated satellite networks. Simultaneous live studio quality (20-20 Khz) stereo feeds are provided, with all IP-based, 24/7-managed network "platform as a service" and support dashboards continuously displaying operational status of every receiver. The Harmony Receivers integrate with existing automation systems and provide "always on," non-linear program management such that any content can be routed and played out at any affiliate instantaneously. Clients may utilize the Sync Playout sub-system 161 to create or tear down special purpose ad-hoc networks in minutes and even pause and buffer live programming to provide "breaking news" then seamlessly resume the live programming stream or the live programming content after the pause.

Direct to Air Production Workflow:

According to other embodiments, the Synchronicity platform 115 implements a Syndicator sub-system 171. The Syndicator sub-system 171 provides direct-to-air capabilities so as to enable practical and reliable just-in-time programming. Music, spots and voice tracks are maintained separately and are not pre-combined, thus permitting clients to be more spontaneous and creative and make last minute emergency changes, even while a show is playing out. Short form content to 24-hour format content is supported, with all programming airing on every affiliate precisely how the client specifies, including support for dynamic content which utilizes a base template sponsor script with client-specified modifications on a per-station basis. For instance, to read out the local weather, a local location, a local sales price for a product, a current time for a local station, etc., with such dynamic content being seamlessly integrated into a script to be read by on-air talent in a seamless fashion. Split copy spot insertions in-show or ROS are also automated.

For advertising agencies, automated, real-time workflows gives creatives and traffic departments comprehensive, minute-by-minute control over every insertion in every station on a buy. Spots and insertion orders are automatically uploaded, processed, and confirmed in seconds, and can be playing on any station in fewer than 10 minutes. SOX-compliant affidavits are available overnight. Live Reads are included in the real-time workflow. Easy to create Local or imported national scripts are in front of talent in minutes, regardless of whether they are static or dynamic scripts. Therefore, when a sponsor's script is read on air (or when it isn't read on-air due to programming issues), the advertising agency is provided with instant SOX compliant reporting for auditing, billing, and programming purposes.

For broadcasting stations, real-time direct-to-air production workflows gives station operators a single, unified method to control all production and playout processes, which eliminates manual, error-prone, repetitive, and time-wasting tasks. The Synchronicity platform 115 automates the entire process, and brings all the local and national programming and spots together for real-time playout.

Harmony Functionality:

According to other embodiments, the Synchronicity platform implements a Harmony sub-system 181. The Harmony sub-system 181 provides a leading-edge hardware+distributed computing platform that manages all aspects of a radio station's programming playout. Harmony's distributed infrastructure and custom hardware bring unparalleled power and flexibility to radio stations.

Harmony's breakthrough technology is completely integrated with Synchronicity's Sync Playout 161 media management platform sub-system, which is designed to simplify a radio station's audio playout, while delivering a new level of HD sound quality. The result is a single source solution for radio stations that not only provides centralized command and control, but also utilizes connected devices for instantaneous delivery that populates throughout the system and generates real-time reports.

The Harmony sub-system 181 is integrated with the Synchronicity platform 115 for instant updating of all media with a real time live-log that seamlessly rebuilds in seconds.

Additional functionality includes voice tracking from anywhere anytime, sync-network distributed remote management access (not merely web pages or TeamViewer), synchronized continuous full system backups on the Synchronicity platform 115 servers, the ability to seamlessly switch into any live stereo network feeds (e.g., talk or sports—with no satellite receiver required).

FIGS. 2A and 2B depict a flow diagram illustrating a method 201-202 for implementing a direct-to-air management and audit platform for dynamic advertising content, in accordance with described embodiments. The method begins at FIG. 2A and is linked with FIG. 2B via the connector "A" depicted in the respective figures.

Method 201-202 may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating instructions, or some combination thereof). In one embodiment, method 201-202 is performed or coordinated via system architecture such as that depicted at FIG. 1, such as the Synchronicity platform. Some of the blocks and/or operations listed below are optional in accordance with certain embodiments. The numbering of the blocks presented is for the sake of clarity and is not intended to prescribe an order of operations in which the various blocks must occur. Additionally, operations from method flows 201-202 may be utilized in a variety of combinations.

Method 201-202 begins at block 205 where Advertising Agencies, Radio Networks, and Media Buyers place spot buys, create orders for the content airing stations, and then sends orders, traffic schedules, and spot creative content (e.g., ads) the Synchronicity platform.

At block 210, processing logic for the Synchronicity platform automatically uploads each individual content airing station's local orders, spot creative content and traffic logs as they are produced or changed. According to certain embodiments, once event logs are processed and the reconciled, data representing the advertising spot performance is displayed on a group traffic management dashboard representing a group of content airing stations or on a traffic management dashboard for a specific content airing station. Further still, affidavits attesting to the timely play of the content or reading of the sponsor script are generated and delivered to the radio networks and advertising agencies as required for the purposes of auditing and billing.

At block 215, processing logic for the Synchronicity platform merges all traffic schedules into one global schedule for all content airing stations of a common group to be viewed and managed via a web dashboard of the Synchronicity platform, with changes being automatically synchronized with each local station's traffic systems within the group of content airing stations.

At block 220, processing logic for the Synchronicity platform provides centralized control of creative (advertising content) and instructions, thus assuring consistent quality and also flags any identified problems prior to content airing or broadcast.

At block 225, processing logic for the Synchronicity platform facilitates, identifies, and schedules changes to any element of the global schedule, which may be introduced minutes before air on any station via the Synchronicity platform. Processing logic for the Synchronicity platform then pushes the changes to the affected content airing station or group of stations. Sometimes such changes are referred to as "emergency" ad changes or "emergency" scheduling changes. Regardless, processing logic for the Synchronicity platform permits such changes up to a pre-defined deadline or scheduling cut-off, which may be minutes prior to air time, depending on the implementation and agreements in place with the particular content airing stations or the group of airing stations which are commonly affiliated with a larger entity (e.g., entities such as CBS, NBC, Cox, etc., have multiple such content airing stations under their authority, all of which may be managed by the Synchronicity platform in an aggregated manner).

Processing for method 201-202 continues at FIG. 2B, which is connected with the method operations of FIG. 2A via connector "A."

Following connector "A" and continuing with the operations of method 201-202, processing logic for the Synchronicity platform at block 230, generates customized automation logs for each station and directly injects advertising spots and logs into the automation systems of the respective content airing stations. Such logs aid in the tracking of events, such as the airing and performance of the requested advertising content spots injected into the automation systems for the respective stations.

At block 235, processing logic of the automation systems of the respective content airing stations (e.g., radio and TV stations) play the daily programming and spots to air in accordance with the scheduling specified by the Synchronicity platform using the injected advertising spots and logs.

At block 240, processing logic for the Synchronicity platform optionally may send targeted interactive creative (e.g., multi-media and digital media advertising content) to mobile apps connected via the synchronicity platform, for concurrent display with the terrestrial signal broadcast from each content airing station. In such a way, connected mobile devices may receive digital content concurrent with advertising content being aired from a particular radio station or television station.

At block 245, processing logic for the Synchronicity platform iteratively retrieves event logs (e.g., daily, nightly, etc.) from all the automation systems of all the connected content airing stations having their schedules managed by the Synchronicity platform.

At block 250, processing logic for the Synchronicity platform processes the event logs retrieved and the processed and reconciled data is then displayed to each content airing group's Traffic Management Dashboard, with affidavits being automatically generated and delivered to Radio Networks and Ad Agencies as required providing confirmation of advertising content being broadcast correctly.

FIG. 3 depicts an alternative methodology 301 for implementing a direct-to-air management and audit platform for dynamic advertising content, including a mechanism by which to synchronize click events and local advertising events between the Synchronicity platform and the local content airing stations, in accordance with described embodiments.

As before, method 301 may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating instructions, or some combination thereof). In one embodiment, method 301 is performed or coordinated via system architecture such as that depicted at FIG. 1, such as the Synchronicity platform. Some of the blocks and/or operations listed below are optional in accordance with certain embodiments. The numbering of the blocks presented is for the sake of clarity and is not intended to prescribe an order of operations in which the various blocks must occur. Additionally, operations from method flows 301 may be utilized in a variety of combinations.

Method 301 begins at block 305 where processing logic for the Synchronicity platform receives orders at a local traffic manager from Advertising Agencies, Radio Networks, and Media Buyers commissioning advertisements to be broadcast by content airing stations.

At block 310, processing logic for the Synchronicity platform pushes advertising content to multiple content airing stations for broadcast.

At block 315, processing logic for the Synchronicity platform schedules the content for broadcast by the content airing stations or by groups of content airing stations.

At block 320, processing logic for the Synchronicity platform generates automation logs for each content airing station and injects advertising content and logs into the automation systems of the respective content airing stations.

At block 325, processing logic of the automation systems of the respective content airing stations (e.g., radio and TV stations) play the daily programming and scheduled advertising content, which may be supplemented by live-read and/or click event triggered audio, pursuant to scheduling specified by the Synchronicity platform.

At block 330, in parallel with the processing of block 320 and 325, processing logic for the Synchronicity platform synchronizes the automation and scheduling systems of the content airing stations with the local Synchronicity traffic manager based on local live-read events at the content airing stations. For example, on-air talent at the content airing stations may trigger actions, such as by clicking a "play" button during a broadcast to play pre-recorded audio, voice, script, jingles, or sound-effects through the soundboard of the content airing station (e.g., causing such audio to be played out over the air from a radio station or from a TV station) as part of the scheduled advertisement. These events are both recorded locally at the scheduling and automation system of each respective content airing station, but are additionally synchronized with the traffic manager at the Synchronicity platform, thus permitting for the display of the click events via an aggregated dashboard provided by the Synchronicity platform.

Therefore, the Synchronicity platform operates to control both the automation system of the local content airing station which schedules the scripts for on-air reads, but also operates to control, in parallel, an automated scheduling system provided by the Synchronicity platform which permits for the playing of audio content (e.g., sonic branding audio content) live on air before, after, during, or concurrent with the live on-air reading of the script.

For example, the Synchronicity platform may communicate with two automation systems concurrently, by communicating with both a Synchronicity platform ad server as well as the content airing station's own existing automation systems, so as to coordinate the activity between the station which may be playing the spots that the Synchronicity platform trafficked to them through the direct to air process. Additionally, the on-air talent may read a script displayed on the web-page on air and the on-air talent may additionally click on a button which plays sonic branding audio live on-air. In such a way, the Synchronicity platform coordinates, from within a single application, the scheduling of the ad content as well as the advertising events as they occur based on the scheduling and automation system of the station (e.g., the clicking of sonic branding events to play audio and the clickable events indicating the display of a script as part of advertising content or the marking as read for such a script).

Through such coordinated communication with both systems, the Synchronicity platform then merges and reconciles the captured data (e.g., scheduling and event occurrences) and displays such data to the traffic dashboard accessible to the client along with other ads by that client or other ads played by that station, for the purpose of accounting and auditability. For example, the traffic dashboard information provided to advertising agencies, clients, and advertisers will display in a single location, both the time a script was marked as read live on-air as well as the confirmation that a sonic branding audio file was played (e.g., by clicking the play button) and thus broadcast.

At block 335, processing logic for the Synchronicity platform retrieves event logs and processes the event logs and publishes aggregated advertising event data to each content airing group's Traffic Management Dashboard.

Figure 4A:
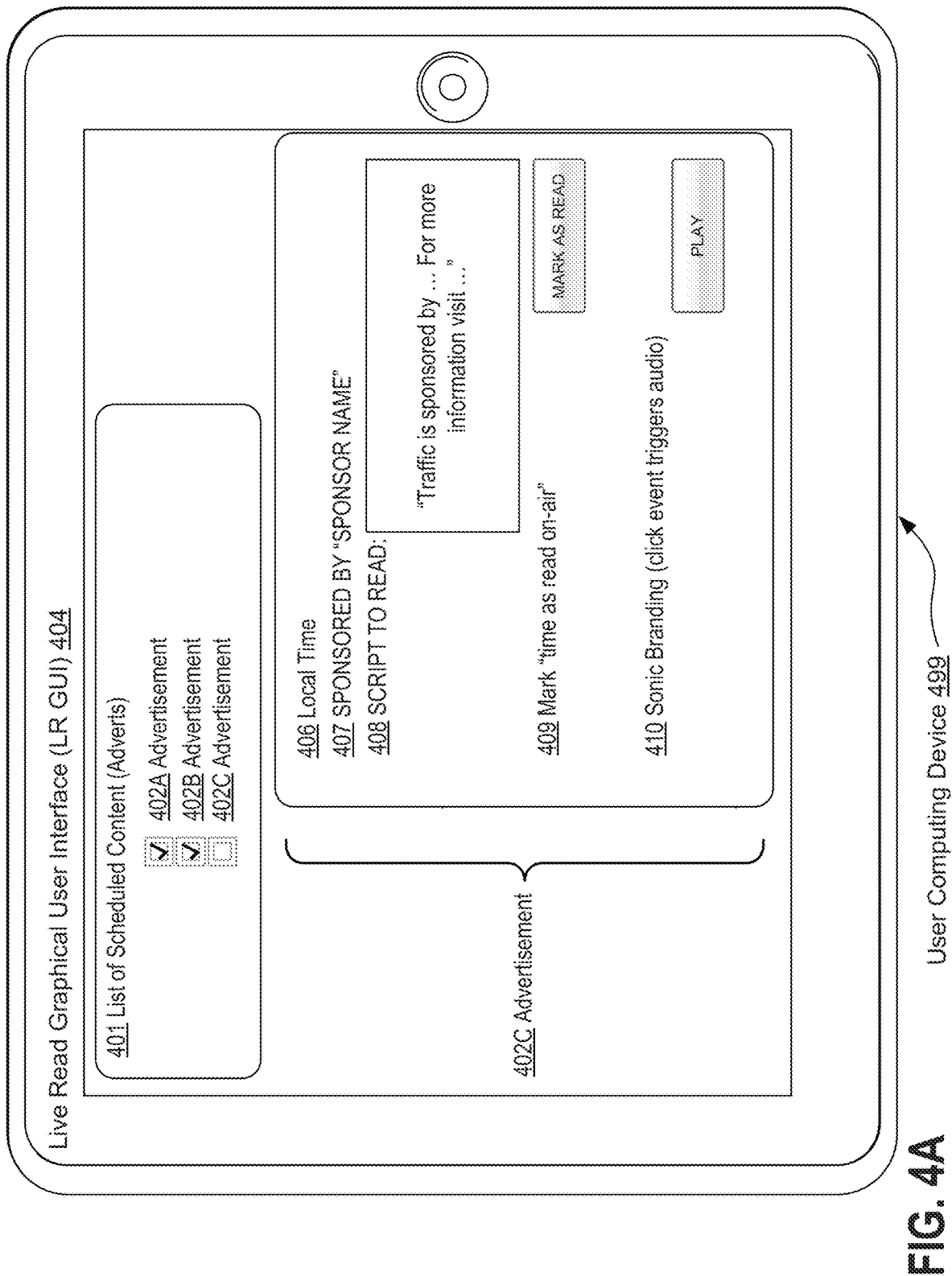
FIG. 4A depicts a Live Read Graphical User Interface (LR GUI) displayed to a user computing device, in accordance with described embodiments.

FIG. 4A depicts a Live Read Graphical User Interface (LR GUI) 404 displayed to a user computing device 499, in accordance with described embodiments.

Specifically depicted is a list of scheduled content (e.g., advertisements) at element 401, which includes three scheduled advertisements, 402A, 402B, and 402C. As can be seen here, advertisements or scheduled content 402A and 402B are marked as having been completed whereas advertisement 402C remains un-checked.

Below there is a particular advertisement 402C which is displayed to the LR GUI 404 in greater detail. Notably, there is depicted the local time 406, a sponsored by tag at element 407 (e.g., sponsored by Avocados from Mexico or sponsored by Dodge Ram, etc.), and a script to read at element 408, having displayed therein the actual language to be read on-air by the on-air talent, anchor, host, or other radio or TV personality. Further provided are two clickable events, a first being the "time as read" clickable event at element 409 which permits the host, disk jockey, or other on-air talent to click a button within the LR GUI 404 to mark the script as having been read once the script has been read on-air to confirm that indeed the advertisement occurred as commissioned. For instance, recording within the system the read-time (as per when the mark as read button or the "time as read" button 409 is clicked) as well as saving the script read, the local time, and other relevant metadata.

Another clickable event depicted here is the sonic branding "play" clickable event as depicted at element 410 which permits the on-air talent to click a button to play a jingle, or play pre-recorded audio, or play sound effects through the soundboard for broadcast via the live on-air signal, or to play any pre-recorded audio which is associated with the advertisement 402C, as per the content creation representative and traffic manager.

According to certain embodiments, the play button clickable event as depicted at element 410 triggers an IP burst audio for broadcast, which may be played before, during, or after the advertising script to be read 408. In certain embodiments, multiple play clickable events 410 may be utilized when specified by the advertisement creative director and creator whereas in other situations, such as a news story broadcast, there may be no pre-recorded audio to be played. In certain situations, a script may be read live and on-air by the on-air talent, followed by the IP burst audio triggered by the play clickable event 410 to play over the air, the advertiser's jingle.

Certain variations of the above described methods are contemplated in accordance with the described embodiments. For example:

In accordance with a particular embodiment, there is a method performed by a system having at least a processor and a memory therein to execute instructions, in which the method includes: managing advertising content at the system on behalf of a plurality of customers; transmitting a copy of the advertising content to one or more remote content airing stations with scheduling instructions specifying broadcast parameters of the advertising content; in which the advertising content embodies one or more dynamic content fields to be resolved prior to broadcast of the advertising content from any of the one or more remote content airing stations; receiving an indication at the system from one of the remote content airing stations that the advertising content is to be broadcast; capturing a broadcast of the advertising content for analysis at the system; and validating the broadcast of the advertising content.

In accordance with another embodiment, such a method further includes: displaying the advertising content in a script format to a GUI of a user computing device at the content airing station to broadcast the advertising content; displaying a first clickable button at the GUI of the user computing device to mark the advertising content as having been read live on-air as part of the broadcast; and displaying a second clickable button at the GUI of the user computing device to trigger playback of sonic branding audio through a soundboard of the content airing station to broadcast the advertising content.

In accordance with another embodiment, such a method further includes: receiving a first click event of the first clickable button indicating the advertising content has been marked as read live on-air as part of the broadcast and recording a time of broadcast of the advertising content for audit and validation of the broadcast; and receiving a second click event of the second clickable button indicating the playback of the sonic branding audio has been initiated, in which the second click event triggers an IP burst of the sonic branding audio to the soundboard of the content airing station which broadcasts the sonic branding audio live on-air as part of the broadcast of the advertising content.

In accordance with another embodiment of the described methods, the one or more dynamic content fields to be resolved prior to broadcast of the advertising content includes one or more of: a current time dynamic content field to be resolved into the current time of the remote content airing station broadcasting the advertising content at the time of the broadcast; a current temperature dynamic content field to be resolved into the current temperature at a geographic location of the remote content airing station broadcasting the advertising content at the time of the broadcast; and a current weather condition dynamic content field to be resolved into the current weather conditions at the geographic location of the remote content airing station broadcasting the advertising content at the time of the broadcast.

In accordance with another embodiment of the described methods, the one or more dynamic content fields are resolved into static plain text of an advertising content script to be read live on-air at the remote content airing station broadcasting the advertising content; and in which the method further includes capturing a copy of the advertising content script having the content fields resolved into their static plain text at the system for auditing, archival, and validation.

In accordance with another embodiment of the described methods, the one or more dynamic content fields are resolved into static plain text of an advertising content script to be read live on-air at the remote content airing station broadcasting the advertising content; and in which the method further includes validating the broadcast of the advertising content by performing a speech to text conversion of the broadcast to generate a broadcast text output and comparing the broadcast text output with the advertising content script.

In accordance with another embodiment of the described methods, the one or more dynamic content fields to be resolved prior to broadcast of the advertising content includes one or more of: conditional dynamic content fields which identify which one of multiple versions of the advertising content is to be broadcast by the remote content airing station broadcasting the advertising content; in which the conditional dynamic content fields are resolved to determine whether to broadcast a default version of the advertising content or a conditional version of the advertising content from the remote content airing station broadcasting the advertising content at the time of the broadcast.

In accordance with another embodiment of the described methods, the conditional dynamic content fields include one or more of: a conditional selector for one of the multiple versions of the advertising content based on a market size of the content airing station broadcasting the advertising content; a conditional selector for one of the multiple versions of the advertising content based on weather conditions at a geographic location of the content airing station broadcasting the advertising content; a conditional selector for one of the multiple versions of the advertising content based on audience source data for the content airing station broadcasting the advertising content; and a conditional selector for one of the multiple versions of the advertising content based on one or more stock market indices at the time of the broadcast of the advertising content.

In accordance with another embodiment of the described methods, transmitting the copy of the advertising content to the one or more remote content airing stations with scheduling instructions specifying broadcast parameters of the advertising content includes: uploading a copy of the advertising content from the system to a located one of remote content airing stations; issuing instructions to the remote content automation system to schedule the advertising content for broadcast based on the scheduling instructions; and in which the respective one of the remote content airing stations is to responsively broadcast the advertising content uploaded to its remote content automation system at a time defined by the scheduling instructions.

In accordance with another embodiment of the described methods, the system embodies a Synchronicity Platform system having at least the processor and the memory therein, the system having been configured by the instructions for implementing a direct-to-air management and audit platform for dynamic advertising content; and in which the system operates as cloud based on-demand service accessible to a plurality of subscribers via a public Internet.

In accordance with another embodiment of the described methods, managing the advertising content at the system on behalf of a plurality of customers includes: receiving the advertising content at a receive interface from any of an advertising agency, a radio network station, a radio network representing a group of radio stations, an advertising client, and/or a media spot buyer; and persistently storing the advertising content in a data store of the system.

In accordance with another embodiment, such a method further includes: receiving the advertising content at the system via a public Internet; receiving scheduling instructions and advertising content trafficking instructions with the received advertising content; and storing the advertising content, the scheduling instructions, and the advertising content trafficking instructions within a data store local to the system.

In accordance with another embodiment of the described methods, receiving the scheduling instructions and the advertising content trafficking instructions with the received advertising content includes: receiving instructions from a media buyer to traffic the advertising content to a plurality of the one or more remote content airing stations for broadcast at a time or times defined by the media buyer within the advertising content trafficking instructions received by the system.

In accordance with another embodiment of the described methods, each of the plurality of content airing stations includes one or more of: a radio station broadcaster; a radio station network representing a group of radio stations; an internet radio broadcaster; a television station broadcaster; and a television station network representing a group of television stations.

In accordance with another embodiment of the described methods, the advertising content includes one or more of: scripts to be read live on-air by a radio station broadcaster; scripts to be read live on-air by a television station broadcaster; scripts pre-recorded as stored audio for later broadcast by the radio station broadcaster or the television station broadcaster; jingles, sound effects, or audio recordings archived by the system as stored audio for later broadcast by the radio station broadcaster or the television station broadcaster; and sonic branding archived by the system as stored audio for later broadcast by the radio station broadcaster or the television station broadcaster.

In accordance with another embodiment of the described methods, the advertising content includes at least: scripted advertising content or pre-recorded audio advertising content to be broadcast by a radio station broadcaster or a television station broadcaster; and digitized multi-media for transmission to one or more remote computing devices via a public Internet concurrent with broadcast of the advertising content by the radio station broadcaster or the television station broadcaster.

In accordance with another embodiment of the described methods, the advertising content includes one or more of: a government notice; a government alert; a government emergency broadcast; or a school district alert; and in which the method further includes: monitoring one or more government sources for alerts and notifications; and trafficking the alerts and notifications to the one or more remote content airing stations in lieu of the advertising content for inclusion with the broadcast.

In accordance with another embodiment, there is a non-transitory computer readable storage media having instructions stored thereupon that, when executed by a processor of a system, the instructions cause the system to perform operations including: managing advertising content at the system on behalf of a plurality of customers; transmitting a copy of the advertising content to one or more remote content airing stations with scheduling instructions specifying broadcast parameters of the advertising content; in which the advertising content embodies one or more dynamic content fields to be resolved prior to broadcast of the advertising content from any of the one or more remote content airing stations; receiving an indication at the system from one of the remote content airing stations that the advertising content is to be broadcast; capturing a broadcast of the advertising content for analysis at the system; and validating the broadcast of the advertising content.

Figure 4B:
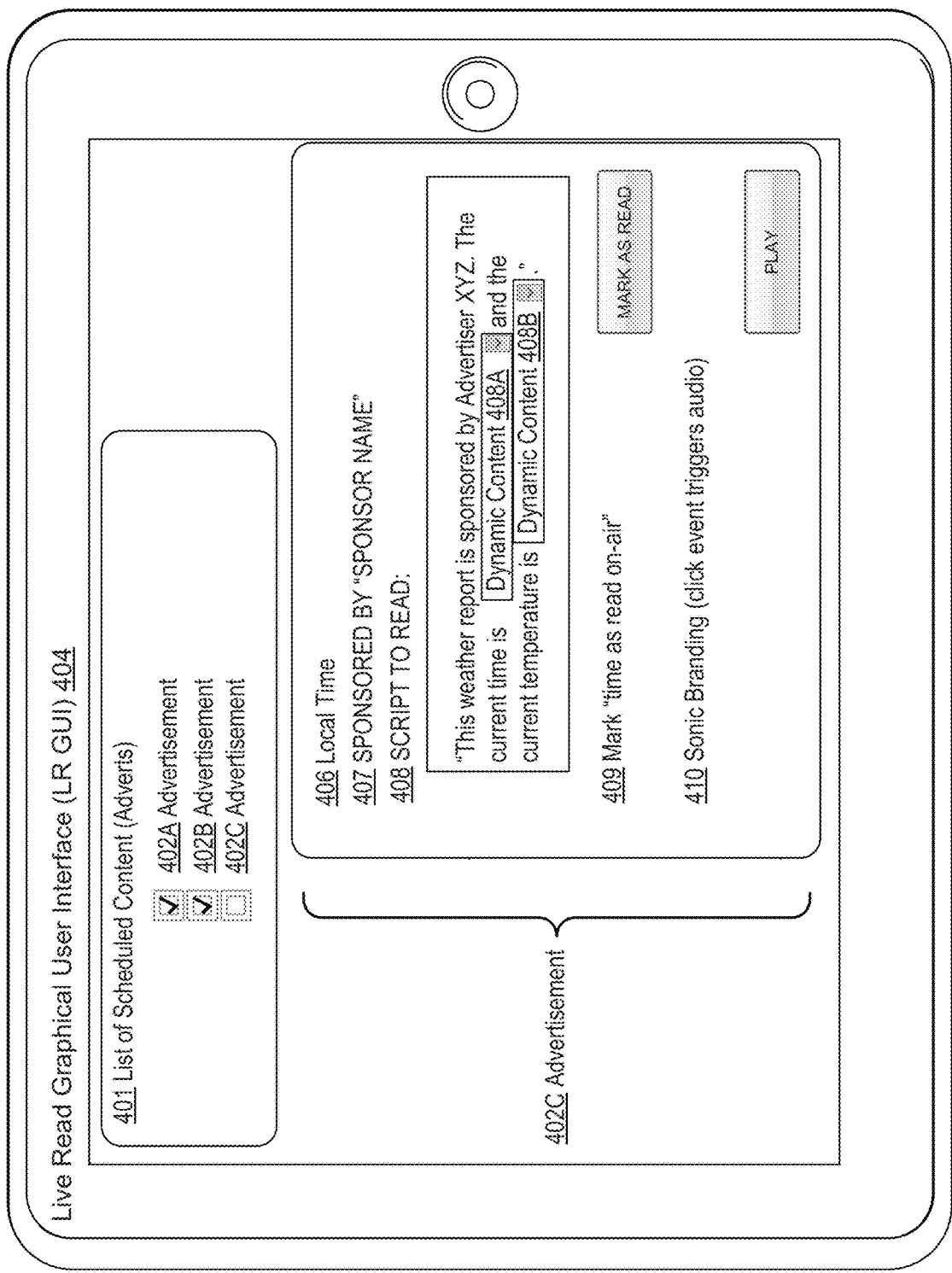
FIG. 4B depicts a Live Read Graphical User Interface (LR GUI) displayed to a user computing device with dynamic content, in accordance with described embodiments.

FIG. 4B depicts a Live Read Graphical User Interface (LR GUI) 404 displayed to a user computing device 499 with dynamic content, in accordance with described embodiments.

According to certain embodiments, on the advertisement production side, any time an advertiser creates a script, the author may add a placeholder within the script as a field. This field then populates from a library and is resolved as plain-text and written into the script, thus replacing the field within the script, at the time the script is to be read by the on-air talent.

Thus, if the time or temperature is to be read out as part of the script, this information simply cannot be known at the time the script is written weeks in advance. Therefore, the script to read at element 408 is created with one or more dynamic content fields, depicted here as dynamic fields 408A and 408B which are embedded into the script for determination later. Such dynamic content 408A-B permits elements of the dynamic script to be generated at the time it is to be read, replacing the placeholder field with the information fetched by the system. So for example, where the script reads "This weather report is sponsored by Advertiser XYZ. The current time is $ {TIME FIELD} . . . " and " . . . the current temperature is $ {TEMPERATURE FIELD} . . . " will be replaced by the system with the current time and temperature. For example, the system may replace the fields with the text "12:05 PM" and the "32 degrees," with such information then being written into the text of the script to be read out live on-air by the talent. Moreover, the dynamically populated script with the fetched information is then additionally saved in its plaintext format, without fields, so as to represent the actual script as read on-air and can thus be accounted for and audited. Therefore, if this advertisement is utilized multiple times, each auditable script will be different, assuming the time of day and temperature is distinct differs each time the dynamic script is utilized.

According to certain embodiments, the dynamic content elements 408A and 408B may be programmed via scripting parameters, such as $ {TIME FIELD} and $ {TEMPERATURE FIELD} as shown above, or the Live Read GUI 404 may provide drag and drop GUI elements, such as drop downs, via which the author of the script to read 408 then click the drop down to select the $ {TEMPERATURE FIELD} or the $ {TIME FIELD} or other available selections provided via a library. These dynamic content elements 408A and 408B are then resolved or determined just prior to the on-air talent reading the script. To be clear, the on-air talent does not see any dynamic field, nor do they need to know that dynamic fields are utilized. Rather, the plain text for the script to read is displayed to the on-air talent and is recorded for archival and auditability purposes as non-dynamic, plain text, subsequent to those dynamic content elements 408A and 408B having been resolved by the Synchronicity platform.

According to described embodiments, the sponsor script is shown in static form, regardless of whether the underlying script is the result of a static script or a dynamic script. Dynamic scripts are resolved by the Synchronicity platform and displayed to the on-air talent as a static script at the particular local content airing station. It is possible for every station in a station group to have a different variation of the same underlying dynamic script, with the Synchronicity platform generating the local static script for each station. For instance, the local temperature may be inserted as discussed above, or a local pricing scheme, or a local business name may be provided, and may be different depending on the market, etc.

Figure 5A:
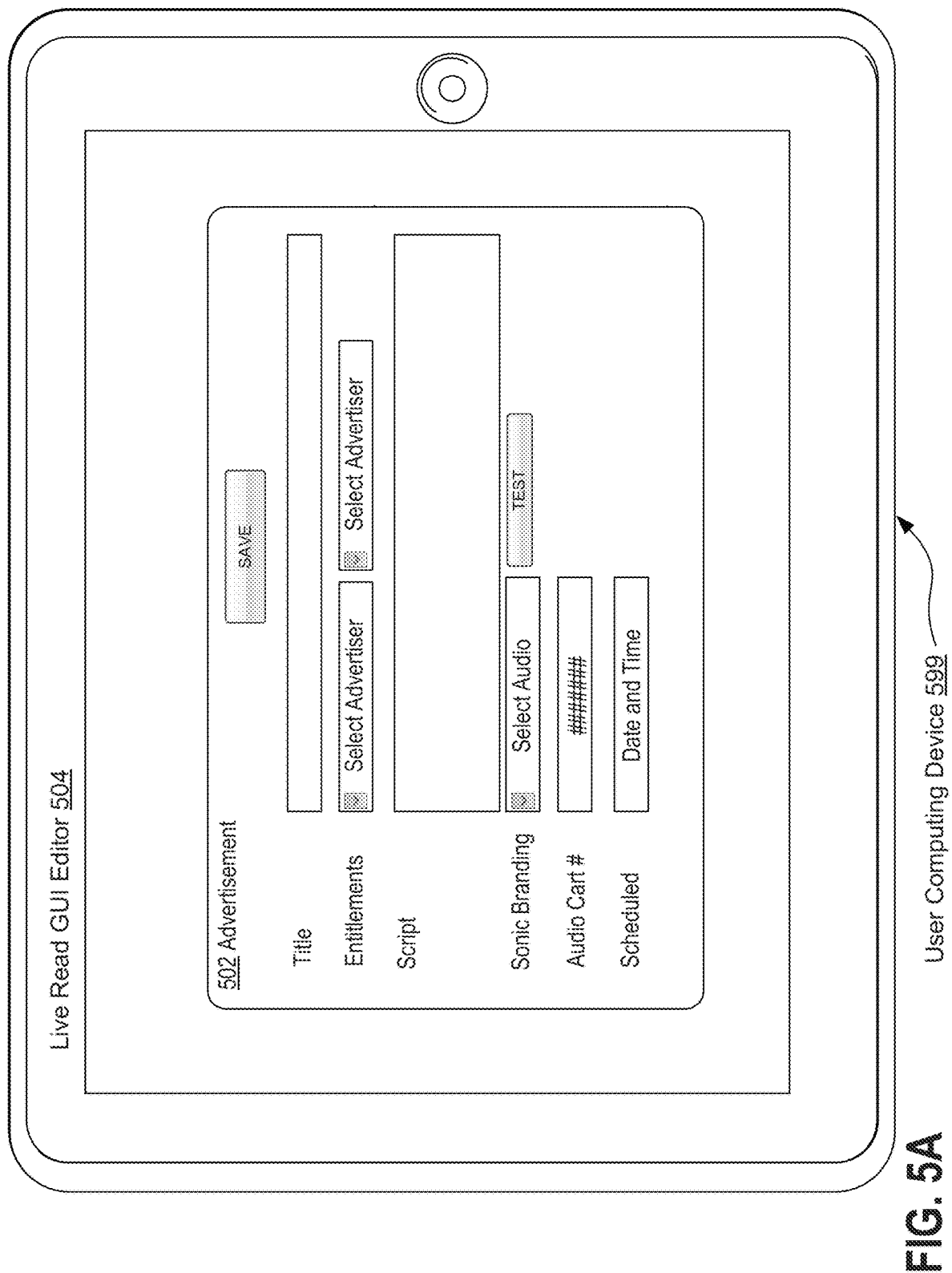
FIGS. 5A and 5B depict a Live Read GUI editor interface displayed to a user computing device and the optional use of conditional programming, in accordance with described embodiments.
Figure 5B:
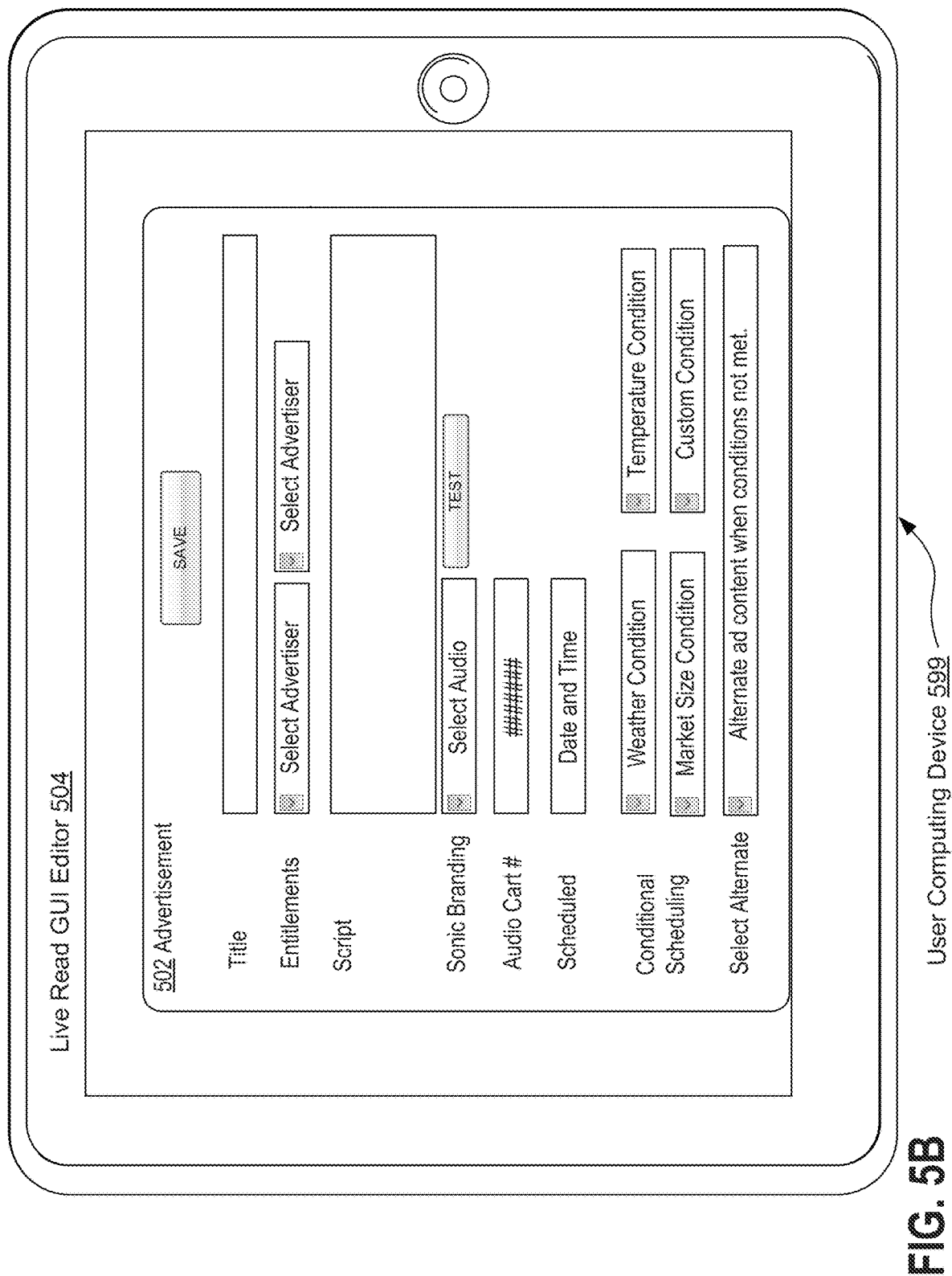

FIGS. 5A and 5B depict a Live Read GUI editor 504 interface displayed to a user computing device 599 and the optional use of conditional programming, in accordance with described embodiments.

Beginning with FIG. 5A, users may create advertisements utilizing the Live Read GUI editor 504 which is shown here as editing advertisement 502. There are included here, fields to enter a title, entitlement drop downs for one or more advertisers, a script to be read (which may incorporate dynamic content), a drop down to select audio for sonic branding (e.g., to play a jingle, etc.), a test button to play the selected audio during the advertisement editing phase, as well as an audio cart identifier field for the content and a scheduled date and time. Additional configuration fields may be added depending upon the implementation.

The dropdown elements will populate automatically based upon available objects and resources within a given folder or directory structure for the selected advertiser. Therefore, if the advertiser Dodge Ram is selected, then sonic branding options associated with that particular advertiser will be displayed as available for selection via the sonic branding drop down box depicted here.

With regard to FIG. 5B, it is additionally shown that users may create various conditions for scheduled advertising content, which are configurable through the Live Read GUI editor 504.

As shown here, there is now depicted in addition to the basic configuration options, certain conditional scheduling options, such as selecting weather conditions (e.g., rainy, cloudy, sunny, etc.), temperature conditions (e.g., above or below a specified temperature), market size conditions (e.g., market for this content airing station is above or below a specified market size), or custom conditions. There is further depicted a dropdown to select an alternative or default advertisement content or spot which is to be utilized in the event that conditions are otherwise not met.

For instance, it is therefore possible to create two different kinds of scripts to be read live via the on-air talent. For example, an advertiser may create a rainy day script and a sunny day script, and the content of the script that is to be read out on-air is different based on the weather, or some other unknown event which cannot be known in advance, but may be dynamically determined at the time the advertisement is scheduled for air. Thus, the display of the script to read (e.g., refer to element 408 of FIG. 4A) may be one of potentially several available conditional scripts to be read out on-air is decided by the system immediately before it is to be read, when the on-air talent initiates the on-air reading of the advertisement (e.g., by opening the ad for reading or by clicking a "click to read" button to initiate the display, etc.).

Such a decision point is made by selecting or specifying available configuration parameters in the production file via the Live Read GUI editor 504.

For example, the creator of the advertisement may utilize the Live Read GUI editor 504 to identify different scripts to be read in the event of varying weather conditions, such as rain, snow, cloudy, and sunny weather, etc. Each condition is defined based on, for example the station's geographically tied area which is then compared with the weather for that area, the temperature for that area, the market size for that area, or some other custom specified condition associated with the geographic area within which that content airing station resides.

For example, if market research reveals that audience numbers for a station are coming from long island, and yet the station is in Manhattan, then a market size condition may be specified or a market audience source condition may be custom configured, etc. Similarly, if the Stock market is up or down on the day at the time that the script is to be read, such a condition may be specified so as to select from amongst multiple available scripts. Such a decision point may be applied to any commercial or advertising spot which is stored by the Synchronicity platform and system, whether such content is pre-recorded or scripted for on-air talent reading at the time of broadcast.

Figure 6A:
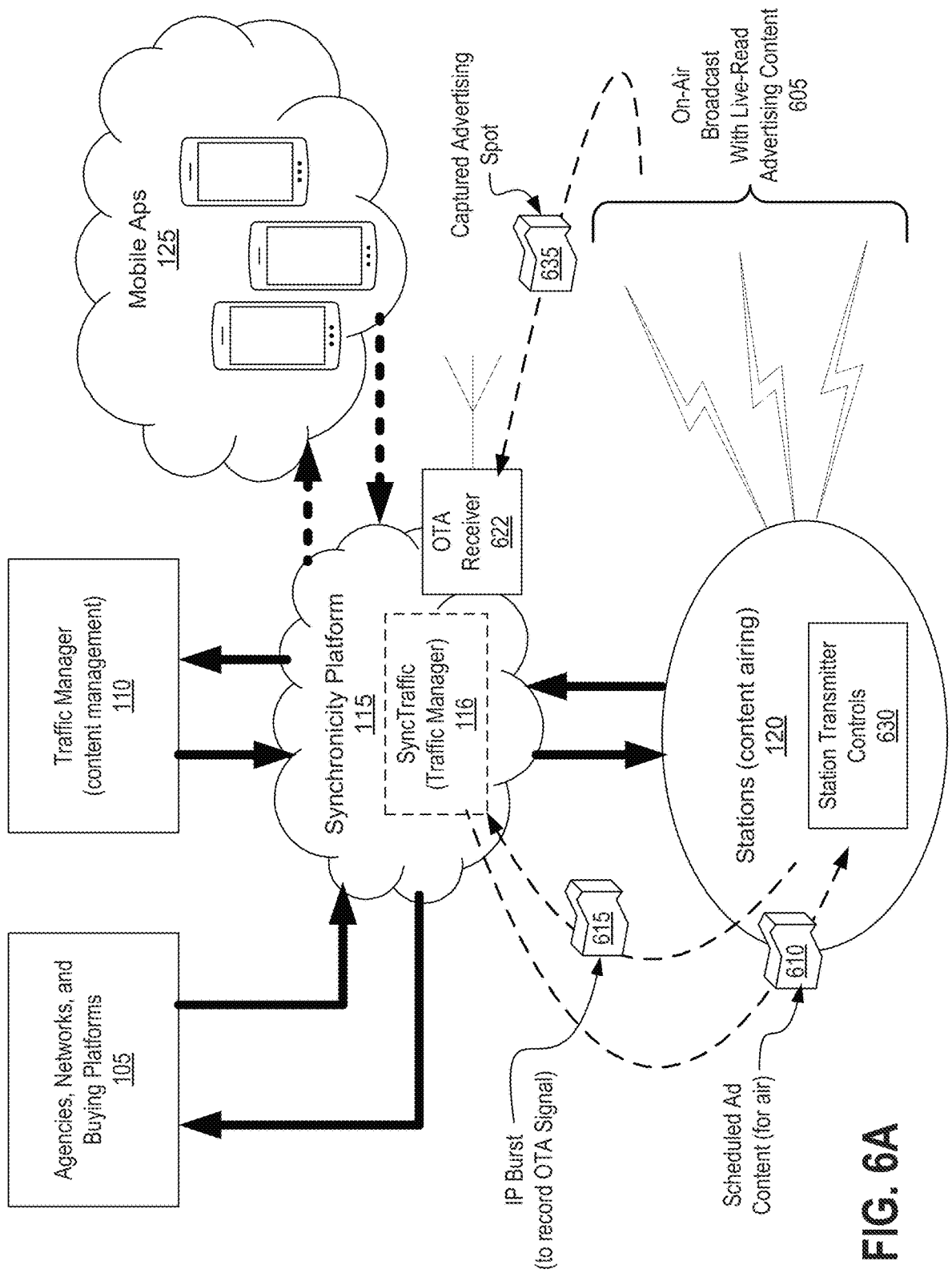
FIG. 6A depicts additional interactions between the synchronicity platform and the content airing stations, in accordance with described embodiments.

FIG. 6A depicts additional interactions between the Synchronicity platform 115 and the content airing stations 120.

In particular, the Synchronicity platform 115 may implement an Over The Air (OTA) receiver 622 via which to capture on-air broadcast signals within which the live read-advertising content 605 is embedded via the broadcast from the content airing stations. In such a way, the Synchronicity platform 115 may both schedule advertising content to be performed by the stations 120 and then capture the resulting advertising content as performed, played, and broadcast by the respective content airing stations.

According to a certain embodiment, the Synchronicity platform 115 first schedules ad content for air 610 by the content airing stations 120 and then listens for an IP burst signal 615 or message from the respective station 120 indicating to the Synchronicity platform 115 that particular scheduled advertising content is being broadcast, thus initiating the Synchronicity platform 115 to record the OTA signal via its OTA receiver 622 for the purposes of archival of the aired content, auditing, billing, and quality control. In alternative embodiments, an IP radio stream feed may be captured in addition to the OTA signal or as an alternative, or a local digitized feed from the station 120 may be captured at the station and then transmitted to the Synchronicity platform 115 as validation. However, recording the OTA signal with the embedded advertising content is considered a key validation mechanism since the control of the audio capture is independent from the control of the on-air broadcast 605.

According to a particular embodiment, when a scheduled ad content 610 is opened permitting viewing of the script to be read on-air, the IP burst may be automatically triggered, thus signaling via the IP burst 615 to the Synchronicity platform 115 that the advertising spot is about to be performed. In such a way, the Synchronicity platform 115 has a copy of the performed advertising content which is then archived and made available to the client via the dashboard for quality control, auditing, and verification operations.

In certain embodiments, a captured advertising spot 635 is further subjected to voice analysis via which speech to text transcribes the speak to text and then compares the captured and transcribed text with the scheduled script. Similarly, the Synchronicity platform 115 may analyze the recorded over the air audio validate and verify proof of play of the audio jingle or other specified sonic branding audio scheduled to be broadcast with the scheduled advertising content.

For example, scheduled ad content 610 is uploaded to the stations 120 from the Synchronicity platform 115 and ultimately broadcast by the stations 120 via the station transmitter controls 630 which plays or broadcasts the scheduled advertising content over the airwaves. The captured advertising spot 635 is then captured by the Synchronicity platform 115 and analyzed via the air check analyzer 640 to validate the script contents, the quality of the broadcast, the pronunciation, and other quality control parameters.

According to certain embodiments, the IP Burst 615 is configured as a signal, message, or indicator from a source computer (such as the content airing station) to a target computer, such as a server of the Synchronicity platform 115. For example, the IP burst may be pushed from a sync ad server to the computing device where the on-air talent's display is provided. While capable of providing for remote control of non-local machines, the Synchronicity platform 115 pre-configures the IP burst to transmit through multiple systems when activated, in accordance with certain embodiments. In such a way, a device which communicates with the Synchronicity platform 115 website or dashboard may transmit a message to the Synchronicity platform 115 pertaining to advertising content identified by a cart number which is then to be stored within the Synchronicity platform 115. Consequently, the advertising content is archived at the Synchronicity platform 115 and accessible via the Synchronicity platform's long-term storage archives.

Sending data in the reverse direction via IP burst functionality is additionally implemented in accordance with certain embodiments, for instance, to trigger and play the sonic branding audio which is associated with certain advertising content. For example, the advertising content when created via the Synchronicity platform 115 may be configured with a "play button" which has embedded metadata defining (e.g., by cart number), which audio source is to be played. Consequently, the play button will, responsive to a click event at the play button, transmit the cart number identifier from the computing device where the advertising script and play button is displayed to the on-air talent to synchronicity servers local to the content airing station, triggering the corresponding audio to be played through the soundboard of the station and then broadcast over the air live. The play button may be further configured to transmit, as part of the IP burst, a signal to the Synchronicity platform 115 servers remote from the station indicating a play button event has occurred at the station for the specified cart number, without transmitting the audio itself back to the Synchronicity platform 115, which should already have an exact digital copy.

According to a particular embodiment, the IP burst is configured transmit the cart number information and request to play the sonic branding audio directly to a pre-configured IP address and PORT, which then responsively plays over the station's soundboard, everything within identified cart number. The playback event, time, and associated information for the advertising content is then reconciled back to the Synchronicity platform 115 in real time to validate that the correct item was played and that it was played at the correct time. The hardware may further generate a specific log file that is immediately reported back to the Synchronicity platform 115 separately indicating what was played and how long the audio played (e.g., down to 3 decimal places) to confirm based on the length and the name.

Figure 6B:
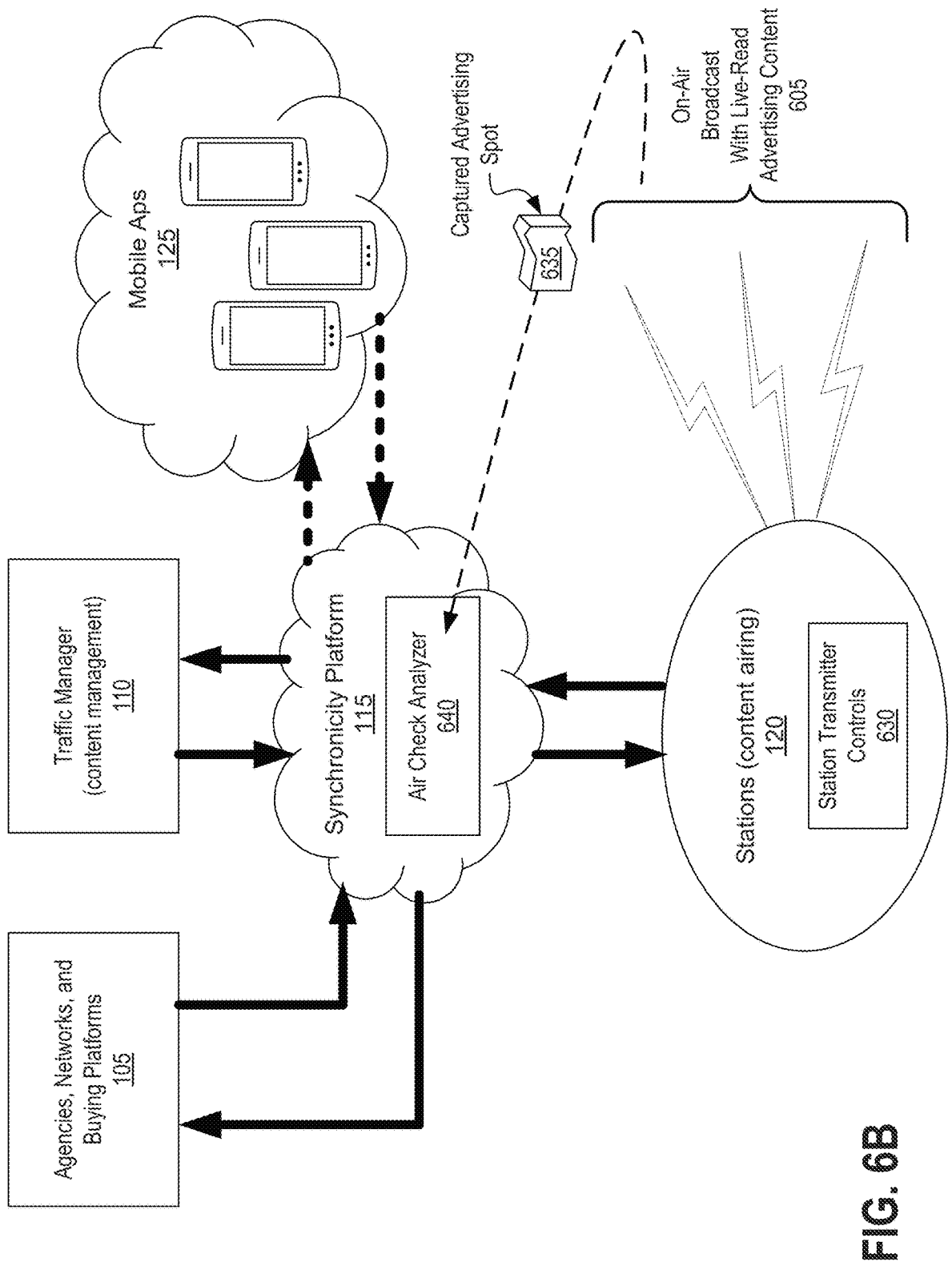
FIG. 6B depicts an air check analyzer at the Synchronicity platform utilized to analyze and validate captured advertising content broadcast by the stations, in accordance with described embodiments.

FIG. 6B depicts an air check analyzer at the Synchronicity platform 115 utilized to analyze and validate captured advertising content broadcast by the stations.

As depicted here, an air check analyzer at the Synchronicity platform 115 may be utilized to perform so-called "air checks" via which the Synchronicity platform 115 captures the advertising spot 635 and then subjects the captured spot to automated analysis or provides the captured advertising spot for manual analysis via the traffic management dashboard available to clients. For instance, all advertising spots may be subjected to analysis for the purpose of script comparison and audio comparison, however, advertisers may wish to check and verify that their brand-name or company name is being pronounced correctly, and thus, by clicking on a link for the captured spot at the traffic management dashboard, the advertiser, client, or other persons may play the captured spot and listen to the pronunciation of their name, listen to the reading of the script, listen to the jingle or other audio as broadcast, or perform some other quality review or validation scheme as they deem appropriate.

According to certain embodiments, the air check analyzer will trigger recording and capture of an advertising spot as upon a script being opened for viewing and thus ready to be read, resulting in a pre-buffer of audio leading into the advertising spot, and a configurable post-buffer after reading of the advertising spot, indicated based on the on-air talent clicking on the "mark as read" button. In other instances, a button to initiate performance of the advertisement is provided to the on-air talent, in which case the on-air talent clicks the "begin to read" button, and this click event thus triggers the start of recording. However, an automated system (e.g., recording when the script is displayed) may be the configured default so as to ensure that all advertising spots are recorded, regardless of any affirmative action by the on-air talent.

Such captured advertising spots 635 are then stored as part of the archival and made available to the client via the traffic dashboard for the sake of auditing, billing, historical reference, and so forth.

FIG. 6C depicts an alert generator 685 at the Synchronicity platform 115 which is utilized to dynamically create alerts for radio and television broadcast, in accordance with certain embodiments.

As depicted here, there is further shown at the Synchronicity platform 115, an alert generator 685 which communicates with various government notice systems on both a push and a pull basis to either receive or to monitor and retrieve various official alerts.

There are a variety of official government alert systems or Government Notice Systems 686 which include, for example, the Common Alerting Protocol (CAP) and associated systems, the Emergency Alert System (EAS), the Specific Area Message Encoding (SAME) alert system, the NOAA Weather Radio (NWR) alert system, the AMBER alert and child abduction emergency alerts systems, as well as a variety of local and state level alerting systems, such as school district alerts for weather and school closures, school emergencies, etc.

Problematically, not all of these systems manage to provide notice to their target audience. One problem is that certain systems, such as school closure notifications do not utilize the federal emergency alert systems and thus, many people who would benefit from the information in a local radio market may simply not be aware of the notice, unless they go to that specific school district website and check for the information.

Still other systems provide a text to speak read out which is pushed into a broadcast stream, but may not reach as great of an audience as is appropriate.

Yet another problem is that certain markets are of insufficient size to read out a text based notification received (e.g., over an AP wire or via alternative notification systems) and thus, the message may not be capable of being broadcast, whereas larger markets (such as Los Angeles or New York City) will have on-air talent available any time to provide the text based notice via spoken language over the air.

It is therefore in accordance with certain embodiment that the alert generator 685 at the Synchronicity platform 115 both pulls data from various alert systems (e.g., such as a web-retrieval or a database query to relevant government systems) and also monitors and receives data from government systems and other alert sources which push the alerts to the radio station.

Various conversions are then permissible to produce dynamically generated alerts 687 which are then scheduled and trafficked to the content airing stations 120. For instance, where on-air talent is available, the Synchronicity platform 115 may schedule the dynamically generated alerts 687 to be read live on-air (e.g., by scheduling as advertising content) in which case text based alerts are embedded into a script and prompted to the GUI of a computing device utilized by the on-air talent to be read. Where audio based alerts are retrieved, the Synchronicity platform 115 may utilize speech to text recognition to generate text which is then embedded into a script for on-air read out by the talent. Alternatively, audio messages received may be broadcast by embedding the dynamically generated alerts 687 into a sonic branding audio file and scheduling them to be broadcast or permitting the on-air talent to simply click the "play" clickable event to initiate the playback for broadcast.

Where on-air talent is not available, the broadcast may nevertheless be automated, in which case text based messages are provided within a script to be read via a computer synthesized voice for on-air broadcast or embedded within a sonic branding audio file for broadcast. Audio based alerts are simply embedded into a sonic branding audio file and then broadcast via an automatic scheduling rule which gives priority to official alerts, such as those listed above or other alerts white-listed by the Synchronicity platform 115 or the content airing station.

According to certain embodiments, time and temperature announcements are pre-scheduled on an iterative basis for a given content airing station using dynamic content fields, and the alerts are inserted into these time and temp fields for live on-air reads or are injected into sonic branding audio associated with time and temperature status updates already scheduled, effectively forcing the alert to be played out in addition to or in place of the time and temperature announcements for that content airing station.

FIG. 7 depicts an exemplary sponsor script access log, including a timestamp for the script at the time it is marked "performed," and timestamps for the sponsor script for every "Opened" and "Closed" event, including the person accessing the sponsor script.

Figure 8:
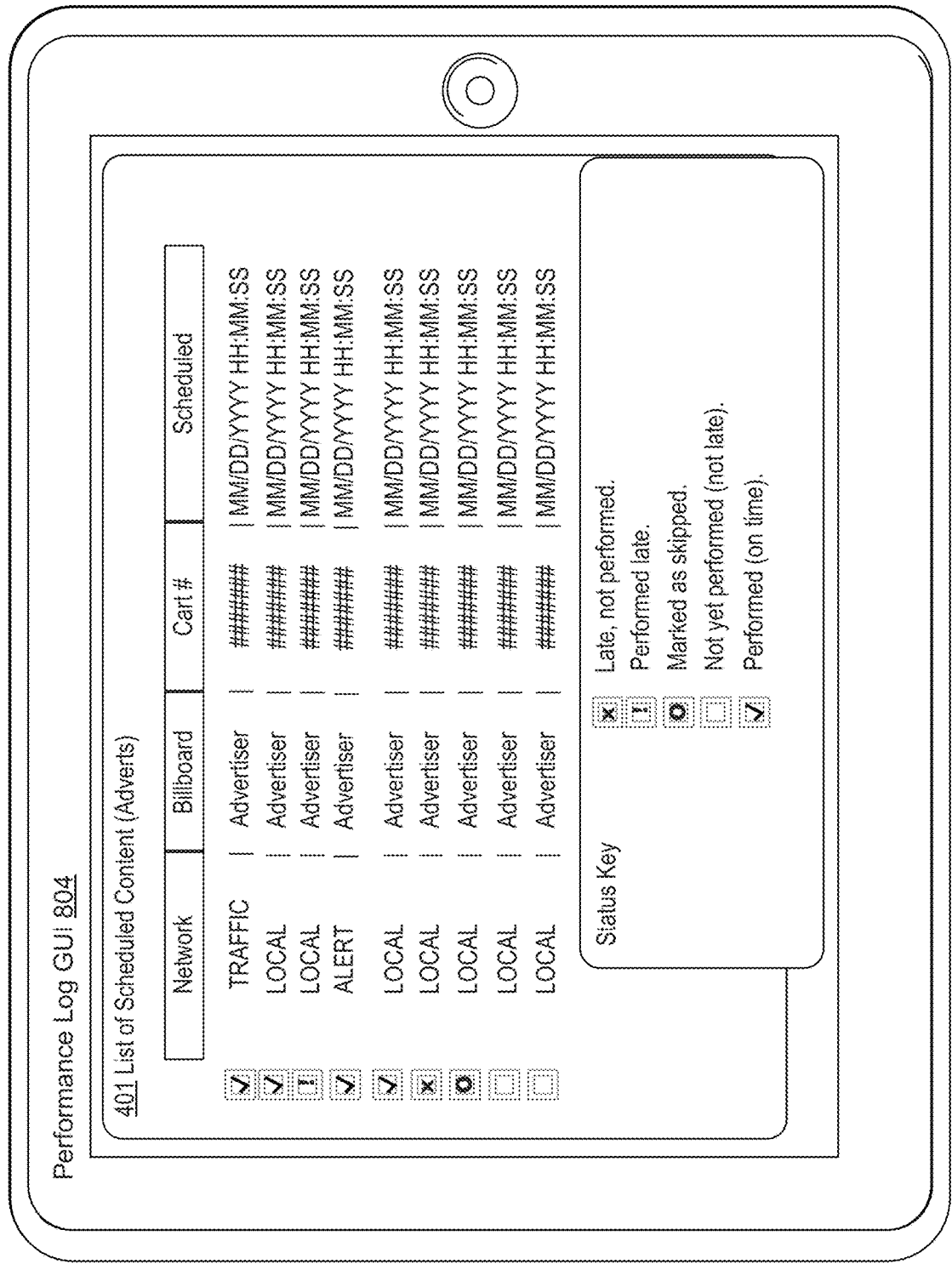
FIG. 8 depicts an exemplary sponsor script status log and status key, in accordance with described embodiments.

FIG. 8 depicts an exemplary sponsor script status log and status key, including those scripts "late, not performed," or "performed late," or "marked as skipped" or "not yet performed" or "performed (on time)," as displayed to the GUI 804 of the user computing device 899.

Figure 9:
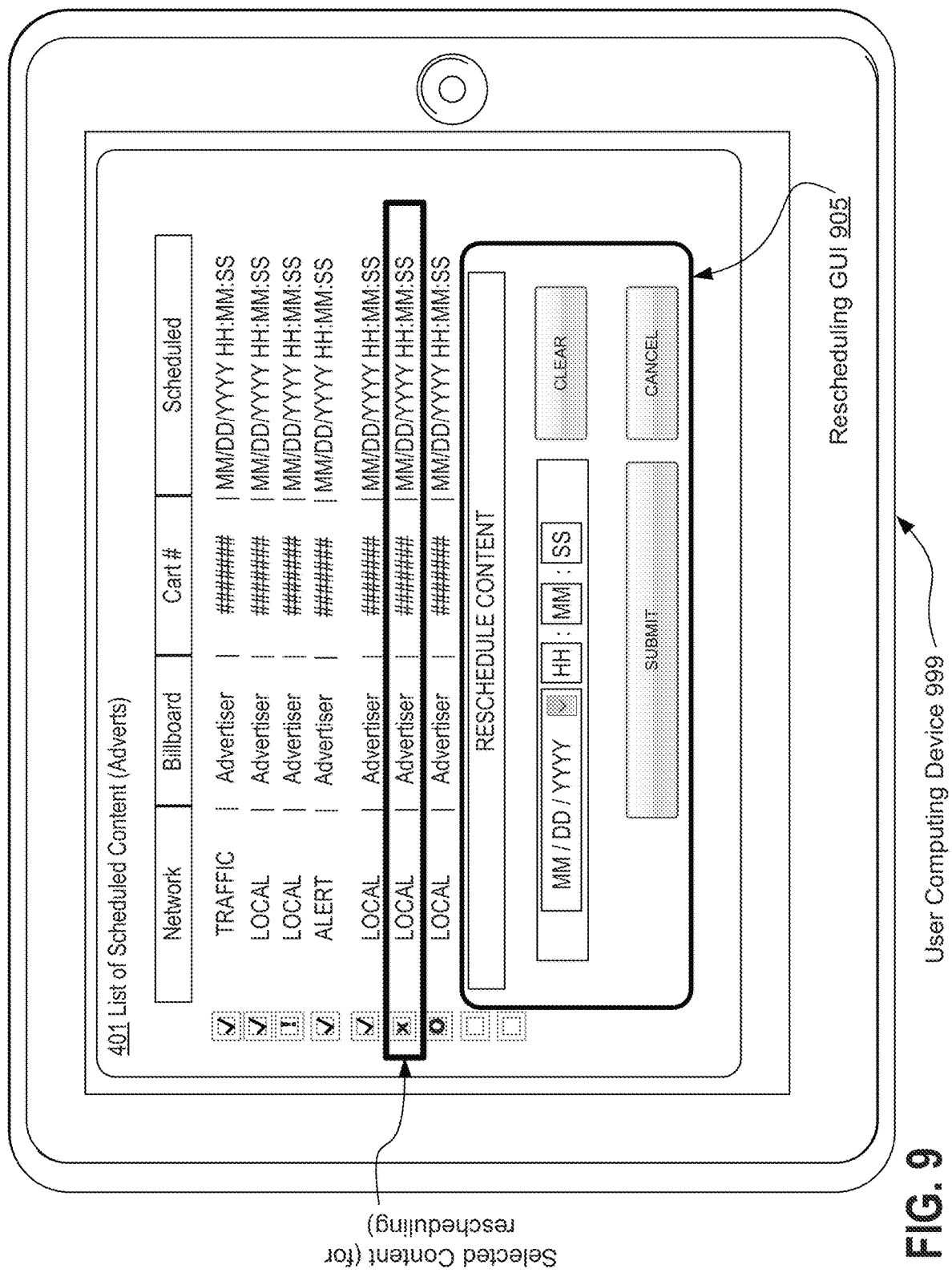
FIG. 9 depicts an exemplary reschedule GUI interface via which advertisers, station, traffic managers, etc., may reschedule an advertising spot, in accordance with described embodiments.

FIG. 9 depicts an exemplary Rescheduling GUI 905 interface via which advertisers, station, traffic managers, etc., may re-schedule an advertising spot, with such changes then being synchronized back to the Synchronicity platform dashboard available to the content advertiser, client, or ad agency, as appropriate. As shown here, a particular advertisement is selected for rescheduling and then the rescheduling GUI 905 is utilized to change the scheduled time for the trafficked advertising content at the user computing device 999.

Figure 10:
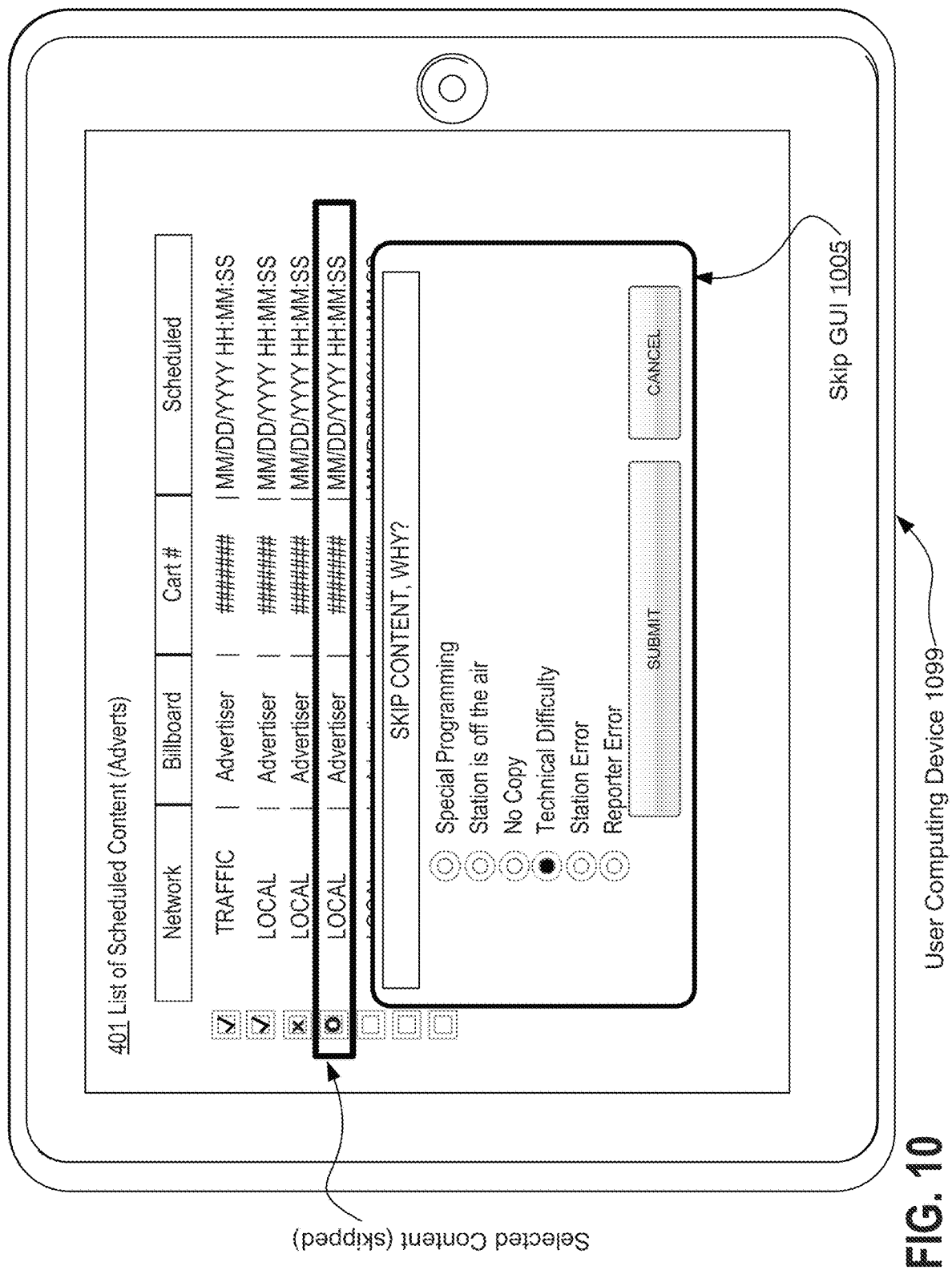
FIG. 10 depicts an exemplary skip GUI interface via which advertisers, station, traffic managers, etc., may enter the reason why an advertising spot was skipped, in accordance with described embodiments.

FIG. 10 depicts an exemplary skip GUI 1005 via which advertisers, station, traffic managers, etc., may enter the reason why an advertising spot was skipped or via which they may mark a previously scheduled advertisement to be skipped at the user computing device 1099. As shown here, the selected content was skipped and the skip GUI 1005 indicates the reason as "technical difficulty," with such detail then being synchronized back to the Synchronicity platform dashboard available to the content advertiser, client, or ad agency, as appropriate.

Figure 11:
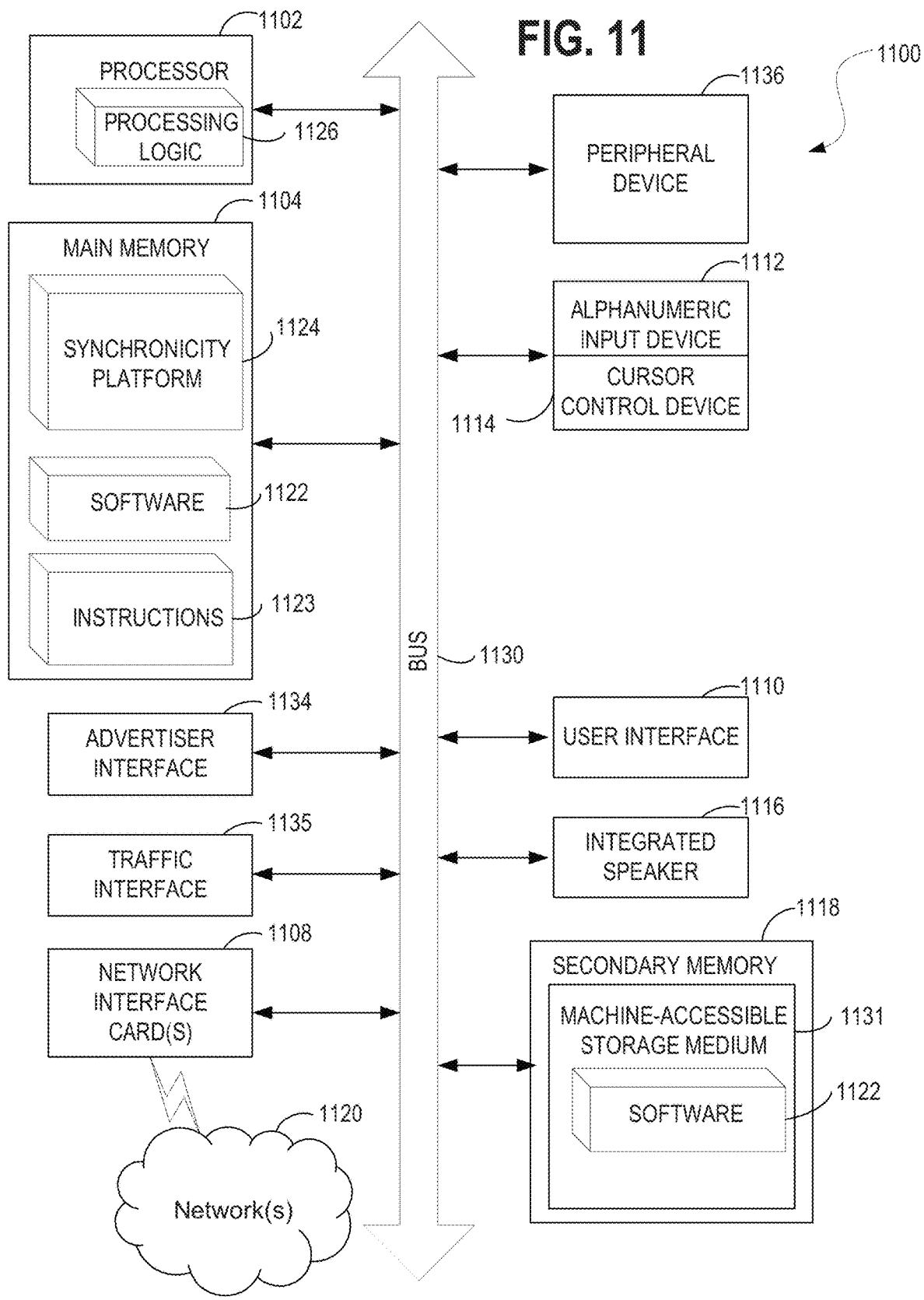
FIG. 11 illustrates a diagrammatic representation of a machine in the exemplary form of a computer system, in accordance with one embodiment.

FIG. 11 illustrates a diagrammatic representation of a machine 1100 in the exemplary form of a computer system, in accordance with one embodiment.

According to such an embodiment, the machine 1100 implements a set of instructions, for causing the machine 1100 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 1118, which communicate with each other via a bus 1130. Main memory 1104 includes information and instructions and software program components necessary for performing and executing the functions with respect to the various embodiments of the systems, methods for implementing a direct-to-air management and audit platform for dynamic advertising content as described herein. Instructions 1123 implement the above described functionality of the Synchronicity platform 1124 and are operable in conjunction with the advertiser interface 1134 and the traffic interface 1135 as described herein. Further interfaces are provided to broadcast stations and station groups as described above. Instructions 1123 may be stored within main memory 1104. Main memory 1104 and its sub-elements (e.g. instructions 1123 and the interface to the centralized Synchronicity platform 1124 which provides direct-to-air management and audit platform for dynamic advertising content are operable in conjunction with processing logic 1126 and/or software 1122 and processor 1102 to perform the methodologies discussed herein, each of which being operable in conjunction with the interfaces 1134 and 1135 to carry out the described functions.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which are discussed herein.

The computer system 1100 may further include one or more network interface cards 1108 to interface with the computer system 1100 with one or more networks 1120. The computer system 1100 also may include a user interface 1110 (such as a video display unit, a liquid crystal display (LCD), or a cathode ray tube (CRT)), an alphanumeric input device 1112 (e.g., a keyboard), a cursor control device 1114 (e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.). The computer system 1100 may perform the functions of determining and instructing a traffic signal to carry out the green lights activity and phase timings as determined by such a system 1000 as described herein.

The secondary memory 1118 may include a non-transitory machine-readable storage medium (or more specifically a non-transitory machine-accessible storage medium) 1131 on which is stored one or more sets of instructions (e.g., software 1122) embodying any one or more of the methodologies or functions described herein. Software 1122 may also reside, or alternatively reside within main memory 1104, and may further reside completely or at least partially within the processor 1102 during execution thereof by the computer system 1100, the main memory 1104 and the processor 1102 also constituting machine-readable storage media. The software 1122 may further be transmitted or received over a network 1120 via the network interface card 1108.

For instance, there is a particular embodiment of such a system, in which the system includes at least, a processor; a memory to execute instructions; a traffic manager to manage advertising content at the system on behalf of a plurality of customers; a receive interface to receive the advertising content; a persistent data store to store the received advertising content; a network transmitter to transmit a copy of the advertising content to one or more remote content airing stations with scheduling instructions specifying broadcast parameters of the advertising content; in which the advertising content embodies one or more dynamic content fields to be resolved prior to broadcast of the advertising content from any of the one or more remote content airing stations; in which the receive interface is to further receive an indication at the system from one of the remote content airing stations that the advertising content is to be broadcast; an air check analyzer to capture a broadcast of the advertising content for analysis at the system; and in which the air check analyzer further is to validate the broadcast of the advertising content.

In accordance with a particular embodiment, such an exemplary system or machine includes: a memory to store instructions; a processor to execute the instructions stored in the memory; in which the instructions implement a broadcast integration platform to synchronize interactive content with a broadcast transmission; in which the processor is to execute the instructions to cause the system to perform operations including: receiving a request from a user device for presentation of a broadcast transmission, in which the user device is to receive the broadcast transmission via a local tuner; transmitting a source location for the broadcast transmission from the broadcast integration platform to the user device; transmitting to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device; instructing the user device to compute a local offset for the broadcast transmission by determining a latency delay between the current position for the broadcast transmission according to the broadcast offset and the local current position for the broadcast transmission according to the display of the broadcast transmission at the user device; synchronizing presentation of the media content objects with the display of the broadcast transmission at the user device by instructing the local tuner to temporally align the presentation of the media content objects with the display of the broadcast transmission based on the time-point triggers for the media content objects using the local offset; and instructing the user device to overlay the presentation of the media content objects over the display of the broadcast transmission at the user device at a time defined by each of the time-point triggers.

Figure 12:
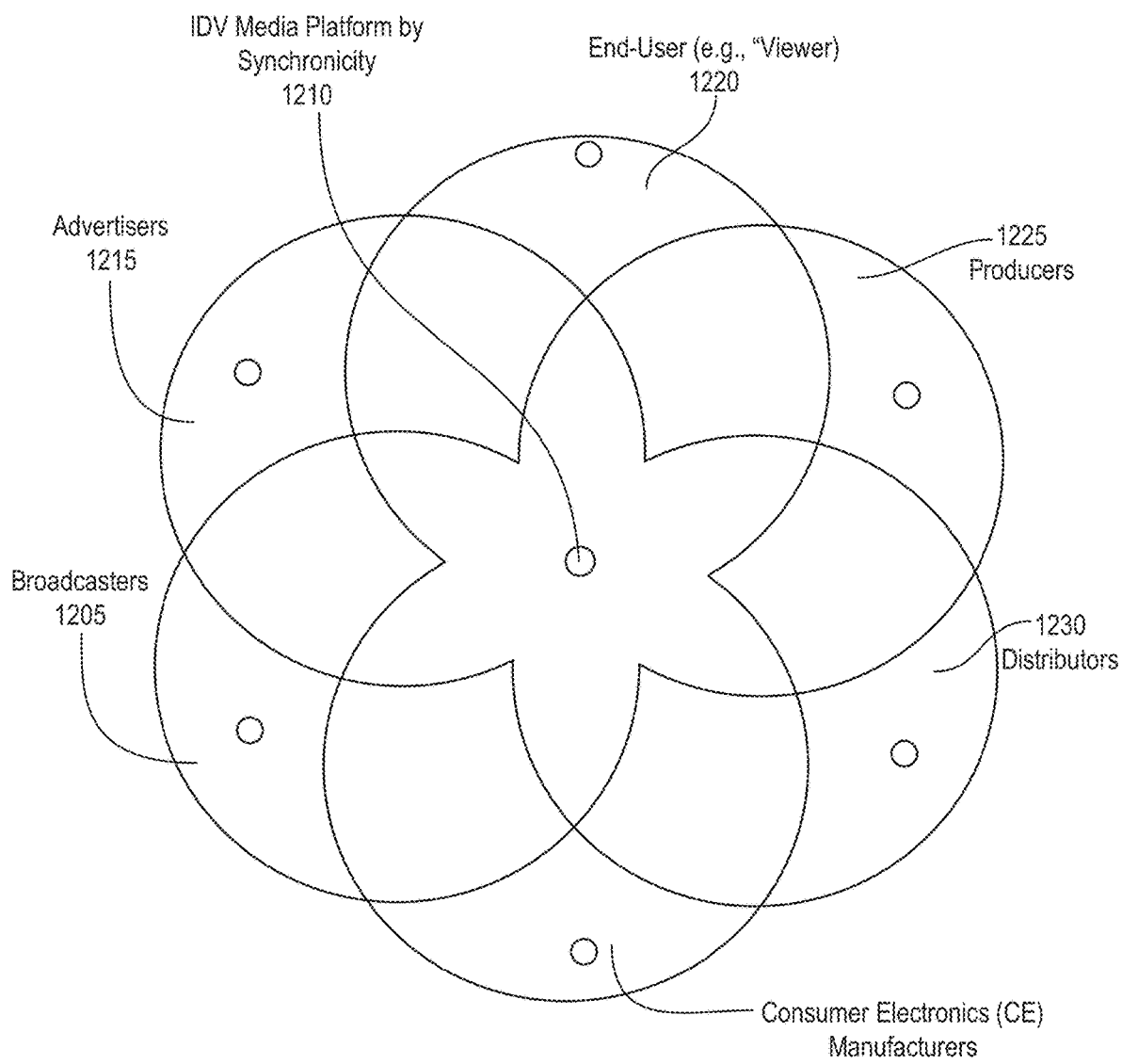
FIG. 12 depicts an exemplary Intelligent Dynamic Virtual Media (IDVM) support architecture, in accordance with described embodiments.

FIG. 12 depicts an exemplary Intelligent Dynamic Virtual Media (IDVM) support architecture, in accordance with described embodiments.

Intelligent Dynamic Virtual Media (also referred to as IDVM and IDVMedia) and supporting SpotMagic Technologies enable a wide array of capabilities in support of dynamic content distribution and content publication synchronization, including content distribution tied to an interactive user experience which is synchronized in time with dynamic contribution by the IDVM platform and supporting technologies.

As can be seen here, the IDVMedia platform by Synchronicity 1210 sits at the intersection or overlapping region shared multiple industry stakeholders, including advertisers 1215, end-users ("viewers") 1220, producers 1225, distributors 1230, Consumer Electronics (CE) manufacturers, and broadcasters 1205.

According to described embodiments, the IDVM platform provides an intelligent content creation toolset in support of media production studios, advertising agencies, television and radio networks, traditional print and Web publishers, all of whom have a pressing and ongoing need to quickly create, approve, distribute, track and reproduce media of all types.

To accomplish such tasks utilizing conventional techniques, parties at every step of the process struggle to deal with an expensive and complex maze of incompatible technologies. Conversely, the IDVM platform provides the industry with a simple, efficient, and easily accessible way to create, manage, and distribute the various media types required in support of this content, and further provides the necessary distribution networks and media devices which are specially configured to work cooperatively and efficiently with future proof support.

For instance, the IDVM platform's technology is designed to displace the collection of incompatible file and streaming media types and replaces the "document model" utilizing conventional hypertext Internet content structure. These conventional technologies are replaced with a revolutionary new form of intelligent Web 3.0 HYPERMEDIA, having supporting hypermedia composer tools which merge multiple applications of the IDVMedia technology into one simple to use package which is ideally suited for large-scale creation and deployment of both online and offline interactive hypermedia content.

The IDVM platform's software tools and methodologies further are configured to bridge to legacy systems and object types, thus providing backward compatibility to legacy systems and content with the new IDVM platform's Web 3.0 environment which is described herein.

Further still, the IDVM platform overcomes the limitations of conventional first and second generation Internet solutions by implementing a single universal framework for media content of any type needing to be acquired, indexed, archived, organized, composed, distributed, and/or reproduced, all of which occurs within a very secure and highly automated, self-managing environment.

According to described embodiments, the IDVM platform utilizes objects that, when connected through IP (Internet Protocol) networks, the objects synergistically cooperate to form an intelligent, self-managing "Hypermedia Environment," which, when in use, yields as much as an 80% reduction in the cost of creating, managing and reproducing multiple media content which is attained through a drastic reduction in complexity which thus reduces total man-hours and labor costs associated with any task supported by the IDVM platform.

According to related embodiments, the IDVM platform further provides a content creation toolset, through which the IDVMedia supporting architecture merges multiple applications of within the IDVM platform and technology suite into one simple to implement, feature-rich package, ideally suited for large-scale creation and deployment of both on and offline interactive media.

The IDVM platform provides software applications and utilizes unique methodologies to overcome the limitations of conventional solutions by providing one universal framework for media content of any type to be acquired, indexed, archived, organized, composed, distributed, and reproduced within a secure and automated groupware environment. For instance, the IDVM platform and applications are designed to bridge legacy systems and object types to create one seamless cost-efficient platform for all media creators and consumers which thus provides a complete and end-to-end solution capable of supporting both new object types and conventional legacy systems and associated content.

The IDVM platform thus permits users to produce once and distribute anywhere. Because the IDVM platform's IDVMedia content (e.g., objects) are adaptable to any form of distribution, such as Internet, private network, broadcast, satellite or physical media, it is possible to create one production which in of itself, embodies multiple versions of content; languages, dynamic linkages, media formats, or content where access needs to be controlled by user characteristic, time or physical location. With dynamic intelligent IDVMedia objects, it is no longer required to "re-author" content. Rather, the IDVM platform permits content produces to simply update individual objects. The associated IDVMedia Composer application and content management system thus significantly reduces the expenditure of time, effort and money, which in turn reduces cost. Through the use of the IDVM platform, it is therefore possible for media producers and distributors across the globe to instantly create, view, annotate and distribute content with the click of a mouse.

The IDVM platform further supports content creation via the IDVMedia Composer application, providing solutions for automation-assisted live and off-line media creation, which operates within a shared secure workspace for collaborative creation of content. The IDVM platform's unique object centric IDVMedia authoring thus streamlines localization tasks by creating multiple versions for redaction or restricted access via a highly simplified and thus more expedient process.

Further supported by the IDVM platform are interactive multiple purposed hypermedia, including, for example, Audio (Radio like) and Visual (TV like) interactive media, as well as dynamically linked hypermedia, data, code and applications.

Content Management: The IDVM platform supports Media Management, including custom featured client and server software, which permits users to organize and control the secure sharing of all media assets among a variety of applications and users.

Distribution: The IDVM platform supports SpotMedia "TimeServices" which enables distribution management, and support of content servers, including support of live broadcast, real-time broadcast, near-real-time broadcasts, time-synchronized user-interactive experiences, as well as time-shifted and on-demand distribution. For example, the IDVM platform supports the ability to synchronize applications and content with other dynamic media, including, for example, broadcast TV or radio, CD or DVD, live telephonic conversations or IVR applications, text messaging and digital signage, etc.

Reproduction: The IDVM platform supports the IDVMedia Compositing Engine (e.g., the IDVM SpotTuner application), providing an intelligent media playing client. The IDVMedia Compositing Engine software is designed for operation on a desktop PC display screen, a tablet screen, a smartphone screen, as well as compatibility with set top boxes and other audio, video and mobile devices. The IDVMedia technology thus ensures that every media consumer receives the same high quality, zero latency user experience, without the latency induced frustrations associated with conventional technologies resulting in the "click-&-wait" user experience, commonly associated with prior technologies. In such a way, the IDVM platform enables a rich HD, better-than-broadband look and sound. Further still, the IDVM platform manages dynamically linked content, providing context sensitive, demographic, application and OS state-aware while automatically controlling content access down to the object level at each individual user device, target group, geographic location or time.

Scalability: The IDVM platform thus ensures that every user experiences the same high quality instantaneous connected synchronous experience without regard to the number of users connected, quality of bandwidth or the number of channels simultaneously accessed, while delivering an obsolescence proof investment to content creators, capable of adapting to future and unknown forms of media, distribution, and end devices, all of which are easily accommodated by the IDVM platform. The IDVM platform delivers all the tools and building blocks needed to rapidly prototype, complete, and manage interactive, digital audio and video Web 3.0 hypermedia, and to build, test and modify custom Web Service applications. The IDVMedia Suite of technologies also provides the two things are that are critically important to solution developers: (1) Trouble-free integration with existing systems and technologies and (2) The ability to quickly adapt to change and easily scale. The IDVMedia platform technology is therefore uniquely adapted to enable connections to many network transports, media types, code objects and hardware in use today, and those presently being developed for the future. The IDVMedia platform simplifies creation of those connections through its unifying intelligent object architecture. Such unification enables the rapid assembly of combinations of content, legacy technologies and hardware with IDVMedia acting as the "glue" necessary to provide a cohesive and comprehensive development environment and consistent user experience.

Interactive Gaming and MediaSync: The IDVMedia platform further provides MediaSync capabilities, which enable content produces to connect television content broadcasts to reality, thus providing a unique interactive simulcast broadcasting system that tightly synchronizes multimedia interactive content and advertising playing on PC or mobile device screens with broadcast programming. The IDVMedia platform's Media Sync technology enables content creators to create 2nd screen play-along games, add-ons for sports statistics and instant replays, DVD-like rerun audience enhancements and to add extra scenes and narrative to documentaries.

The IDVMedia platform thus enables Internet delivered, custom branded, interactive companion content and single or multi-player games that are in perfect sync for every second of live broadcasts across multiple time zones. MediaSync simulcasting works with all network, satellite, cable and even syndicated broadcasts. The IDVMedia platform 2ndScreen technology operates in compatibility with Tivo, DVR and On-Demand programming platforms as well as OTA network broadcast and satellite broadcasts. The IDVMedia platform further provides content creators with the ability to synchronize multiple languages or local affiliate branded geographically selective versions of companion content with zip code accurate, customizable interactive content and advertising. In such a way, low cost reliable scalability capable of supporting millions of simultaneous viewers is provided while maintaining such a high level of synchronization to the broadcast that user's cannot perceive any disconnect or "lag" or "latency" between the broadcast and the user experience and content distributors cannot perceive any noticeable time difference between the broadcast of differently branded versions of the broadcast, different language-localized versions of the broadcast, or different distribution channels for the broadcast.

Stated differently, a user watching a broadcast over network OTA television will experience the same portion of the broadcast at the same time as will a different user watching the broadcast via a satellite distribution channel. Similarly, a user watching a broadcast language localized for Spanish will experience the same content at the same time as well a user watching the broadcast having been language localized for English, or French, or German, etc. While small time delays may be inconsequential on many platforms, any timing delay exhibited for content which is tied to an interactive user experience, such as trivia questions about the content or sports-betting associated with the content, can become problematic and detrimental to the user experience and are likely unacceptable to the content producer, as such time differences could potentially be exploited by nefarious users for cheating and fraud.

Content: The IDVMedia platform provides a content creation application permitting content creators to go from script-to-screen with a mouse click using the IDVMedia platform's MediaSync high-speed automated fast and powerful groupware, networked, no code writing, point and click desktop broadcasting production environment which utilizes unique content security features. Producers utilizing the IDVMedia platform's MediaSync application therefore have total creative freedom to mix, match and overlay any type of video, graphic, animation, text and sound elements. Game look and feel and UI functionality created via the IDVMedia platform are dynamic and can be changed at any time without "re-authoring" and without requiring user installation of new components. Such dynamic components can even be carried out and distributed during a live broadcast. The IDVMedia platform's MediaSync application thus enables fast production with no creative limits, delivering a completely plastic UI giving content creators the freedom to seamlessly change UI functions or shape the during a broadcast, permitting content creators to launch or close multiple objects, syndicate scenes to other shows and distribute live broadcast content as ad-on components for web pages.

Playback: The IDVMedia platform provides users with a one-click quick-install which installs the out-of-the-browser MediaSync engine at the client device, which is required only once, no matter how many different independently branded shows or channels are viewed at that client device. The IDVMedia platform's MediaSync technology ensures that every viewer receives the same high quality, zero latency, user experience with a rich DVD-like, better than broadband look and sound.

Figure 13:
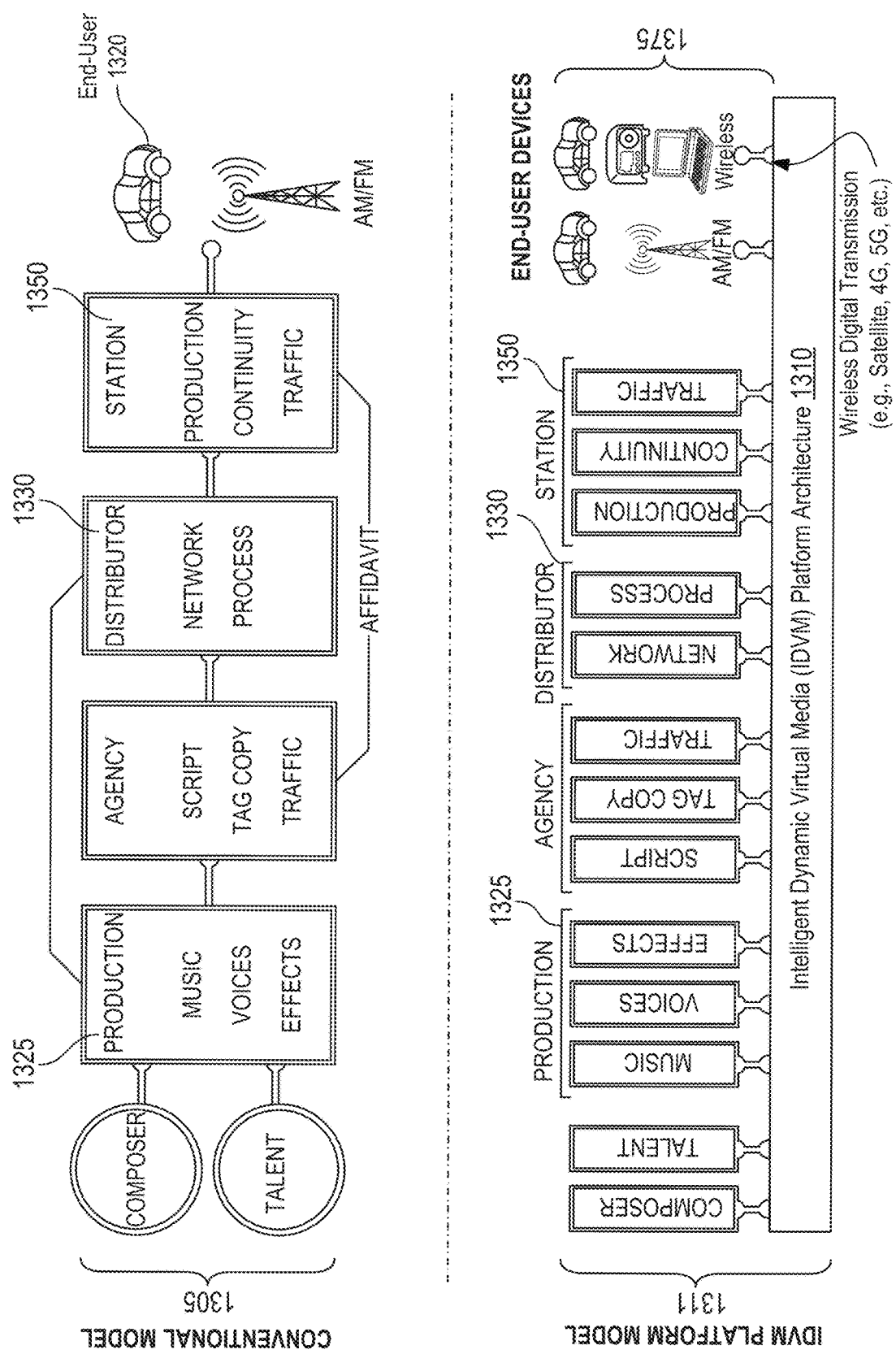
FIG. 13 depicts a comparison of a conventional model with that of the Intelligent Dynamic Virtual Media (IDVM) platform model, in accordance with described embodiments.

FIG. 13 depicts a comparison of a conventional model with that of the Intelligent Dynamic Virtual Media (IDVM) platform model, in accordance with described embodiments.

As can be seen here, with the conventional model, there is, in effect, a pipeline of required stakeholders that any content created by the depicted composers and talent must pass through before reaching consumers, end-users 1320, or a broadcast. For instance, depicted here on the left of the conventional model 1305 are the composer and talent which feed into production 1325 of music, voices, and effects, the output of which is then fed into an agency which provides script support, tag copies, and trafficking services as well as being fed into the distributor 1330 which provides the network and operational processes. The distributor's output feeds to the station 1350 which provides production, continuity, and additional trafficking services, and which returns affidavits back to the agency confirming broadcasts in compliance with contract terms. At the station, the content is ultimately broadcast to end-users 1320, for instance, via radio broadcasts. Alternatively, content may be broadcast to consumers via OTA network broadcasts, satellite broadcasts, etc.

Conversely, the IDVM platform model 1311 enables all industry stakeholders to provide input directly to the Intelligent Dynamic Virtual Media (IDVM) platform architecture 1310. Thus, as is depicted here, composers and talent feed into the IDVM platform architecture, as does the output of production 1325 (e.g., music, voices, effects), as does the agency stakeholders (e.g., providing support for script, tag copies, and traffic) as does the distributors 1330 (e.g., network and process support) as does the station 1350 (e.g., providing production, continuity and traffic support) and with the IDVM platform architecture 1310 ultimately facilitating broadcast to end user devices 1375 such as PC, smartphone, tablet, radio, television, satellite, etc. Such transmission may be over conventional broadcast spectrum, such as the AM/FM spectrum or via broadcast "network" Over the Air (OTA) spectrum or alternatively via digital wireless transmission modes, such as Satellite, 4G, 5G, etc.

The IDVM platform and associated SpotMedia Services provides an immediate competitive advantage to users of the platform derived from its innovative applications constructed using the SpotMagic IDVMedia (Intelligent, Dynamic, Virtual, Media) rapid development tools. The IDVM platform provides a system with network-aware intelligent media objects and software applications that, when connected through IP networks, synergistically cooperate to form the self-managing Synchronicity environment. The IDVM platform brings to the marketplace the most advanced, flexible, secure and productive system for creating and managing media in use today.

The IDVM platform enables dramatic reductions in the time and cost associated with media management in complex production and broadcast situations and facilitates bridging media and metadata maintained in legacy formats would otherwise require conversion to new forms for distribution over new pathways for reproduction on new devices. The IDVM platform thus enables clients to reach new audiences in new ways to produce new revenue streams, while significantly reducing operating expenses through its open architecture of the IDVMedia platform technology which ensures such compelling advantages will continue into the future, even as new media formats and distribution pathways are adopted.

According to certain embodiments, the IDVMedia platform and associated applications provide methods to dynamically create localized and personalized programming, which adds value for both advertisers and consumers. For example, certain supported objects are given Zip+4 localization or demographic and psychographic characteristics, which are then self-assembled via the IDVM platform, assembling themselves into complete shows at the designated Synchronicity Server or player that match the target characteristics. Rather than broadcasting one single generic content stream to one single large generic national network audience, advertisers can now easily tailor their messages to appeal to smaller audience segments, presenting programming and content that is much more focused and effective, without being forced to record multiple separate content streams for distribution, as the objects may be localized and configured at a sub-level and then assembled into cohesive end project at the point of consumption or at the appropriate station broadcaster. In such a way, IDVM platform's dynamic and virtual nature simplifies the addition of features to media content that are otherwise impracticable or uneconomic using conventional techniques. For instance, including multiple language tracks, captions, formatting a show for aspect ratio or editing to restricted access to certain content, become an effortless process that doesn't require re-editing of the original material since the individual media components can even be shared across multiple shows without duplication. Extraction, re-formatting or replacement of specific media components can be automated within enabled devices, such as the supported Synchronicity Media Servers which are physically co-located, configured, and installed at Radio stations and cable system head-ends to play out custom formatted programming.

System intelligence: The IDVMedia platform's tools produce multiple media productions which are composed of self-contained intelligent objects with characteristics that allow a show to self-assemble into a broadcast ready finished product, with such self-assembly functioning autonomously without outside management. In IP network environments, the IDVMedia platform's "intelligence" resides within the media objects and the client node meta-media rendering engine (such as at the Synchronicity Servers or device application) rather than being located at a central server node. Individual IDVMedia platform objects are further encoded with their own intelligence insomuch that each IDVMedia platform object "knows" precisely when and where it should render itself and be transformed into consumable media and further knows how it should operate relative to other IDVMedia platform objects. Stated differently, the IDVMedia platform objects are encoded with metadata describing their relationships to other objects, unique object identifiers, as well as classification parameters which permit them to be queried for, retrieved, and utilized in the self-assembly process in the formation of a finished broadcast ready content product for immediate distribution, with such self-assembly occurring only the fly on an as needed basis. The IDVMedia platform's object architecture thus allows true plug-and-play scalability with minimal administrative overhead.

Dynamic IDVMedia objects: The IDVMedia platform's objects further have the ability to instantly change any of their characteristics in response to internal or external influences without disturbing other components of a production. In effect, individual elements of a SpotMedia show, content package, commercial, or some other broadcast product have the power to "re-author" themselves. These changes can be made even while a show is in the process of assembling itself and playing out. This feature allows the IDVMedia platform's shows and broadcasts to automatically customize themselves for a particular location, time of day, user input or any other variable the creator establishes. For instance, commercials placed in programming on the Synchronicity platform can be dynamically customized based on the location of each Synchronicity Media Server, based on changes in local store inventory, based on the time of day or local weather conditions, all without manual administrative intervention.

Virtualized production release: The IDVMedia platform's design enables the capability of maintaining original media components and their desired playout form and function in separate dynamic structures which are then self-assembled into a virtualized production release at the time they are needed, such as moments prior to broadcast. For example, unlike conventional video production where a show becomes a single monolithic unit frozen at the time when it is prepared for broadcast (edited and rendered), SpotMedia shows remain aggregates of the smaller IDVMedia platform's units or objects, each of which represent some aspect or component of picture, sound, graphic and text elements and instructions, until the Synchronicity Media Server or device software player allows them to self-assemble and be rendered into their final form at the time and place designated for playing out.

Security: The IDVMedia platform's security model does not rely on network permissions or traditional device level security methods. Instead, the virtual nature of IDVMedia objects allows for a simple and effective alternative. For instance, according to certain embodiments, the IDVMedia platform's objects can only be reproduced by an IDVMedia rendering engine. Unless permission is expressly granted by the key settings within an IDV object and its related objects, the media component will not be re-created by the IDVMedia rendering engine. Effectively the object cannot be self-assembled and thus cannot be brought into existence except and unless the object is being assembled by the permitted target or group of IDVMedia enabled devices.

Editing or extraction of any component of SpotMedia content can only be done with the explicit consent of the intellectual property (IP) owner. Such permissions are granted through an automated process of setting permission "keys" which are encrypted into each media object, scene, sequence and show by the IP owner at the time of creation. For instance, unless the edit key is open, a locked object can only be changed or incorporated into another SpotMedia production by the originating (IP) owner. The characteristics of the permission keys are flexible can be arranged to allow or restrict access ranging from a single unique IDVMedia device up to multiple selected groups of designated devices.

In such a way, even if a party has all of the required IDVMedia objects for a particular show or broadcast, they still cannot render the show into viewable or consumable form without the keys and requisite permissions. Further still, even if those keys are acquired, they may be revoked or updated dynamically via a check-in process which can be optionally configured. For example, some content may be configured to never check in, other content may always check in prior to self-assembly, and other content may be configured to periodically check in based on a configurable schedule determined by the IP owner.

Figure 14:
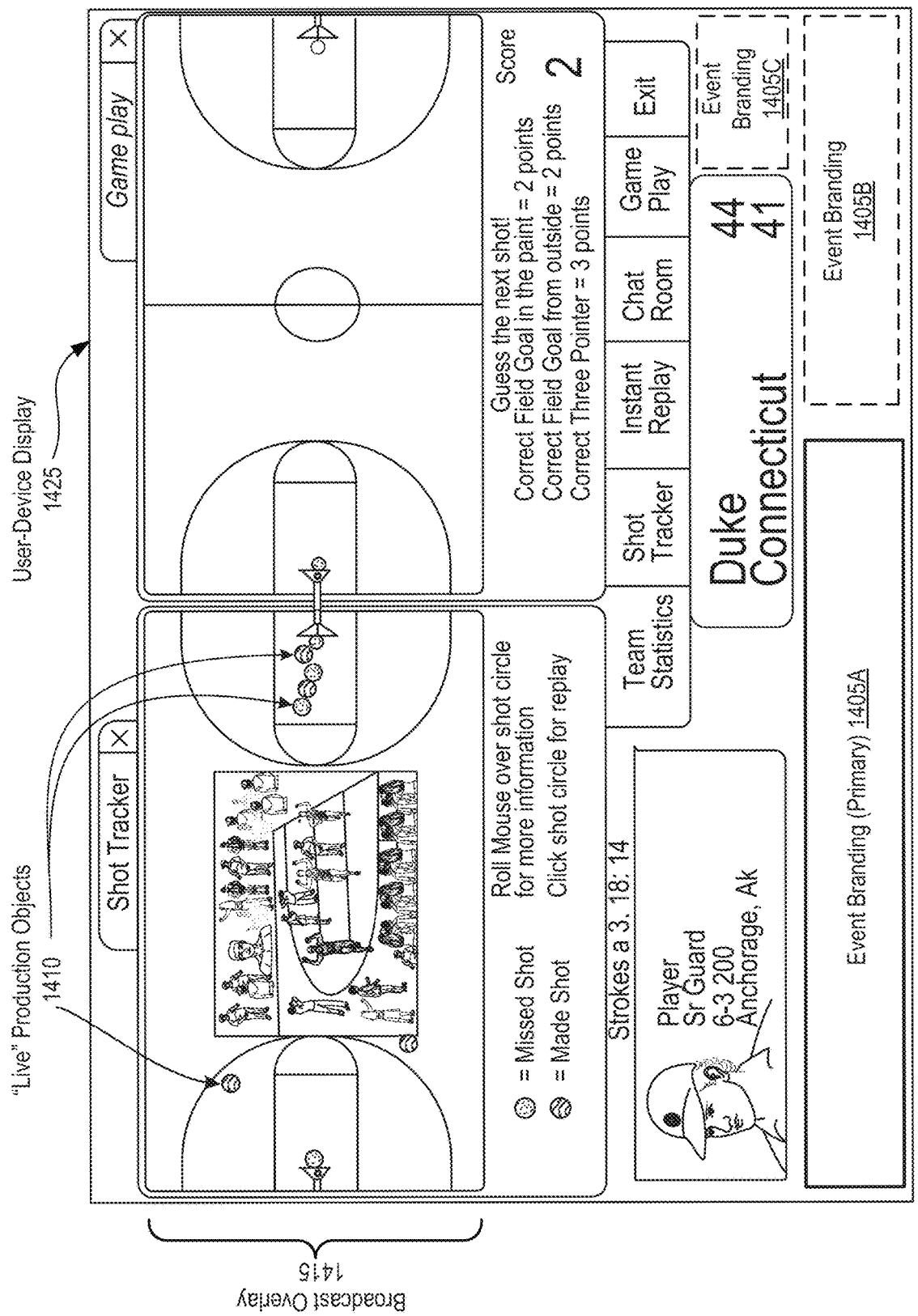
FIG. 14 depicts an exemplary interactive live-sports gaming interface utilizing the Intelligent Dynamic Virtual Media (IDVM) platform, in accordance with described embodiments.

FIG. 14 depicts an exemplary interactive live-sports gaming interface utilizing the Intelligent Dynamic Virtual Media (IDVM) platform, in accordance with described embodiments.

As shown here, there is a live sports broadcast overlay 1415 upon a user display device 1425 within which a user may interact with "live" production objects 1410. Branding 1405A and 1405B may display the logos of teams, sponsors/content hosts, broadcast channels, sports organizations, etc. such as the Chicago Bulls, Yahoo!, CBS Sports, and the NCAA, respectively. Even branding 1405C may display a logo for the event such as a Final Four basketball tournament or Celebrity Jeopardy.

According to various embodiments, the different branding areas may be sold or allocated to different advertisers. For instance, the larger "primary" branding area 1405 may be reserved for a sponsor or allocated to a higher-tiered advertiser, such as an advertiser for a national advertising campaign, while the smaller branding areas 1405B and 1405C may be allocated to lower-tier advertisers, such as a local or regional advertiser.

For example, live interactive or so-called "prop-bet" gaming applications produced and supported by Synchronicity's IDVMedia platform permits home viewers and other participants to play against other viewers for points, link to and discuss the live broadcast via interactive social media platforms, trigger instant re-plays of the sports action from the broadcast point of view or from a different perspective which is supported and accessible via the IDVMedia platform's content distribution platform but which was not part of the original broadcast, and in certain embodiments, participants and viewers may place bets through a licensed and legal book-maker affiliated with the sporting event or some other broadcast event, such as a game show, etc.

Synchronization: The IDVMedia platform's synchronization capabilities are attuned to the mantra that time is money in commercial broadcasting. Time is the only thing that broadcasters have to sell and therefore, one of the most critical requirements in a broadcast distribution system is accurate timekeeping. Programs must start and stop at precisely scheduled times and commercials must play at the proper time and for exactly the number of seconds that were paid for by the advertiser. Timekeeping in the Synchronicity IDVMedia platform is a function of the SpotTimeServer which acts as the master clock for all IDVMedia enabled objects and devices. According to certain embodiments, individual IDVMedia objects refer to the SpotTimeServer to set their individual internal clocks and therefore know when to assemble themselves into the desired presentation. Any IDVMedia object can achieve and maintain precise synchronization with any other IDVMedia object anywhere on the Synchronicity Network. This ability provides a key benefit which enables the IDVMedia platform's SpotMedia Services to offer its live syndicated Radio and Television distribution service, real-time dynamic commercial insertion and other advanced features, including interactive gaming, live sports betting, etc.

For example, sports betting generally describes the activity of predicting sports results and placing a wager on the outcome. The types and frequency of sports bet that people bet on varies by culture. For example, there is a large and well-established sports betting industry associated with association football (known as "soccer" in the USA), American football, basketball, baseball, hockey, track cycling, auto racing, mixed martial arts, and boxing at both the amateur and professional levels. Sports betting also extends to non-athletic events, such as reality show contests and political elections, and non-human contests such as horse racing, greyhound racing, etc. Sports betting websites and bookmakers often permit wagers for entertainment events such as the Grammy Awards, the Oscars, and the Emmy Awards.

Generally speaking, sports bettors place their wagers through a legal and licensed bookmaker/sportsbook, although it is widely understood that an illegal marketplace also exists. The term "book" is a reference to the books used by wagebrokers to track wagers, payouts, and debts. Many legal sportsbooks are found online, operated over the Internet from jurisdictions separate from the clients they serve, often to get around various gambling laws (such as the Unlawful Internet Gambling Enforcement Act of 2006 in the United States) in select markets, such as Las Vegas, Nev., or on gambling cruises through self-serve kiosks. Bookmakers take bets "up-front", meaning the bettor must pay the sportsbook before placing the bet.

The IDVMedia platform in conjunction with the Synchronicity services extends the types of activities upon which bets may be placed as well as the channels and venues through which such sports betting may occur. The IDVMedia platform further enables non-betting activities, such as gaming competitions for points, prizes, rewards etc.

With conventional broadcast technologies, the time of a broadcast may be known generally, but not precisely. For example, a television tuned to a quiz show or sporting event via a cable network broadcast may be several seconds off-set from another television tuned to the identical quiz show or sporting event via, for example, a satellite broadcast.

This latency, lag, or general lack of time-consistency for a broadcast makes any competitive gaming and certain betting for money wholly infeasible as the system's time inconsistency could be fraudulently exploited.

For example, if players are watching a trivia game show such as Jeopardy and are required to enter their submission for points prior to the correct answer (or "question" in the nomenclature of the Jeopardy show) being broadcast, then a player who receives the broadcast a few seconds early via one distribution channel could then enter their submission through a different broadcast channel which is occurring slightly later in time.

Stated more simply, a person watching Jeopardy on cable may see the answer, and then cheat and enter that information as a valid and timely submission through an interface for Satellite broadcasts which can be several seconds behind, thus giving the person an obvious ill-gained advantage. While such nefarious actions may be considered "cheating" in the context of a game-show or trivia game being played for points, the same activity occurring with respect to sports betting for actual monetary instruments (e.g., such as U.S. dollars, gaming credits, crypto-currency, etc.) would constitute financial fraud.

It is therefore imperative that all participants receive the same content at exactly the same time, regardless of the distribution channel, be that satellite, OTA network broadcasts, cable broadcasts, or Internet broadcasts to smart phones, PCs, and tablets, etc. Because the IDVMedia platform's synchronization capabilities permits broadcast content to be rendered to an end-point within extremely tight time constraints (e.g., within milliseconds), it is thus possible to provide sports betting services and other online gaming services for broadcast content with a user interactive component (e.g., placing bets or entering quiz show answers, etc.). Conventional solutions simply cannot be relied upon to be time-consistent and therefore, it is not possible to engage in such gaming and sports betting activities when utilizing conventional broadcast mechanisms, a reality which is borne out by the marketplace's utter lack of such services associated with broadcast television and other broadcast content.

According to certain embodiments, the IDVMedia platform's synchronization capabilities define how broadcast content presentations are timed to be displayed to an end device as well as the timing for how broadcast content presentations interact with users and viewers of the broadcast content. For example, there may be a narrow window of time that a user may submit an answer, enter a bet, select an answer, etc., and this timing is synchronized across all display channels, regardless of how the user receives the broadcast content presentation (e.g., regardless of whether the content is received via OTA network broadcast, cable, internet, satellite, etc.).

According to particular embodiments, there is a server-side time server which operates as a master-clock for any presentation being played anywhere and at any time, via the IDVMedia platform.

The time server operates in conjunction with a player pursuant to configurations created with the composer tool via the IDVMedia platform. For example, a game show with an interactive component for viewers is created via the composer tool and played back utilizing the same engine utilized for the composer tool, albeit through a different UI. The same rendering engine is therefore utilized on a tablet, phone, desktop, etc., and because the content was created using the composer's engine and now rendered and played back using the same engine, the missing "time" element is thus fulfilled via the IDVMedia platform's synchronization capabilities, which leverages the time-server.

According to a particular embodiment, the rendering engine pings the time server and says "this viewer wants to watch show xyz," and the time server then responds with the master time. The time server also responds with not just the master time, but also with a time-stamp of where in time that viewer should be. For example, the show may already be in progress, so the time server may respond and say that in 5 seconds, the rendering engine should begin at 2:14 seconds (e.g., two minutes and 14 seconds into the current broadcast presentation).

With the time-stamp returned to the tuner, the tuner then knows that it is 2:14 into the exemplary broadcast presentation and then looks forward in time knowing that it needs to begin playing the presentation in 5 seconds, and it will pre-cache all the necessary elements needed, such as sound, language localization, video, dynamic sub-elements of the video, etc.

The tuner which renders the broadcast at the local display device additionally pings the time server iteratively while it is building (e.g., self-assembling) the broadcast in preparation for display and through multiple iterations, the tuner refines its exact time by assessing a latency between the tuner and the time-server until the tuner establishes a "time 0," and thus comes into extreme synchronization with the time server, regardless of what the latency on the network may be.

Additionally, the tuner performing the actual local rendering of the broadcast content presentation will continue to iteratively ping the time-server, even after the time 0 is established and the broadcast is displayed in accordance with the appropriate synchronization as defined and controlled by the time-server's responses of the master time. Stated differently, after the show begins, the tuner continues to ping the time server and continues to assess the latency on the network because network latency drifts and changes over time and is outside of the control of the time-server and outside of the control of the tuner. Through this continual synchronization and latency assessment, the time server and tuner of the IDVMedia platform can ensure that the broadcast remains synchronized.

It is important to ensure that broadcasts are synchronized when there is a user interactive component because user interactions are only permitted during a defined period of time, for instance, before an answer is given on the broadcast, and then locked out, prohibiting user submissions after the answer has been given. If different broadcast channels result in different non-synchronized timing, then it would be possible for users to exploit the time difference and cheat, thus degrading the user experience for other non-cheating participants.

In the event that there are active sports betting or other financial wagers being placed and transacted, then the opportunity for financial exploitation becomes a problem in the event broadcasts are not synchronized. However, if the broadcasts are synchronized, then the cut-off for user submissions will occur at the same synchronized time, regardless of the distribution channel.

In practice, synchronization has been measured to fall within 0 to 12 milliseconds across different distribution channels.

Broadcast Production Platform: According to another embodiment, the IDVMedia platform provides a suite of associated IDVMedia applications which bridge legacy analog and digital broadcasting with native IDVMedia methodologies, incorporating processes for creating and managing SpotMedia content and for distributing that content over IP networks, reproducing the content in the formats required for legacy transmission and reproducing Synchronicity content on consumer devices. The IDVMedia/Synchronicity platform is designed to significantly increase the efficiency and dependability of media production and distribution by utilizing IDVMedia intelligence, rather than relying on increased transport bandwidth and server administrative complexity. The Synchronicity platform is extremely productive because it converts the current serial order of procedures for media creation and distribution into a much more efficient and dynamic parallel system, in which any workflow process is accessible at any time and from anyplace.

Such a framework gives key professionals within the process chain unprecedented direct and instantaneous control over all aspects of their broadcast management responsibilities. Advertisers can place, alter, and monitor the playout of campaigns in real-time while program syndicators can localize and insert or replace program elements on a second by second basis to suit their individualized needs. Program producers are liberated from repetitive tasks and have exceptional creative freedom.

Network enhancements: The IDVMedia platform further provides a dramatic reduction in the cost of production and distribution of programming by using a unified intelligent network methodology which simplifies and automates techniques like localizing voice tracks and demographic-based commercial insertion. The IDVMedia platform enables a broadcast to be locally captured, including local capture of live shows, for the sake of further editing, archiving, rebroadcast or AOD/VOD services. The IDVMedia platform further automatically creates commercial-free versions for subscription services, or inserts new inventory into archived shows for rebroadcast. The IDVMedia platform's object's permit mix and match any digital media types to be configured and built (or self-assembled once configured) into a limitless variety of concurrent and separate audio/video tracks. For example, content produces may create alternate language broadcasts, produce content which key off the insertion of different content objects to be inserted into content for distribution through machine control and cue tones, thus providing backward compatibility with legacy automation systems.

The IDVMedia platform permits scalable broadcasting to millions of simultaneous IDVMedia enabled devices without unicast or multicast streaming while maintaining the flexible object-based media creation and distribution methodology.

The IDVMedia platform's SpotMedia programs are controlled and recorded using the Synchronicity Director application, the output of which is a broadcast log and a set of IDVMedia objects; sequences (sml), show files (sms), scene files (smf), and media objects (idv). The Synchronicity Director application further interfaces with legacy automation systems or may optionally be used in a manual "live" mode, when needed.

All IDVMedia program components are automatically forward cached by Synchronicity Servers or enabled devices prior to the scheduled broadcast time. Simulcast programming is accessed by Synchronicity consumer devices by referring to a local affiliate's merged Synchronicity broadcast log, which maintains affiliate branding within a designated signal area. The Synchronicity Server output is either switched directly to a transmitter in automated mode or fed to a mixing board for automated, manual assist or manual control by a local Board Op.

With conventional systems, a content producer may create a dozen different pieces, such as audio, video, guitar lines, reverb, drum beats, etc., all of which the content creator has aligned in time, applied appropriate volumes and effects, and then ultimately, once the content producer has the pieces arranged satisfactorily, the content producer will then "build" or "render" the final product, creating a monolithic and finalized product.

However, with the IDVMedia platform, the objects are kept separate and stored as individual objects, and each has metadata added to them describing their sequencing and timing, and relationship to the other components, etc.

Because all of those bits and pieces are never mixed together, when the content producer hits compose or render or build, all the files have metadata encoded into them, relating them to one another with appropriate timing, relationships to master scenes, definitions of where localization changes may be introduced, where the sub-objects are located within a display space, or what audio or video they are supposed to play, what sequence and at what time they are to play that media, etc.

Next, when the content received at a display location, then the various components will self-assemble based on their relationships and based on various localization rules, demographic rules, subscription rules, etc.

For example, the same content being played in Los Angeles would play an English audio track whereas the content being played in Spain would self-assemble with the Spanish audio track, and then render the broadcast through the composer's player interface.

In another example, the same media object may be a commercial for mayonnaise, and the same commercial when played on the East Coast will show an image in a certain part of the screen to show Hellmann's mayonnaise, however, if the same commercial is played on the West Coast, then that same part of the screen will display a different brand for the same company, to display Best Foods mayonnaise, without having to shoot the same commercial twice for each of the two respective brands of mayonnaise, thus saving time and money. Rather, it is only necessary to define and capture the graphics and location for the different brands as to be applied to the same commercial.

Thus, nearly everything that is not a live broadcast can be pre-produced and then locked up and synchronized based on time so that everyone sees the same thing at the same time, or unlock the content from time, thus permitting the media to be consumed "on-demand," depending on the needs of the content producer.

Further still, the commercials for broadcast content are not rendered into the broadcast stream, and thus, the same content broadcast to different viewers at different times may display different commercials entirely. For example, a first viewer watching content in the evening may see a local pizza commercial, whereas a second viewer watching the identical content in the morning may be displayed a breakfast cereal commercial, with the rendering engine self-assembling the needed pieces at the time the content is displayed to the user, rather than being finalized and "built" or "rendered" and then generically streamed to a large generic audience.

Consider also a national brand, such as Home Depot, which runs a commercial. While the national brand is associated with a single company, they may nevertheless produce between 100 to 150 different versions of the same commercial, because each different market may have different pricing for the advertised product or different special offers for the advertised product, or some other variation, which requires the national brand to create numerous different commercials.

However, using the IDVMedia platform, the commercial needs to be produced only once, and then all the variations may be captured as different variables within different objects and configured to self-assemble the appropriate pricing information differently at each different market. Using the IDVMedia platform, there is only a single copy of the commercial, but it may be configured in a limitless number of variations to suit the sub-markets for the national brand.

Another benefit is that because only a single commercial is created, with the many different variables, there is less opportunity for human error in the trafficking and distribution of the many different commercials. It is less complex and less costly to control which variables apply to which markets then it is to actually produce and traffic, distribute, and publish the exemplary 100 to 150 different commercial variations.

Supported services: Radio Syndication—Program originators, syndicators and networks: live program syndication and enabled Internet radio producers feed programming to over-the-air broadcasters. Radio (audio) and Television (video) advertising—distribution for advertising agencies, production houses, dub and shippers: digital media, VO copy, traffic instructions. Television programming including Cable network programs which are distributed to MSOs with automatic multi-channel dynamic program assembly and commercial localization and insertion. Music stations including both major and independent music companies, regardless of whether they utilize digital audio music files, publicity materials, legacy recordings and playback devices, pre-recorded or live news and short features, broadcasting of national and International News agencies in either live or recorded digital audio formats, video formats, and text copy to be read out during the broadcast.

Figure 15:
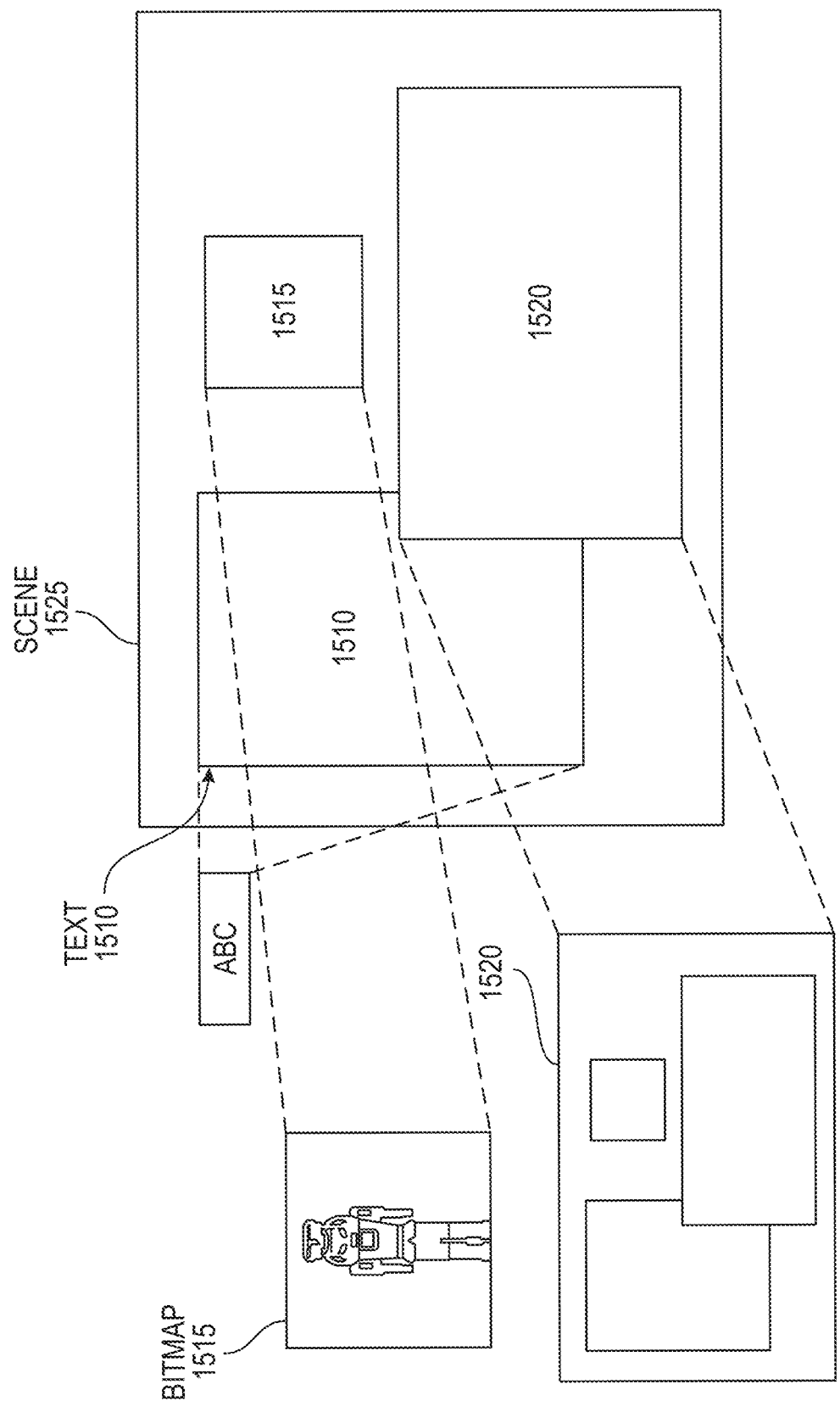
FIG. 15 depicts an exemplary SpotMagic framework which operates in conjunction with the Intelligent Dynamic Virtual Media (IDVM) platform, in accordance with described embodiments.

FIG. 15 depicts an exemplary SpotMagic framework which operates in conjunction with the Intelligent Dynamic Virtual Media (IDVM) platform, in accordance with described embodiments.

SpotMagic's SpotComposer Suite is an integrated development environment for the creation, arrangement, and deployment of Spots and their associated SpotMedia. The Suite includes the SpotTuner, the SpotComposer, the SpotPalette, and the SimpleToon Maker. The SpotTuner is SpotMagic's client software used for the playback of SpotMedia shows. The SpotComposer Suite is an intuitive multimedia environment using a graphical interface. Use it to create Shows including all forms of electronic media.

The SpotComposer can distribute Shows to the audience over any electronic distribution channel, e.g., the Internet, television broadcast, satellite transmission, CDROM, videotape, etc. Shows are collections of Scenes, often with a Sequence defining the succession of Scenes. Scenes are collections of Spots arranged against a specified Scene size and background. Spots are the basic element in the SpotMagic environment; their properties and abilities are the heart of the software.

The SpotComposer enables media professionals to quickly and easily bring together a wide variety of media files, streams, and devices into presentations. These tools can arrange media forms in both time and space, and can endow them with interactive capabilities, all without needing to program code. Spots use the Windows operating system to display Show information from more than one source simultaneously, from a hard drive, CD drive, radio card, network, and the Internet. SpotMagic's tools bring all of these signals together to create a true multiple media experience in a high-performance presentation to the audience. SpotMedia Shows (with their associated Scenes and Spots) are unlike other forms of multimedia presentations. They are not encumbered with their associated digital media, but are small and intelligent files that instruct the audiences' computers where to get the media and what to do with it once it is received. This separation of the media and instructions allows quick and easy transport of the Show, and the resulting quick transmission times provide an enjoyable audience experience.

The SpotComposer includes powerful media file compression tools to further enhance the delivery of Shows. The tools use the best compression for the different file type, making SpotMedia files. Once the audience's computer receives the SpotMedia files, the SpotTuner decompresses them back to their original forms and plays them as part of the overall multiple media presentation. The SpotTuner stores these files on the audience's computer temporarily. If it is called for again later in the Show, it does not need to be transported a second time. Both the ease of composing Shows, and the ease of compression and storing them for transport, make the SpotMagic SpotComposer Suite the most artist-friendly and efficient multiple media authoring, transport, and playback application on the market today.

Spots, Scenes, Sequences, and Shows: The core of SpotMagic technology are the objects which are referred to as spots. Spots hold both instructions on how to find their media, and how they should behave based on media function, time passing, user interaction, status of other Spots, and the SpotTuner environment. Spots can modify their behavior in many ways. These include altering the presentation of their current media, switching to another piece of media, interacting with other Spots, moving to a new position, causing a change of Scene, or navigating to a different Show. Spots also recognize and utilize devices available on the audience's computer to receive that media, and other software on their computer to playback that media. A Spot's properties instruct the computer to retrieve and present the media during playback, but the Spot does not include the media itself. Therefore, Spots are small in file size and easy to transport.

Within the SpotMedia environment, Spots play all media. Media is any discreet element of a presentation, including the wide range of information presented by the underlying operating system. The Windows operating system can display presentation elements such as flat-file data (bitmapped 1515 and vector graphics and text 1510), streamed-file data (compressed video and audio streams), compound-file data (directive files that include references to further media such as HTML, Flash, and SpotMedia Scenes), device stream data (CD audio, digital video capture), and application data (within a COM object).

Spots are arranged for presentation in a Scene 1525. A Scene 1525 is a file defining the screen display of a presentation in which Spots define each discreet media element. (A Spot may also contain a Scene 1520 as its media element, and may change its instantiated media element during the duration of its presentation.) A Spot is only a set of instructions and media references. A Scene 1525 is a file that then contains the collection of Spots that are to be part of a presentation. The media referenced by Spots can be discreet files kept in their original form or converted to individual Interactive Dynamic Virtual Media files (IDVMedia, with an *.idv extension), SpotMagic's compressed format.

Figure 16:
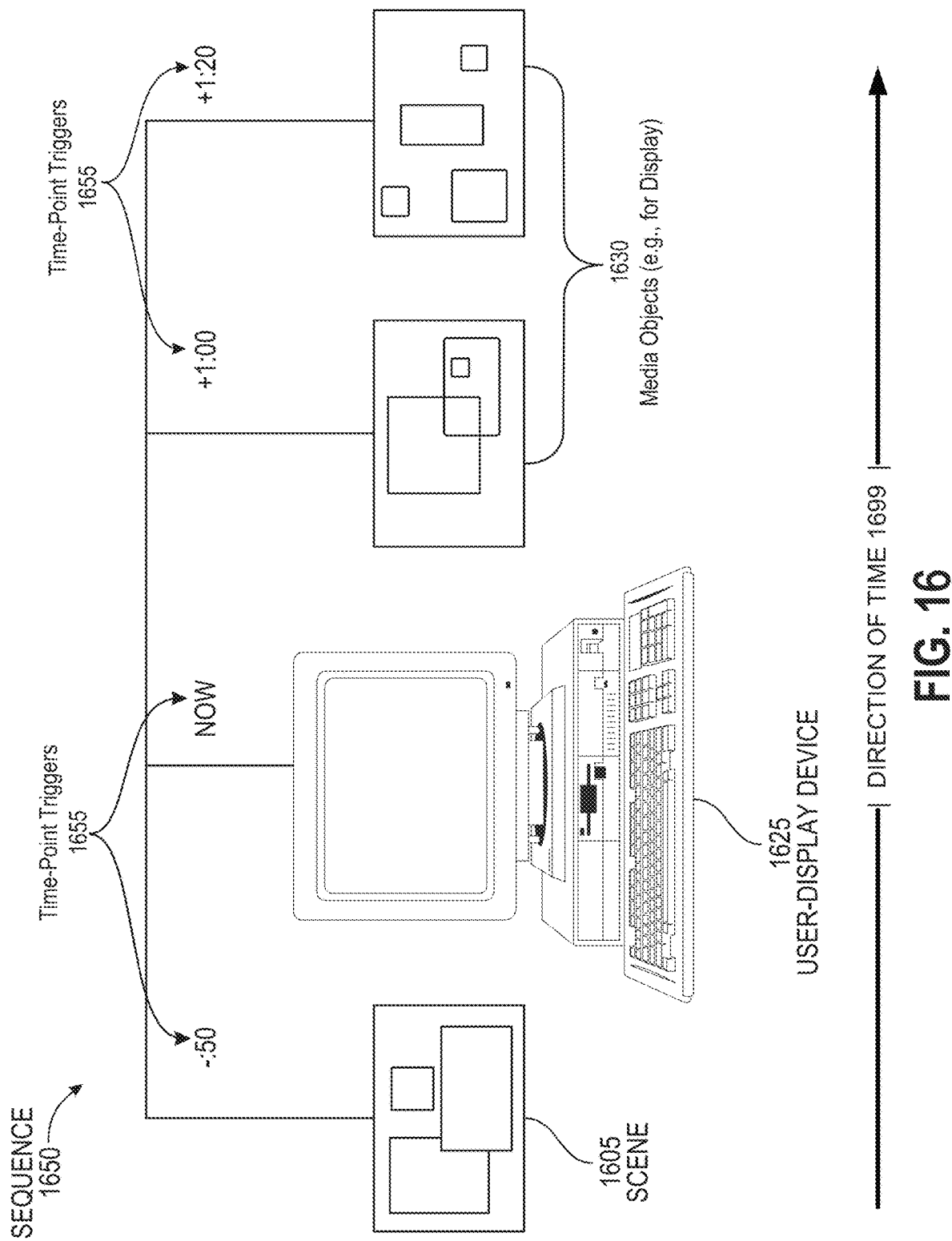
FIG. 16 depicts an exemplary Sequence which operates in conjunction with the Intelligent Dynamic Virtual Media (IDVM) platform and the SpotMagic framework, in accordance with described embodiments.

FIG. 16 depicts an exemplary Sequence which operates in conjunction with the Intelligent Dynamic Virtual Media (IDVM) platform and the SpotMagic framework, in accordance with described embodiments.

Using a Sequence 1650 file, many Scenes 1605 may be played back in a timeline showing the direction of time 1699. These flow one after the other without user interaction, and create a progression of Scenes 1605 within a presentation, or Sequence 1650. A Sequence 1650 is a list of Scenes 1605 set to a timed order, or time-point triggers 1655. It includes time-point triggers 1655 when each Scene 1605 plays in the SpotTuner, and a location definition for the SpotTuner to find each Scene 1605. Sequence 1650 is presented at user-device display 1625. The scenes 1605 may include media objects 1630 for display at user-device display 1625. The media objects 1630 may include, for example, interactive content that a user may click on, enter text or other input into, etc.

A Sequence allows the creation of presentations that navigate from Scene to Scene at a specified time. While running a Sequence, an audience may choose to navigate out of the Sequence, if the content creator makes such option available using a clickable link to another Scene. In these cases, the Sequence timer continues running in the background, allowing a return to the Show in progress. The content creator can provide this return using clickable links, or the SpotTuner may time out and return due to user inactivity. Additionally, like Scenes, Sequences can also play inside of a Spot.

Combinations of Scenes and Sequences are used together to create Shows. Shows can be static, in which the audience initially views an initial Scene to begin the Show. This scene typically offers clickable links to additional Scenes, which may in turn link back. Although dynamic media can be easily integrated into these Shows, the resulting experience is much like a web page, where the audience decides the future direction of the Show by choosing from various links on the Scene.

Shows can be Sequenced, which creates a more passive viewer experience. These Shows do not require links to and from Scenes in the Sequence. Instead, the Sequence moves the SpotTuner from Scene to Scene at a specified time. The resulting experience is more like television broadcasting, although the content creator can include clickable links, giving the audience some control over the direction of the Show.

Sequenced shows enable read-ahead caching in the SpotTuner. Since the Sequence file carries the information on which Scene comes next, the SpotTuner can begin acquiring it and its referenced assets before that Scene is scheduled to begin. This helps minimize the annoying pauses for downloading information that plagues traditional Internet multiple media presentations.

Further, you can log Sequences into a Broadcast Schedule to create a type of Show that can be synchronized with external sources, such as a television broadcast. The SpotMagic arrangement of intelligent files (Spots, Scenes, and Sequences) creates a flexible environment that suits most presentation applications.

Sequencing Scenes for Shows: A Sequence file is a list of Scenes set to a timed order. Using a Sequence file when publishing Scenes to a Show sets a time when each Scene plays in the SpotTuner, as well as a location definition for the SpotTuner to find each Scene. Sequence filenames have an *.sml extension. You can think of a Sequenced Show as a passive experience for the audience, where the Scenes unfold according to a time schedule, much like television.

The progression of Scenes can proceed without interaction by the audience. Non-Sequenced Shows do not have this timed progression of Scenes, and may require some interaction (typically mouse clicks) by the audience to move forward. However, you can also set up the Sequenced Show with Scenes in its Sequence that contain links to Scenes that are not in the Sequence. The audience can browse to these Scenes with mouse clicks, or you can set triggers to run these linked Scenes from one of the Scenes in the Sequence. The SpotTuner menu has a Return to Show option, available when you click the SpotMagic ball icon. When the audience chooses this option, the SpotTuner returns the Show to the Scene scheduled to run at the current time, as defined in the Sequence.

The timer that defines the sequence of Scenes does not stop when the audience leaves the sequenced Scenes to view other linked Scenes or other Windows applications. It continues to run from the moment the audience first plays the Show. This may mean that the audience returns to a Scene that is different from the one last viewed in the Sequence; it may even mean that the audience missed a Scene or two while away from the Show. However, this is very useful to keep the show "in sync" with external media devices, such as a CD audio or videotape, or a scheduled broadcast.

Editing Scenes and Spots: The SpotMagic SpotComposer Suite is a powerful set of tools used to create multiple media presentations (Scenes) made up of varied and assorted digital media forms wrapped in instructions (Spots). These Scenes incorporate media of many types, from graphics and text files to audio and video files, to web pages and streaming media. The audience can access the media from the local PC, from a network, from the Internet, and even from broadcast sources. The SpotComposer assembles Scenes that can display multiple file types simultaneously, even from multiple locations. It can arrange automated action within them, and offers options for interactions with the audience. It also can arrange a series of Scenes into Sequences and Shows for more complex presentations, and prepares the Scenes, Sequences, and Shows for publishing, scheduling, and broadcast.

Each screen or view of a SpotMagic file is a Scene. A Scene is a collection of Spots; it always has at least one Spot, the Background Spot. For more complexity, artists may place other Spots over the visible Background Spot, and/or around the invisible portion of the Background Spot, even wholly or partially outside its borders. Spots are the building blocks of media within these Scenes, and Shows are a series of several Scenes linked together. Use the Scene Editor to define the Background Spot, create other Spots, arrange them, put them in motion, and link them to other Scenes.

Scenes: The scenes may contain any number of Spots arranged on the visible or non-visible areas of the Background Spot. Other Spots can be layered on top of the Background Spot, and can lie outside the border of the Background Spot. The scenes include automated behaviors over time, determined by Spot actions, sequencer times, user input (mouse clicks), or the end of dynamic media files and can be identified and navigated to by Spots in other Scenes as well as used as the media in a Spot on another Scene.

A Scene's background is a large Spot on top of which other Spots lie. We call this the Background Spot. This background can be a color, a static graphic file (such as a *.bmp, etc.), or dynamic media (*.avi, etc.), including Internet files, streaming media, or even broadcast signals. It can be wholly or partially transparent or visible. The Background Spot allows you to define the user interface window in which each Scene displays for the audience on the SpotTuner. Spots also have backgrounds. The background of a Spot is a property that allows you to denote a color to display in the entire area of the Spot, underneath any other contents of the Spot, or to define the background of the Spot as transparent. Even the Background Spot has a background; however, do not confuse the Background Spot with the background of a Spot.

Creating & Developing Spots: A Spot is an active unit that plays most media, performs a variety of Actions on itself or other Spots, launches other programs, and causes navigation to other Scenes. You can save Spots as parts of Scenes, or you can save them as individual units that you can export from one Scene and import into another. The Spot can also be thought of as a software wrapper that provides compression, playback, transport, and interaction services to electronic media elements, allowing this media to create an integrated interactive presentation for the audience.

A Spot's instructions can be stored and managed in groupings for presentation purposes called Scenes (SpotMagic File *.smf) or individually (as an *.smc file). A Spot's data is arranged in an instruction file (SpotMagic Component, *.smc) and in the case of physical data media types, a compressed data file (IDVMedia *.idv). Generally, artists arrange Spots into Scenes, and Scenes into Shows, for viewing by the audience. Spots may use any electronic media form supported by the underlying operating system (Microsoft Windows) and any additionally installed, compliant, third party software. This allows the use of many file types together in presenting content, even in one Scene. Spots may be configured to do any of the following: Play active media within the SpotMagic environment. Play Scenes, Sequences, or Shows as media. Play an infinite number of media of any type, along with their interactive instructions. Play media and instructions that are dynamic, which can be changed at any time. Play their media and interactive instructions when placed in an HTML, Word, WordPad, Excel document, or onto the Windows desktop. Spots can be modified by other Spots in a Scene. Spots can be visible or invisible. Spots can contain ActiveX controls, VB, Java, or other code as a media type. Spots can interact with Visual Basic Script and Java Script through the Windows Active Scripting Host.

Defining Visibility: Instantiation is the moment a Scene or a Spot first appears on the screen. Newly created Spots default to visible at instantiation. This means the Spot is visible to the audience when the Scene first displays on the SpotTuner. To make the Spot invisible at instantiation, uncheck the Visible at Instantiation box on the Spot's Properties dialog box. When you clear the box, you can use Steps and Actions to make the Spot visible at some time after instantiation. You then need to have a timer, mouse click, or end of the media files on another Spot to trigger an Action to show the invisible Spot. When you make a Spot not visible at instantiation, you do not necessarily set off timers and Steps within the Spot. You may find it more useful to use a visible Spot to trigger Actions. You can place a Spot outside the visible border of the Scene and check it Visible at Instantiation, and the audience does not see it in the SpotTuner. You can also control the visibility of the Spot by using the Spot menu.

Spots display many different file types, though they can also have no media file, and possibly just a background color, or some instructions. The design of the Spot interface allows it to display most electronic media files supported by either the underlying operating system (Microsoft Windows) or additionally installed, compliant, third party software. For example, supported standard media forms include but are not limited to: Bit-mapped graphic files; Text documents; Video files; Animation data files; Sound data files; Web documents; Script files; ActiveX components; Real-time formats; Broadcast formats; Streaming formats; etc. SpotMagic is configurable to utilize any additional abilities of the underlying operating system and any additional installed third-party software, thus permitting display of nearly any content file using Spots assuming the executing system has the necessary drivers installed at the OS level.

You can enter text directly into the Spot Properties dialog box. This text displays within the Spot. The SpotComposer displays as much text as the font and format allow within the Spot, wrapping the text to stay within the Spot. If there is more text than fits in the Spot with the selected font and format, the Spot clips the text to display only the part that fits.

You can arrange Spots in layers, one on top of another, in a Scene. You can have them partially overlap each other, showing part of one behind another. For Spots stacked in layers, only one Spot in front displays in full at instantiation. Parts of other Spots may be visible around it, or completely hidden behind it. You can make the other Spots completely visible by moving them forward, layered in front of the first Spot, using Actions or timers which direct the Spot to perform Actions over time using Steps. A Step is a single state of properties plus a definition of Actions that are performed upon enabled events. Spots can change using sequences of Steps and Actions over time. You can trigger this sequence of Steps with: Mouse clicks; the completion of media files; timers; and actions in other Spots. Much of the potential of Spots is in using Actions and their modifiers to make things happen over time. The range of media presentation variations using Actions in Spots and Steps is unlimited. Actions are instructions for Spots to perform. Trigger Actions in three ways: (1) When clicked (with the mouse) The Spot performs these Actions when the audience places the cursor over the instantiated Spot and clicks the left mouse button. (2) When media is done playing a dynamic media file type, such as *.avi, *.wav, etc., the Spot performs these Actions when the media file reaches its end, or the end time, as specified in the Step's properties. And (3) when time passes The Spot performs these Actions after the set amount of time has passed after the instantiation of this Step.

Figure 17A:
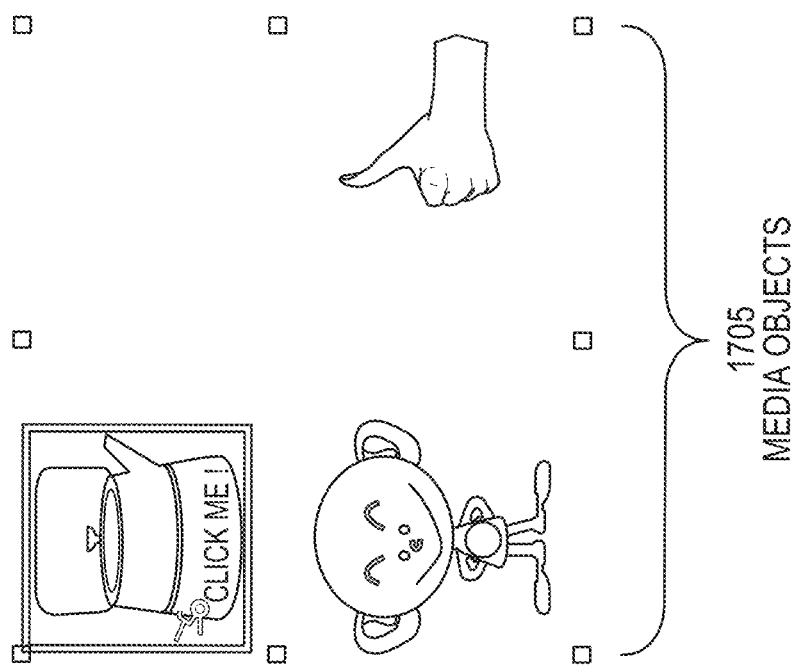
FIGS. 17A and 17B depict an exemplary scene and spot editor interfaces which operate in conjunction with the Intelligent Dynamic Virtual Media (IDVM) platform and the SpotMagic framework, in accordance with described embodiments.
Figure 17B:
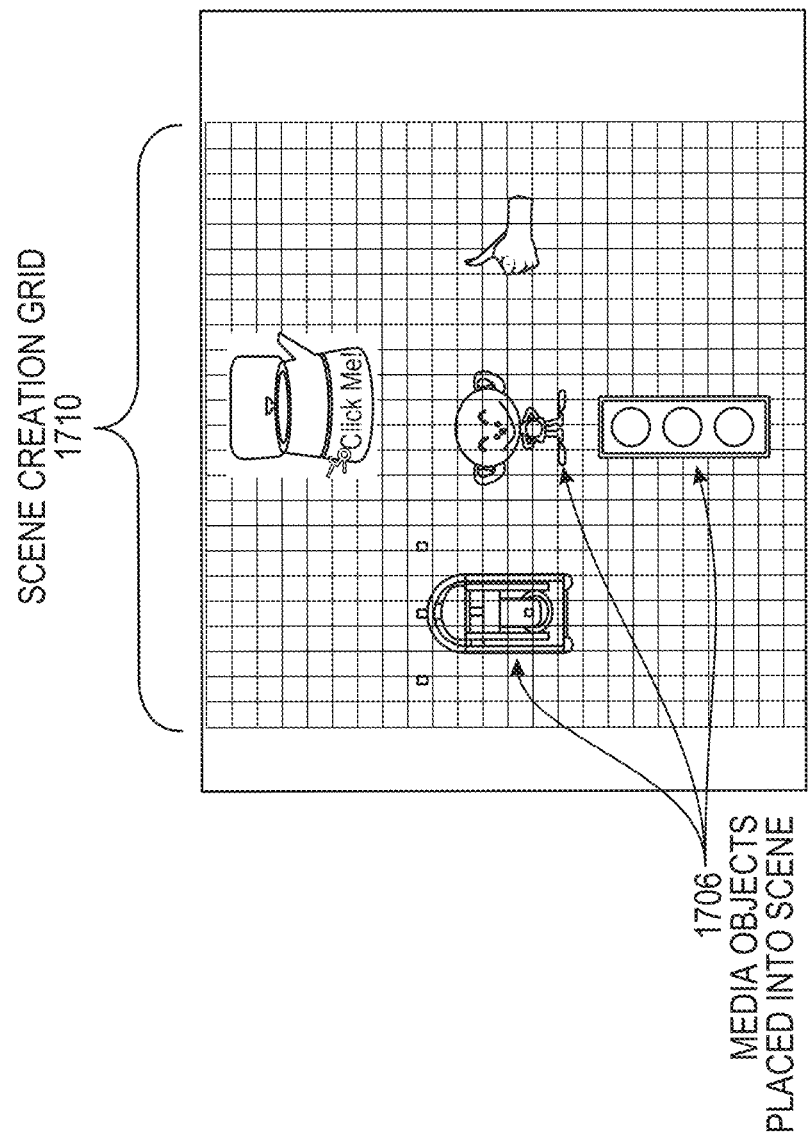

FIGS. 17A and 17B depict an exemplary scene and spot editor interfaces which operate in conjunction with the Intelligent Dynamic Virtual Media (IDVM) platform and the SpotMagic framework, in accordance with described embodiments.

The SpotComposer also indicates the reference Spot (also known as media objects 1705) by displaying a solid green border around it. The reference Spot (media objects 1705) becomes the Spot around which the layout tools work. To deselect the group of Spots, place the cursor outside the sizing handles and click. To select a reference Spot (media objects 1705) and other Spots individually, first select the reference Spot by placing the cursor over it and clicking. Hold the Shift key, and click the other Spots you want to include in the selection. The SpotComposer indicates the selected Spots with the eight green sizing handles around these Spots.

For precise layout of your Scene, use the scene creation grid 1710. The SpotComposer displays the scene creation grid 1710 over the Scene 1605 to show alignment of the various Spots in the Scene 1605. You can also use the scene creation grid 1710 to make Spots "snap to" grid lines for precisely sizing and aligning Spots. For example, reference Spot (media objects 1705) is seen here placed into the scene 1706.

The SpotPalette is a tool to preview files and copy them into Scenes. Because you can "drag and drop" the files onto the Backgrounds Spot and other Spots, you can preview the file and select it as a media file in one easy step. Also, because you can set up the SpotPalette to display files from several directories simultaneously, you can quickly build Scenes with files from diverse sources.

Publishing Shows: After you complete Spots, and Scenes for your Show, it is time to publish. Publishing organizes and compresses a Show's Scenes, and media assets in preparation for transport to the audience. Publishing compresses the media files into IDVMedia (*.idv) files and organizes them for transmission to the audience. It also produces a Show (*.sms) file, which contains information allowing the audience's SpotTuner to locate the Show's information over the Internet, network, or media player. You also create a graphic Tuner Bar and icon for the Show, and compress it into the Show file. The SpotComposer can produce two kinds of Shows: (1) Shows without Sequence files. And (2) Shows with Sequence files. A Non-Sequenced Show plays on the SpotTuner only according to the various triggers. These can include timers, the end of media files, and mouse clicks. However, it does not have a scheduled and timed list of Scenes, but rather linked Scenes, like the hyperlinks on a web page. It includes media files (usually compressed into *.idv files) and a Show file (*.sms). Use the Scene Publisher to publish a Non-Sequence Show.

A Sequenced Show plays Scenes according to a time schedule, much like a movie or television show. While it may include links to Scenes outside the Sequence, the SpotTuner runs the Show according to a timer for the Scenes. It includes a Sequence (*.sml) file, which is a list of Scenes set to play at specific times relative to the start of the Show. It may include a Splash Scene, which is the initial Scene the audience sees when it first starts the Show. It also includes the other files listed above. First use the Show Sequencer to schedule Scenes in the Sequence, and then use the Sequence Publisher to publish Sequenced Shows.

Use the Sequence Publisher to prepare Sequence Shows for compression and distribution. A Sequenced Show contains a Sequence (*.sml) file, produced with the SpotComposer Show Sequencer, as well as the other files produced for Non-Sequenced Shows. The Sequence file is a list of Scenes and times for each Scene to start. You must create this file before you publish a Sequenced Show.

A Sequenced Show can also contain a Splash Scene. When the audience acquires a Show to My SpotTuner, the SpotTuner saves not just the Tuner Bar information and a bookmark to find the Show files, but also the media information for the Splash Scene. When the audience starts the Show, the SpotTuner displays the Splash Scene from a local cache and downloads information for the subsequent Scenes to the audience's computer. The audience then does not need to wait to view the Scenes in a Show because the SpotTuner stays ahead of the display, caching media files for use by each of the Sequenced Scenes before these Scenes are scheduled to play. The caching of media files is one of the great advantages of using Spots to display multiple media information to an audience, yielding a seamless delivery of content without the pauses of normal Internet transmission with Web browsers. When the audience closes the SpotTuner, the cached information is deleted from its computer. If the Show is acquired to My SpotTuner, it retains the information for the Tuner Bar, the link to the Show, and the Splash Scene. If the audience opens the Scene file from a place other than My SpotTuner, there may be a pause before it begins playing. This is because the Splash Scene has not yet been cached, but needs to download. The time of this pause depends on the size and location of the Sequence Show files and the connection speed with the audience's computer. Most of the procedures using the Sequence Publisher are the same as using the Scene Publisher.

Move do not copy: According to another embodiment, the IDVMedia platform supports the creation of a virtual object to represent an individual file, in which the virtual object is made up of thousands of different individual pieces, each of which may be retrieved from different servers. Thus, even if someone obtains several of the pieces, they cannot recreate the individual file because they do not have all the pieces. According to such an embodiment, there is further the ability to associate a dynamic key with the virtual object, thus protecting the virtual object from being re-assembled by any device without the key.

Consider a piece of music or a legal document or a transactional document or e-currency, or a video file, or some other piece of media. The dynamic key can be associated with the virtual object but the machine which needs to re-assemble the pieces must not only have a key to perform the re-assembly, but must have the current dynamic key. Thus, even if a person has all the pieces and has the dynamic key at one point in time, that dynamic key can be changed, meaning that the virtual object can no longer be referenced or played or rendered, despite all the pieces being present and despite the fact that the system previously had the correct key.

Figure 18:
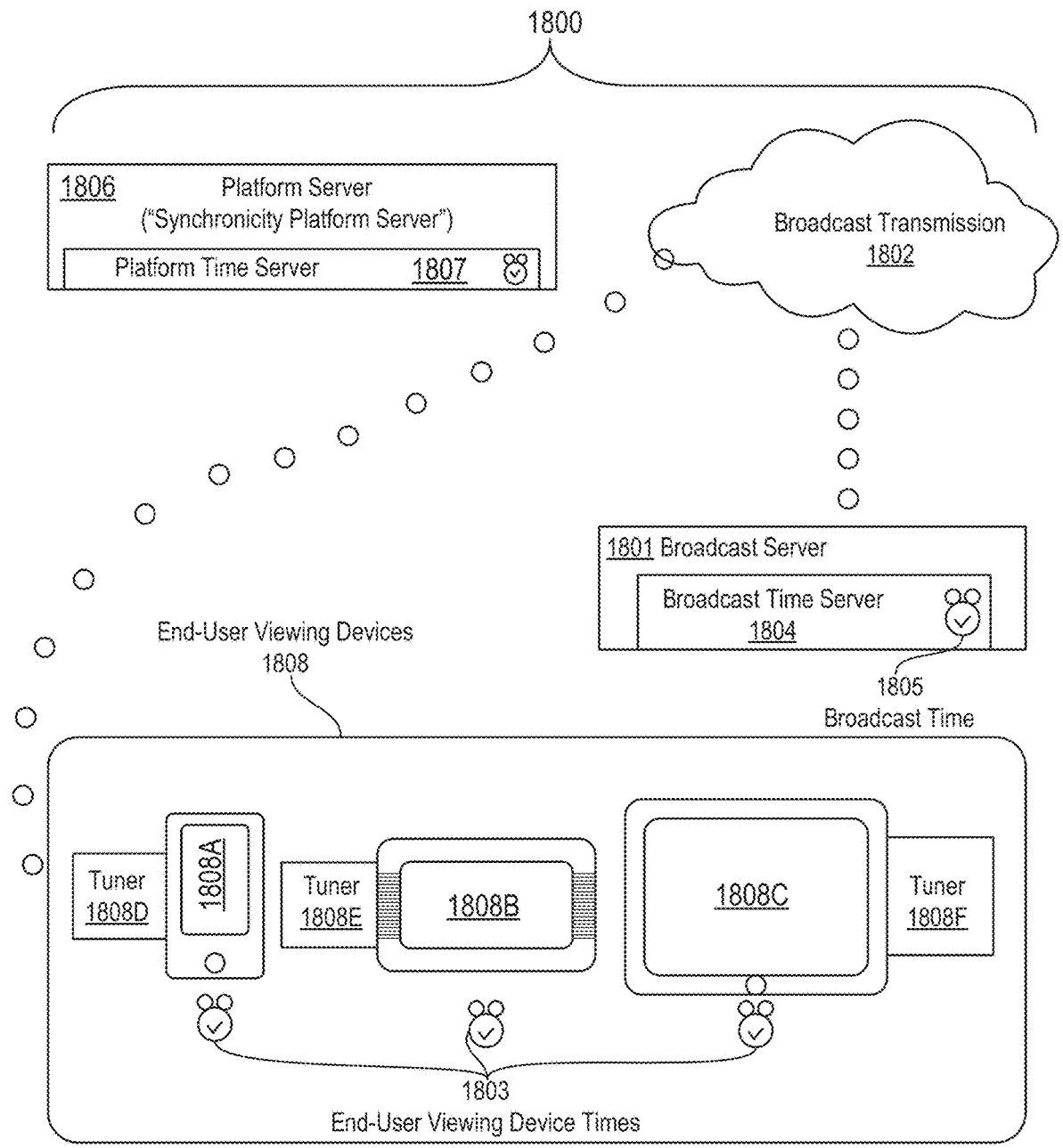
FIG. 18 depicts an exemplary system architecture of the Synchronicity Platform which implements a system to broadcast dynamically integrated interactive content in accordance with described embodiments.

FIG. 18 depicts an exemplary system architecture of the Synchronicity Platform which implements a system to broadcast interactive content in accordance with described embodiments.

For example, there is a system 1800 with a broadcast server 1801 hosting a broadcast transmission 1802. End-user viewing devices 1808 send a request for presentation of broadcast transmission 1802 and receive a source location for broadcast transmission 1802. The source location for the broadcast may be transmitted, for example, by broadcast server 1801. According to other embodiments, platform server ("Synchronicity platform server") 1806 may transmit the source location for the broadcast.

Broadcast transmission 1802 may be transmitted to various end-user viewing devices 1808 such as end-user viewing devices 1808A-1808C for presentation at the displays of such end-user viewing devices 1808. For example, the broadcast transmission 1802 may be a football game and a user of end-user viewing device 1808A may wish to view the game, thus end-user viewing device 1808A sends a request for presentation of the broadcast transmission 1802 at the display of user device 1808A. The end-user viewing devices 1806 may be a variety of electronic devices including smartphones, tablets, television sets, computers, etc. Tuners 1808D, 1808E, and 1808F at end-user viewing devices 1808A, 1808B, and 1808C, respectively, receive broadcast transmission 1802. According to certain embodiments, the tuners 1808D-1808F may be integrated with end-user viewing devices 1808A-C. According to other embodiments, tuners 1808D-1808F may be stand-alone devices.

There is a time server 1804 at broadcast server 1801 which indicates broadcast time 1805 (also known as a broadcast offset), which is the time elapsed since the beginning of the broadcast transmission 1802. Broadcast time 1805 is sent to the end-user viewing devices 1808. Tuner 1803 temporally synchronizes end-user viewing devices 1806 with broadcast transmission 1802 by comparing broadcast time 1805 with the end-user viewing devices times 1803 and calculating local offsets for end-user viewing devices 1808, as will be described below. According to certain embodiments, the broadcast time 1805 is sent to the end-user viewing devices 1808 from broadcast time server 1804 of broadcast server 1801. According to other embodiments, broadcast time 1805 is sent to the end-user viewing devices 1808 from another source, such as platform time server 1807 at platform server 1806.

Figure 19:
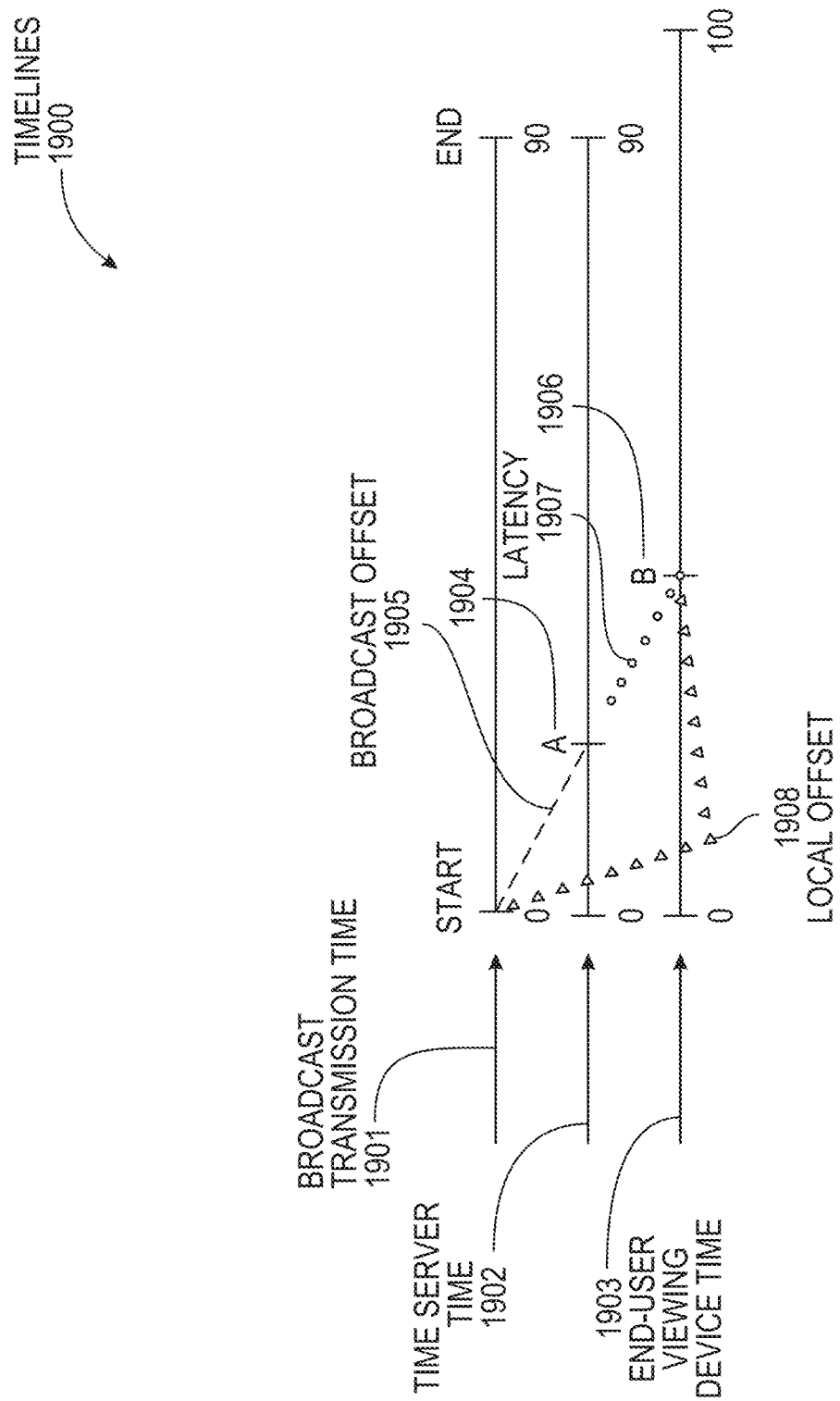
FIG. 19 depicts timelines across the broadcast transmission, time server, and the end-user viewing devices, in accordance with described embodiments.

FIG. 19 depicts timelines across the broadcast transmission, time server and the end-user viewing devices, in accordance with described embodiments.

For example, timelines 1900 shows comparative timelines for broadcast transmission time 1901, time server time 1902, and time at end-user viewing device 1903. Broadcast transmission time 1901 starts at, for example, time 0 minutes with the beginning of the broadcast and ends at a certain point, for example at time 90 minutes, indicating the end of the broadcast transmission (for example the broadcast of a sporting event that is 90 minutes long). Broadcast transmission time 1901 is measured by a time server such as broadcast time server 1804, which gives a time server time 1902, which indicates the actual time elapsed since the beginning of the broadcast. For example, the broadcast may be at A minutes 1904 and thus the time server time 1902 will also be A minutes 1904. Tuners, such as tuners 1803D-1803F may thus calculated a broadcast offset 1905 which is the time elapsed since the beginning of the broadcast. The broadcast offset 1905 is equal to time server time 1902.

Time at end-user viewing devices, or end-user viewing device time 1903 may lag behind time server time 1902 and broadcast transmission time 1901, for example due to processing, satellite relays and time lags slowing the path of broadcast transmission from the broadcast server to end-user viewing devices 1808. For example, time at a particular end-user viewing device may be at B minutes 1906 which is later in time than A minutes 1904, which the time at time server time 1902 and also the actual time elapsed since the beginning of the broadcast. The difference between B minutes 1906 and A minutes 1904, also known as the difference between the time at the end-user viewing device time 1903 and time server time 1902, is latency 1907. Based on broadcast offset 1905 and latency 1907, a tuner, for example tuner 1803D, may calculate a local offset 1908 for a particular end-user viewing device. The local offset 1908 is the sum of broadcast offset 1905 and latency 1907, also known as the difference between the start of the broadcast and the time at end-user viewing device (such as time B 1906), or in this example B minutes 1906 minus 0 minutes. According to certain embodiments, the tuner may be instructed to synchronize (temporally align) the presentation of media content objects with the presentation of the broadcast transmission at the user device based on time-point triggers for the media content objects using the local offset 1908. Importantly, the temporal synchronization allows for a concurrent experience at the end-user viewing device, in which all viewers (also known as end-users) concurrently experience the broadcast transmission overlaid with media content objects, in a combination known as dynamically integrated interactive content. This allows for, for example, standardized user interaction at the user devices, where users don't have advantages or disadvantages based on latency 1907 or local offset 1908 and view the broadcast transmission and interact with content at the same time, for example, placing bets or answering trivia questions in the same time window.

Figure 20:
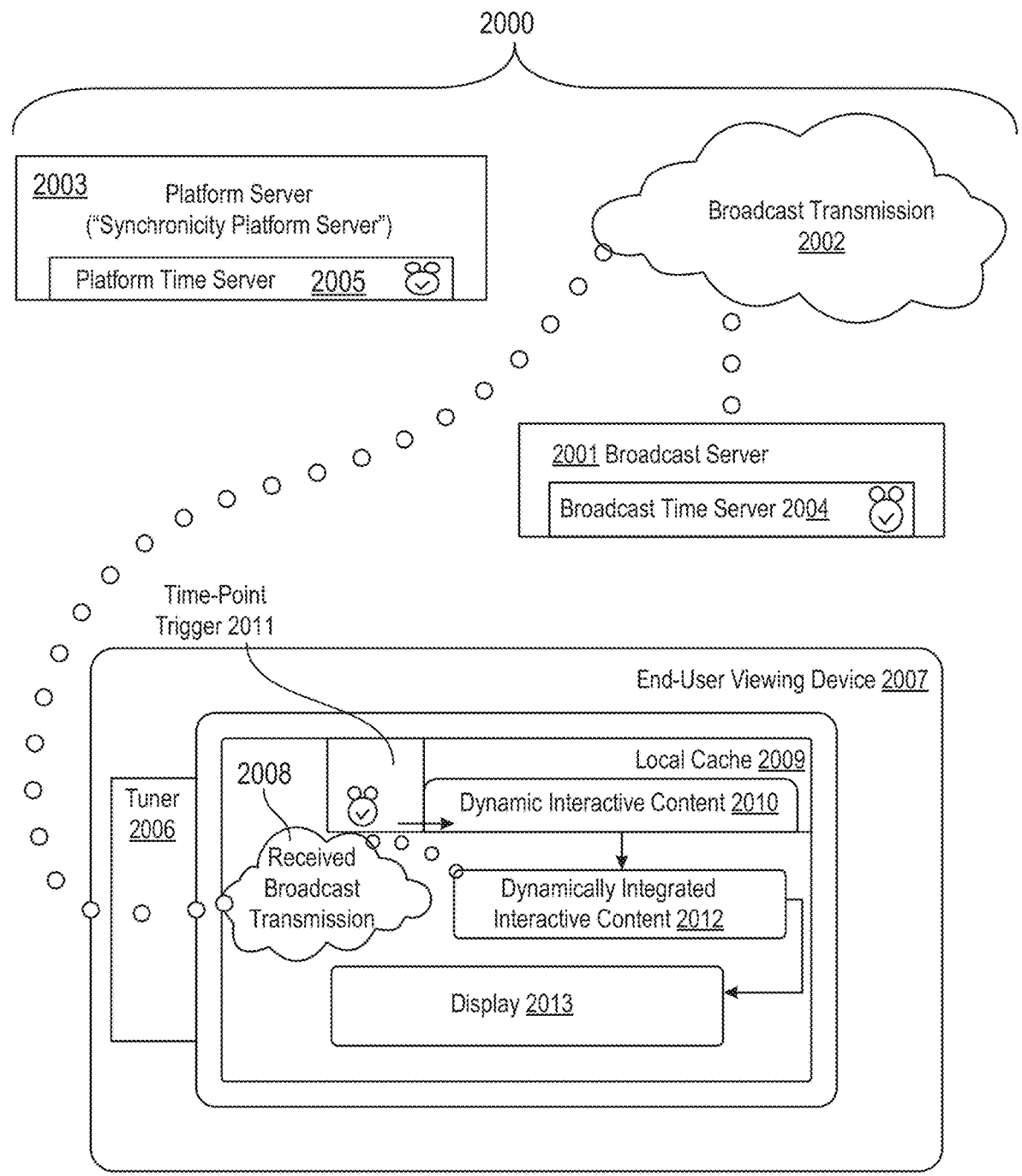
FIG. 20 depicts an exemplary flow process for producing dynamically integrated interactive content, in accordance with described embodiments.

FIG. 20 depicts an exemplary flow process for producing dynamically integrated interactive content, in accordance with described embodiments.

Flow process 2000 describes overlaying dynamic integrated content 2010 with received broadcast transmission 2008 via tuner 2006. Received broadcast transmission 2008 refers to broadcast transmission 2002 from broadcast server 2001 after it is received at end-user viewing device 2007 via tuner 2006. According to certain embodiments, this is done after tuner 2006 has temporally synchronized received broadcast transmission 2008 with dynamic interactive content 2010, as previously discussed. Flow process 2000 begins with tuner 2006 channeling broadcast transmission 2002 into an end-user viewing device 2007 for presentation (also known as playback or viewing), for example through player software at end-user viewing device 2007.

According to certain embodiments, there is a local cache 2009 at end-user viewing device 2007 storing received dynamic interactive content 2010 for quick retrieval and overlay with the received broadcast transmission 2008. Dynamic interactive content 2010, also known as media content objects, may be composed of a compilation of sequenced media objects (referred to as Sequences of Spots in FIGS. 15, 16, 17A and 17B). According to certain embodiments, these media objects may be tagged or assigned variable time-point triggers 2011. According to certain other embodiments, dynamic interactive content 2010 is pre-produced and configured by tuner 2006 or a Show composer at end-user viewing device 2007.

Further depicted is a platform server 2003, such as the "Synchronicity Platform Server," which further implements the platform time server 2005. Once activated by the time-point triggers 2011, dynamic interactive content 2010 is recalled from local cache 2009 and overlaid with received broadcast transmission 2008 such that the interactive elements are presented to the display of a user device by rendering or otherwise displaying the interactive objects on top of the broadcast transmission displayed to the user device in accordance with the timing criteria defined by the time-point triggers 2011.

Such time-point triggers 2011 may include, for example, pre-set time points at the broadcast transmission 2002 in accordance with information received from broadcast time server 2004 or platform time server 2005, time-points associated with scenes or lines at a certain point during a script for a show, film, or event such as a wacky neighbor entering an apartment in a television show, or the occurrence of certain events during a live event such as a certain player scoring a point. According to certain embodiments, the overlay of dynamic interactive content 2010 with received broadcast transmission 2008 is performed automatically by tuner 2006. According to yet other embodiments, the overlay is manually directed by an engineer, producer or directed automatically by a system in response to unscripted occurrences during a live event.

The overlaid combination, known as dynamically integrated interactive content 2012, is displayed at display 2013 of end-user viewing device 2007. Dynamically integrated interactive content 2012 may be displayed in various ways at display 2013 of end-user viewing device 2007. For example, dynamically integrated interactive content 2012 may be pre-stored at display 2013 of the end-user viewing device 2007 with its visibility to the viewer toggled on and off based on time-point triggers 2011. This may be accomplished, for example, by the front-layering and back-layering of multiple visibility layers containing dynamically integrated interactive content 2012. According to yet other embodiments, dynamically integrated interactive content 2012 may be pre-stored in the periphery of display 2013 of end-user viewing device 2007 and moved within display 2013 of end-user viewing device 2007 according to time-point triggers 2011. These migration processes may be automatic or manually accomplished at the direction of an engineer or producer.

Figure 21A:
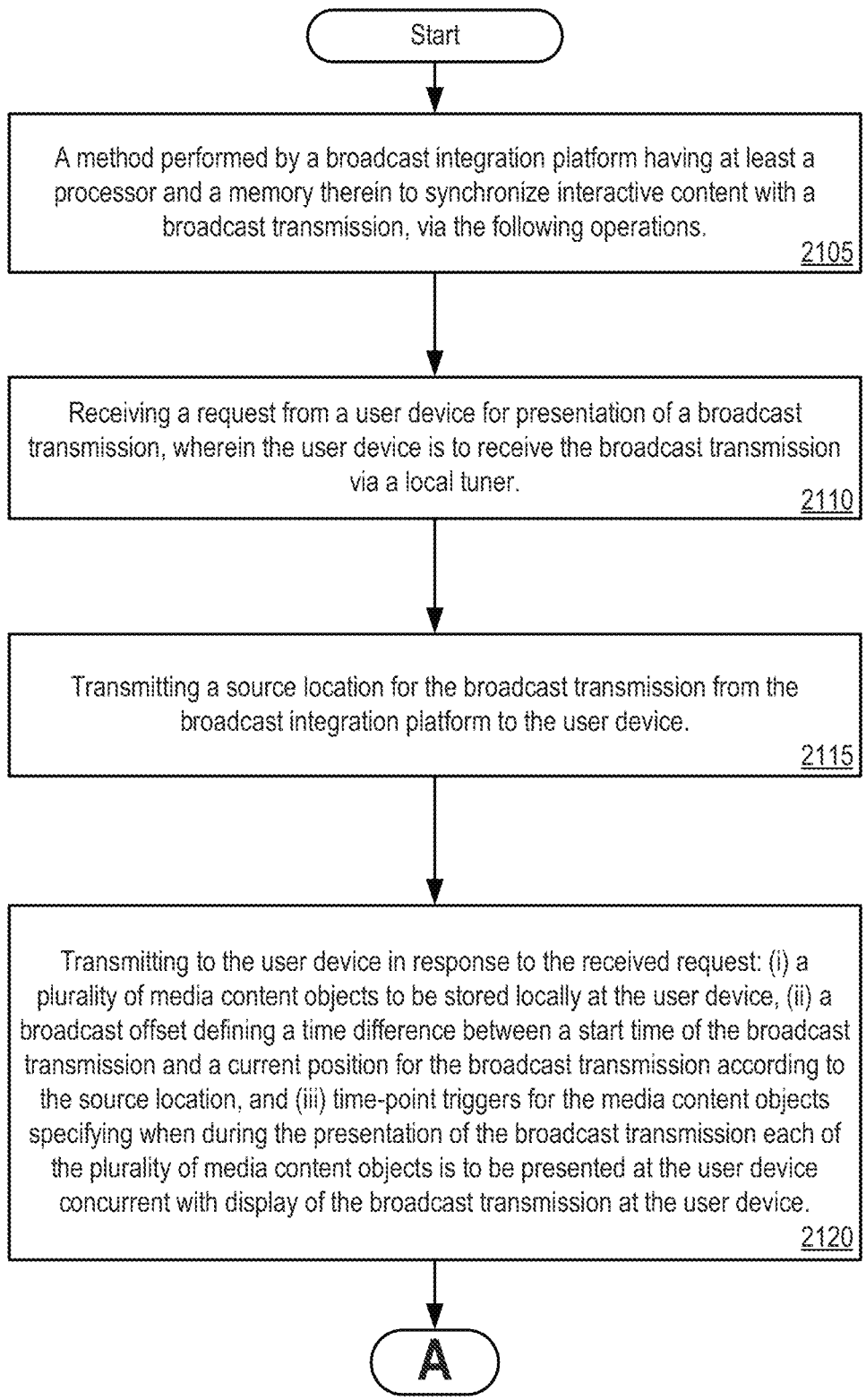

FIGS. 21A and 21B depict a flow diagram illustrating a method for implementing a broadcast integration platform with real-time interactive content synchronization, in accordance with described embodiments.

Method 2101-2102 may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating instructions, or some combination thereof). In one embodiment, method 201-202 is performed or coordinated via system architecture such as that depicted at FIG. 1, such as the Synchronicity platform. Some of the blocks and/or operations listed below are optional in accordance with certain embodiments. The numbering of the blocks presented is for the sake of clarity and is not intended to prescribe an order of operations in which the various blocks must occur. Additionally, operations from method flows 2101-2102 may be utilized in a variety of combinations.

Method 2101-2102 begins at block 2105 with a method performed by a broadcast integration platform having at least a processor and a memory therein to synchronize interactive content with a broadcast transmission, via the following operations.

At block 2110, processing logic receives a request from a user device for presentation of a broadcast transmission, in which the user device is to receive the broadcast transmission via a local tuner.

At block 2115, processing logic transmits a source location for the broadcast transmission from the broadcast integration platform to the user device.

At block 2120, processing logic transmits to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device.

Following connector "A" and continuing with the operations of method 2101-2102, processing logic for the Synchronicity platform at block 2135, instructs the user device to compute a local offset for the broadcast transmission by determining a latency delay between the current position for the broadcast transmission according to the broadcast offset and the local current position for the broadcast transmission according to the display of the broadcast transmission at the user device.

At block 2140, processing logic synchronizes presentation of the media content objects with the display of the broadcast transmission at the user device by instructing the local tuner to temporally align the presentation of the media content objects with the display of the broadcast transmission based on the time-point triggers for the media content objects using the local offset.

At block 2145, processing logic instructs the user device to overlay the presentation of the media content objects over the display of the broadcast transmission at the user device at a time defined by each of the time-point triggers.

According to another embodiment of method 2101-2102, each of the time-point triggers specify when during the display of the broadcast transmission an associated one of the plurality of media content objects is to be presented at the user device concurrent with the display of the broadcast transmission to the user device.

According to another embodiment of method 2101-2102, the source location for the broadcast transmission is sent to the user device by a broadcast server co-located with and communicably interfaced to a broadcast transmitter broadcasting the broadcast transmission to the user device and concurrently to a plurality of additional viewing devices capable of receiving the broadcast transmission via local tuner at each of the plurality of additional viewing devices.

According to another embodiment of method 2101-2102, each of the time-point triggers specifies each of: an initial load time for an associated one of the plurality of media content objects to be presented at the user device as an overlay to the display of the broadcast transmission at the user device; and a presentation duration for the respective media content object or alternatively an unload time for the associated one of the plurality of media content objects indicating when presentation of the respective media content object is to cease rendering over the display of the broadcast transmission to the user device, thus terminating the presentation of the media content object to the user device.

According to another embodiment of method 2101-2102, instructing the user device to overlay the presentation of the media content objects over the display of the broadcast transmission at the user device includes: pre-loading one or more of the respective media content objects into a display memory of the user device in a region of the display which is un-viewable via the user device; and relocating each respective media content object pre-loaded into the display memory of the user device from the region of the display which is un-viewable into the display of the user device as an overlay of the broadcast transmission within a viewable portion of the user device at a time defined by time-point triggers.

According to another embodiment of method 2101-2102, instructing the user device to overlay the presentation of the media content objects over the display of the broadcast transmission at the user device includes: pre-loading one or more of the respective media content objects into a display memory of the user device within a hidden display layer beneath the display of the broadcast transmission to the user device such that the one or more of the respective media content objects pre-loaded to the hidden display layer are rendered but remain un-viewable via the user device; and relocating each respective media content object pre-loaded into the display memory of the user device from the hidden display layer beneath the display of the broadcast transmission to an overlay display layer above the display of the broadcast transmission within a viewable portion of the user device at a time defined by time-point triggers, in which any media content object rendered at the overlay display layer at least partially obscures the display of the broadcast transmission with a viewable rendering of the respective media content object.

According to another embodiment of method 2101-2102, instructing the user device to overlay the presentation of the media content objects over the display of the broadcast transmission at the user device includes: pre-loading one or more of the respective media content objects into a display memory of the user device in a region of the display which is viewable via the user device and configuring interactivity for the pre-loaded media object to be non-interactive; and re-configuring interactivity for the pre-loaded media object to be interactive within the display memory as an overlay of the broadcast transmission at a time defined by time-point triggers.

According to another embodiment of method 2101-2102, the pre-loaded media object displayed to the user device includes a betting or gambling user interface which is rendered within a viewable area of the display in a non-interactive state; and in which re-configuring the interactivity for the pre-loaded media object activates user input functionality to receive betting or gambling wager input at the betting or gambling user interface.

According to another embodiment of method 2101-2102, the functionality to receive betting or gambling wager input at the betting or gambling user interface remains active until either: (i) interactivity for the pre-loaded media object is terminated based on the time-point triggers by re-configuring interactivity for the pre-loaded media object to be non-interactive or alternatively (i) display of the pre-loaded media object is terminated based on the time-point triggers, thus removing the pre-loaded media object as an overlay to the display of the broadcast transmission to the user device.

According to another embodiment, method 2101-2102 further includes: establishing a geo-fence around an event venue corresponding to the broadcast transmission; determining whether the user device is physically present inside of the geo-fence or is physically present outside of the geo-fence.

According to another embodiment of method 2101-2102, the pre-loaded media object displayed to the user device includes a betting or gambling user interface which is rendered within a viewable area of the display in a non-interactive state; in which re-configuring the interactivity for the pre-loaded media object conditionally activates user input functionality to receive betting or gambling wager input at the betting or gambling user interface based on the time-point triggers; and in which the interactivity is conditionally activated subject to the user device determined to be physically outside of the geo-fence.

For example, the geo-fence may be configured to wholly encompass a sports arena or a sports stadium or possibly even a localized area surrounding such a sports venue corresponding to where the media content of the broadcast transmission originates (e.g., the sports venue or stadium where a sports event such as a baseball, soccer, or football game originates). The purpose for doing so is that it is likely that the book-maker or the party responsible for coordinating the betting and wagers may prohibit on the basis of law or policy, any on-premises betting. Therefore, it may be that users watching the broadcast stream outside of and away from the sports venue are permitted to place bets, however, any individual physically present at the sports event should be prevented from placing bets, even if they also stream the game to their personal user device. As noted, this may be due to law or policy of the bet-maker. However, in other instances, the bets may need to be prohibited due to issues such as fraud prevention or to ensure that no party has an unfair advantage due to, for example, information which is attainable from within the sports venue (e.g., such as score boards, announcements, physical game play, etc.) which cannot be attained by parties outside of the sports venue.

According to another embodiment of method 2101-2102, a plurality of user devices concurrently receive, tune, and display the broadcast transmission at each of the plurality of user devices; and in which the synchronization temporally aligns the presentation of the media content objects with the display of the broadcast transmission across all user devices by enforcing an end-user view device time at each of the plurality of user devices to conform to a local offset at each of the respective plurality of user devices which is configured by the broadcast integration platform to account for varying amounts of latency between each of the respective user devices and the broadcast transmission time from the source location of the broadcast.

For example, simply because the various user devices are tuned into the same broadcast transmission from the same source location does not necessarily mean that each user device will be temporally aligned with the other user devices. Therefore, it may be necessary to force a "lowest common denominator" type of a local offset for the plurality of user devices viewing the broadcast transmission, such that faster user devices which may display the broadcast transmission sooner are delayed momentarily via their local offset being configured with a longer than necessary time by the broadcast integration platform to account for the shorter latency of the faster user devices and then conversely, with the broadcast integration platform establishing a shorter local offset for the slower user devices that would otherwise display the broadcast transmission later. With the shorter local offset, the slower user devices would have sufficient time to account for actual latency between their display of the broadcast transmission (e.g., what time the broadcast transmission is actually displayed at the destination) and the broadcast transmission time from the source location (e.g., what time the broadcast source thinks the display is occurring).

Stated more simply, the faster user devices are forced to wait temporarily such that the slower user devices can catch up, thus permitting slower user devices and faster user devices, as well as those in-between, to "experience" the display of the broadcast transmission at their respective user devices at the same time, thus, with the display to the various user devices being temporally aligned. This temporal alignment may become necessary due to, for example, different transmission modes, such as the same broadcast transmission being communicated to certain user devices via Over The Air (OTA) network television broadcast and other user devices receiving the broadcast transmission via a cable network or a satellite network or via the Internet, etc. Other latency inducing effects may be the result of faster or slower local tuners or faster or slower computing hardware for the user devices or wider or narrower media stream buffers which must be filled before displaying the broadcast transmission to the user device.

While the timing and latency may be slight, it nevertheless is likely to exist. Therefore, the broadcast integration platform will account for such varying amounts of latency by configuring an appropriate local offset or by instructing the various user devices to determine their own local offset which is then configured by the broadcast integration platform or which is determined by the local user devices pursuant to appropriately configured latency determination instructions from the broadcast integration platform to account for the varying latency experienced by different user devices displaying the broadcast transmission.

According to another embodiment of method 2101-2102, the presentation of the media content objects with the display of the broadcast transmission at the user device is scaled via a scaling engine, in which the scaling engine enforces uniform audiovisual quality.

According to another embodiment of method 2101-2102, the broadcast offset is received from either the source location or from the broadcast integration platform and is continuously maintained and incremented at the user device via a locally maintained broadcast offset; and in which the locally maintained broadcast offset receives intermittent calibration information from the source location for the broadcast transmission for use in re-calibrating the locally maintained broadcast offset and for periodically re-determining the local offset for the user device to maintain synchronization.

For example, the source location for the broadcast transmission may send such broadcast offset information to the user device via a link and may then periodically update the information accessible via the link, thus permitting the local device to periodically pull or retrieve the information or alternatively, the user device may probe or ping either the source location or the broadcast integration platform or alternatively, the source location or the broadcast integration platform may push or simply send the updated broadcast offset information to the user device, regardless of the user device requesting such information.

According to another embodiment of method 2101-2102, at least one of the media content objects contains a broadcast signature that matches a portion of the broadcast transmission; in which the local tuner is to monitor the broadcast transmission for the broadcast signature; and in which the local tuner is to determine a local offset at the user device based on an observed broadcast signature latency between the broadcast offset and the time that the broadcast signature is observed at the local tuner within the broadcast transmission received by the local tuner.

According to another embodiment of method 2101-2102, the broadcast signature includes one or more of: a sub-audible cue embedded within the broadcast transmission; an encoded string within the broadcast transmission; viewable text within the broadcast transmission; and a viewable image at pre-determined time marker within the broadcast transmission.

According to another embodiment of method 2101-2102, the broadcast integration platform executes via the processor and the memory of a system providing on-demand cloud based services to a plurality of subscribers; and in which each of the subscribers communicate with the system executing the broadcast integration platform via a computing device which is remote from the broadcast integration platform and communicably interfaced with the broadcast integration platform via a public Internet.

In accordance with a particular embodiment, there is a non-transitory computer readable storage medium having instructions stored thereupon that, when executed by a broadcast integration platform having at least a processor and a memory therein to synchronize interactive content with a broadcast transmission, the instructions cause the broadcast integration platform to perform operations includes: receiving a request from a user device for presentation of a broadcast transmission, in which the user device is to receive the broadcast transmission via a local tuner; transmitting a source location for the broadcast transmission from the broadcast integration platform to the user device; transmitting to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device; instructing the user device to compute a local offset for the broadcast transmission by determining a latency delay between the current position for the broadcast transmission according to the broadcast offset and the local current position for the broadcast transmission according to the display of the broadcast transmission at the user device; synchronizing presentation of the media content objects with the display of the broadcast transmission at the user device by instructing the local tuner to temporally align the presentation of the media content objects with the display of the broadcast transmission based on the time-point triggers for the media content objects using the local offset; and instructing the user device to overlay the presentation of the media content objects over the display of the broadcast transmission at the user device at a time defined by each of the time-point triggers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a broadcast integration platform having at least a processor and a memory therein to synchronize interactive content with a broadcast transmission, wherein the method comprises:
    receiving a request from a user device for presentation of a broadcast transmission, wherein the user device is to receive the broadcast transmission via a local tuner;
    transmitting a source location for the broadcast transmission from the broadcast integration platform to the user device;
    transmitting to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device;
    instructing the user device to compute a local offset for the broadcast transmission by determining a latency delay between the current position for the broadcast transmission according to the broadcast offset and the local current position for the broadcast transmission according to the display of the broadcast transmission at the user device;
    synchronizing presentation of the media content objects with the display of the broadcast transmission at the user device by instructing the local tuner to temporally align the presentation of the media content objects with the display of the broadcast transmission based on the time-point triggers for the media content objects using the local offset; and
    instructing the user device to overlay the presentation of the media content objects over the display of the broadcast transmission at the user device at a time defined by each of the time-point triggers.

2. The method of claim 1, wherein each of the time-point triggers specify when during the display of the broadcast transmission an associated one of the plurality of media content objects is to be presented at the user device concurrent with the display of the broadcast transmission to the user device.

3. The method of claim 1, wherein the source location for the broadcast transmission is sent to the user device by a broadcast server co-located with and communicably interfaced to a broadcast transmitter broadcasting the broadcast transmission to the user device and concurrently to a plurality of additional viewing devices capable of receiving the broadcast transmission via local tuner at each of the plurality of additional viewing devices.

4. The method of claim 1, wherein each of the time-point triggers specifies each of:
    an initial load time for an associated one of the plurality of media content objects to be presented at the user device as an overlay to the display of the broadcast transmission at the user device; and
    a presentation duration for the respective media content object or alternatively an unload time for the associated one of the plurality of media content objects indicating when presentation of the respective media content object is to cease rendering over the display of the broadcast transmission to the user device, thus terminating the presentation of the media content object to the user device.

5. The method of claim 1, wherein instructing the user device to overlay the presentation of the media content objects over the display of the broadcast transmission at the user device comprises:
    pre-loading one or more of the respective media content objects into a display memory of the user device in a region of the display which is un-viewable via the user device; and
    relocating each respective media content object pre-loaded into the display memory of the user device from the region of the display which is un-viewable into the display of the user device as an overlay of the broadcast transmission within a viewable portion of the user device at a time defined by time-point triggers.

6. The method of claim 1, wherein instructing the user device to overlay the presentation of the media content objects over the display of the broadcast transmission at the user device comprises:
    pre-loading one or more of the respective media content objects into a display memory of the user device within a hidden display layer beneath the display of the broadcast transmission to the user device such that the one or more of the respective media content objects pre-loaded to the hidden display layer are rendered but remain un-viewable via the user device; and
    relocating each respective media content object pre-loaded into the display memory of the user device from the hidden display layer beneath the display of the broadcast transmission to an overlay display layer above the display of the broadcast transmission within a viewable portion of the user device at a time defined by time-point triggers, wherein any media content object rendered at the overlay display layer at least partially obscures the display of the broadcast transmission with a viewable rendering of the respective media content object.

7. The method of claim 1, wherein instructing the user device to overlay the presentation of the media content objects over the display of the broadcast transmission at the user device comprises:
pre-loading one or more of the respective media content objects into a display memory of the user device in a region of the display which is viewable via the user device and configuring interactivity for the pre-loaded media object to be non-interactive; and
re-configuring interactivity for the pre-loaded media object to be interactive within the display memory as an overlay of the broadcast transmission at a time defined by time-point triggers.

8. The method of claim 7:
wherein the pre-loaded media object displayed to the user device comprises a betting or gambling user interface which is rendered within a viewable area of the display in a non-interactive state; and
wherein re-configuring the interactivity for the pre-loaded media object activates user input functionality to receive betting or gambling wager input at the betting or gambling user interface.

9. The method of claim 8: wherein the functionality to receive betting or gambling wager input at the betting or gambling user interface remains active until either: (i) interactivity for the pre-loaded media object is terminated based on the time-point triggers by re-configuring interactivity for the pre-loaded media object to be non-interactive or alternatively (i) display of the pre-loaded media object is terminated based on the time-point triggers, thus removing the pre-loaded media object as an overlay to the display of the broadcast transmission to the user device.

10. The method of claim 7, wherein the method further comprises:
establishing a geo-fence around an event venue corresponding to the broadcast transmission;
determining whether the user device is physically present inside of the geo-fence or is physically present outside of the geo-fence;
wherein the pre-loaded media object displayed to the user device comprises a betting or gambling user interface which is rendered within a viewable area of the display in a non-interactive state;
wherein re-configuring the interactivity for the pre-loaded media object conditionally activates user input functionality to receive betting or gambling wager input at the betting or gambling user interface based on the time-point triggers; and
wherein the interactivity is conditionally activated subject to the user device determined to be physically outside of the geo-fence.

11. The method of claim 1:
wherein a plurality of user devices concurrently receive, tune, and display the broadcast transmission at each of the plurality of user devices; and
wherein the synchronization temporally aligns the presentation of the media content objects with the display of the broadcast transmission across all user devices by enforcing an end-user view device time at each of the plurality of user devices to conform to a local offset at each of the respective plurality of user devices which is configured by the broadcast integration platform to account for varying amounts of latency between each of the respective user devices and the broadcast transmission time from the source location of the broadcast.

12. The method of claim 1, wherein the presentation of the media content objects with the display of the broadcast transmission at the user device is scaled via a scaling engine, wherein the scaling engine enforces uniform audiovisual quality.

13. The method of claim 1:
wherein the broadcast offset is received from either the source location or from the broadcast integration platform and is continuously maintained and incremented at the user device via a locally maintained broadcast offset; and
wherein the locally maintained broadcast offset receives intermittent calibration information from the source location for the broadcast transmission for use in re-calibrating the locally maintained broadcast offset and for periodically re-determining the local offset for the user device to maintain synchronization.

14. The method of claim 1:
wherein at least one of the media content objects contains a broadcast signature that matches a portion of the broadcast transmission;
wherein the local tuner is to monitor the broadcast transmission for the broadcast signature; and
wherein the local tuner is to determine a local offset at the user device based on an observed broadcast signature latency between the broadcast offset and the time that the broadcast signature is observed at the local tuner within the broadcast transmission received by the local tuner.

15. The method of claim 14, wherein the broadcast signature comprises one or more of:
a sub-audible cue embedded within the broadcast transmission;
an encoded string within the broadcast transmission;
viewable text within the broadcast transmission; and
a viewable image at pre-determined time marker within the broadcast transmission.

16. The method of claim 1, wherein the broadcast integration platform executes via the processor and the memory of a system providing on-demand cloud based services to a plurality of subscribers; and
wherein each of the subscribers communicate with the system executing the broadcast integration platform via a computing device which is remote from the broadcast integration platform and communicably interfaced with the broadcast integration platform via a public Internet.

17. Non-transitory computer readable storage media having instructions stored thereupon that, when executed by a broadcast integration platform having at least a processor and a memory therein to synchronize interactive content with a broadcast transmission, the instructions cause the broadcast integration platform to perform operations comprising:
receiving a request from a user device for presentation of a broadcast transmission, wherein the user device is to receive the broadcast transmission via a local tuner;
transmitting a source location for the broadcast transmission from the broadcast integration platform to the user device;
transmitting to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device;

instructing the user device to compute a local offset for the broadcast transmission by determining a latency delay between the current position for the broadcast transmission according to the broadcast offset and the local current position for the broadcast transmission according to the display of the broadcast transmission at the user device;

synchronizing presentation of the media content objects with the display of the broadcast transmission at the user device by instructing the local tuner to temporally align the presentation of the media content objects with the display of the broadcast transmission based on the time-point triggers for the media content objects using the local offset; and instructing the user device to overlay the presentation of the media content objects over the display of the broadcast transmission at the user device at a time defined by each of the time-point triggers.

18. The non-transitory computer readable storage media of claim 17:

wherein at least one of the media content objects contains a broadcast signature that matches a portion of the broadcast transmission;

wherein the local tuner is to monitor the broadcast transmission for the broadcast signature; and wherein the local tuner is to determine a local offset at the user device based on an observed broadcast signature latency between the broadcast offset and the time that the broadcast signature is observed at the local tuner within the broadcast transmission received by the local tuner.

19. A system comprising:

a memory to store instructions;

a processor to execute the instructions stored in the memory;

wherein the instructions implement a broadcast integration platform to synchronize interactive content with a broadcast transmission;

wherein the processor is to execute the instructions to cause the system to perform operations including:

receiving a request from a user device for presentation of a broadcast transmission, wherein the user device is to receive the broadcast transmission via a local tuner;

transmitting a source location for the broadcast transmission from the broadcast integration platform to the user device;

transmitting to the user device in response to the received request: (i) a plurality of media content objects to be stored locally at the user device, (ii) a broadcast offset defining a time difference between a start time of the broadcast transmission and a current position for the broadcast transmission according to the source location, and (iii) time-point triggers for the media content objects specifying when during the presentation of the broadcast transmission each of the plurality of media content objects is to be presented at the user device concurrent with display of the broadcast transmission at the user device;

instructing the user device to compute a local offset for the broadcast transmission by determining a latency delay between the current position for the broadcast transmission according to the broadcast offset and the local current position for the broadcast transmission according to the display of the broadcast transmission at the user device;

synchronizing presentation of the media content objects with the display of the broadcast transmission at the user device by instructing the local tuner to temporally align the presentation of the media content objects with the display of the broadcast transmission based on the time-point triggers for the media content objects using the local offset; and instructing the user device to overlay the presentation of the media content objects over the display of the broadcast transmission at the user device at a time defined by each of the time-point triggers.

20. The system of claim 19:

wherein at least one of the media content objects contains a broadcast signature that matches a portion of the broadcast transmission;

wherein the local tuner is to monitor the broadcast transmission for the broadcast signature; and wherein the local tuner is to determine a local offset at the user device based on an observed broadcast signature latency between the broadcast offset and the time that the broadcast signature is observed at the local tuner within the broadcast transmission received by the local tuner.

* * * * *